(12) United States Patent
Shih et al.

(10) Patent No.: US 9,638,889 B2
(45) Date of Patent: May 2, 2017

(54) LENS ASSEMBLY

(71) Applicants: Sintai Optical (Shenzhen) Co., Ltd., Shenzhen, Guandong Province (CN); Asia Optical Co., Inc., Taichung (TW)

(72) Inventors: Po-Yuan Shih, Taichung (TW); Po-Yu Chen, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 52 days.

(21) Appl. No.: 14/664,941

(22) Filed: Mar. 23, 2015

(65) Prior Publication Data

US 2016/0282585 A1  Sep. 29, 2016

(30) Foreign Application Priority Data

Mar. 24, 2014 (TW) .............................. 103110828 A
Apr. 29, 2014 (TW) .............................. 103115288 A
Jul. 15, 2014 (TW) .............................. 103124280 A

(51) Int. Cl.
*G02B 13/00* (2006.01)
*G02B 9/62* (2006.01)
*G02B 13/06* (2006.01)

(52) U.S. Cl.
CPC ............ *G02B 9/62* (2013.01); *G02B 13/0045* (2013.01); *G02B 13/06* (2013.01)

(58) Field of Classification Search
CPC ......... G02B 9/62; G02B 9/64; G02B 13/0045

USPC ....... 359/657, 658, 681, 682, 749, 750–752, 359/754–756, 761, 762
See application file for complete search history.

(56) References Cited

U.S. PATENT DOCUMENTS

| | | | | |
|---|---|---|---|---|
| 8,331,041 B2 * | 12/2012 | Katakura | ............... | G02B 13/06 359/751 |
| 2011/0051205 A1 * | 3/2011 | Jo | .......................... | G02B 13/04 358/483 |
| 2014/0247507 A1 * | 9/2014 | Tsai | ......................... | G02B 9/62 359/713 |

\* cited by examiner

*Primary Examiner* — Darryl J Collins
*Assistant Examiner* — Journey Sumlar
(74) *Attorney, Agent, or Firm* — McClure, Qualey & Rodack, LLP

(57) ABSTRACT

A lens assembly includes a first lens, a second lens, a third lens, a fourth lens, a fifth lens and a sixth lens, all of which are arranged in sequence from an object side to an image side along an optical axis. The first lens is with negative refractive power. The second, third, fourth and sixth lens are with refractive power. The fifth lens is with positive refractive power. The lens assembly satisfies: $0.078 \leq BFL/TTL \leq 0.4$, $0.01 \leq f/TTL \leq 0.61$, $(Nd_1+Nd_2+Nd_3+Nd_4+Nd_5+Nd_6)/6 < (Nd_2+Nd_3)/2$ wherein BFL is a distance from an image side surface of the sixth lens to an image plane along the optical axis, TTL is a distance from the convex surface of the first lens to the image plane along the optical axis, f is an effective focal length of the lens assembly, and $Nd_1$, $Nd_2$, $Nd_3$, $Nd_4$, $Nd_5$ and $Nd_6$ are indexes of refraction of the first, second, third, fourth, fifth and sixth lenses.

29 Claims, 48 Drawing Sheets

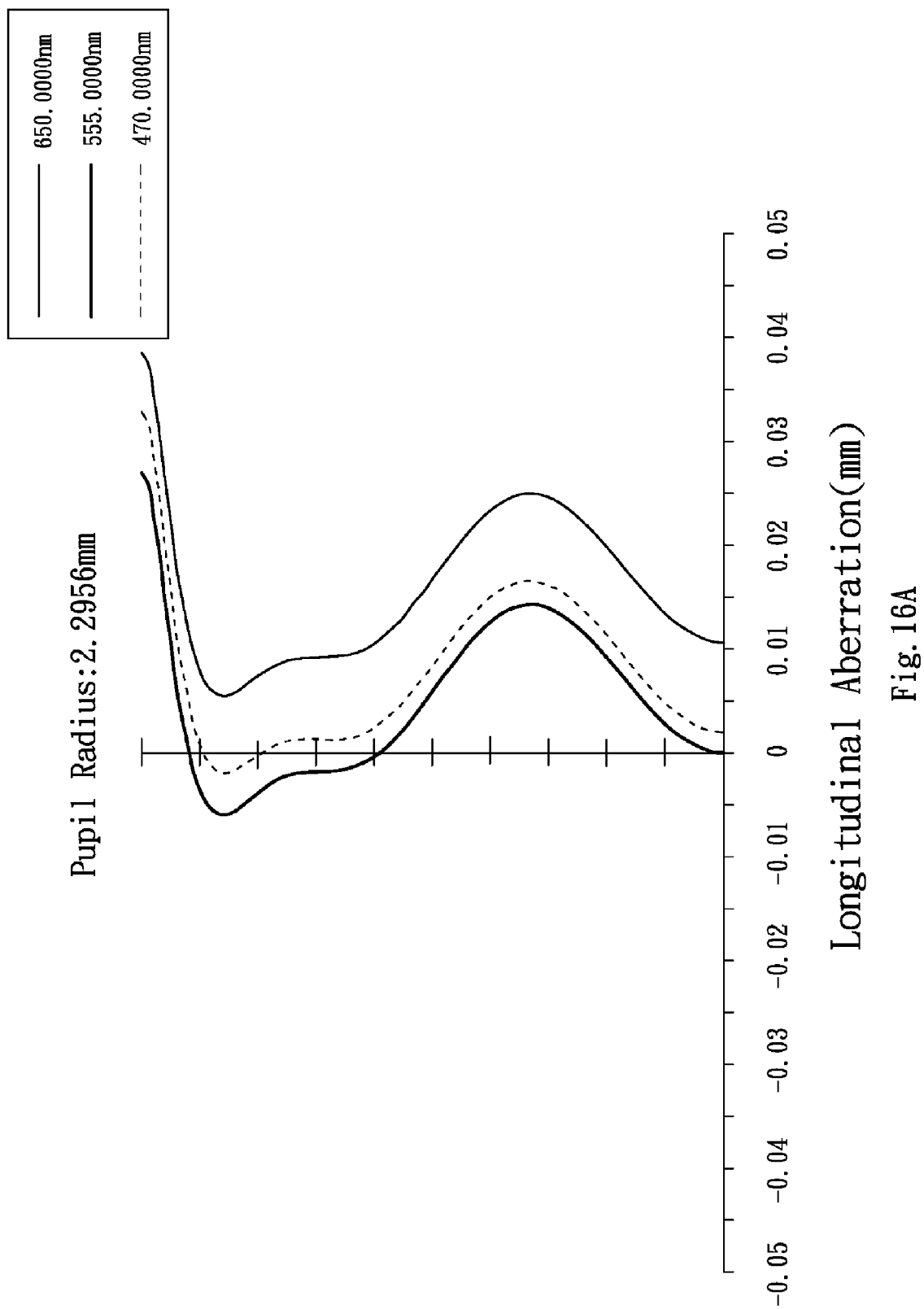

LENS ASSEMBLY

BACKGROUND OF THE INVENTION

Field of the Invention

The invention relates to a lens assembly.

Description of the Related Art

Digital still cameras and mobile phones have been gradually developed toward high pixel number, miniaturization and wide field of view. Therefore, the requirements for lens assemblies with miniaturization, wide field of view and high resolution are greatly increased. The well-known lens assembly with six lenses is not perfect and still needs improvement. Therefore, a lens assembly needs a new structure in order to meet the requirements of miniaturization, wide field of view and high resolution.

BRIEF SUMMARY OF THE INVENTION

The invention provides a lens assembly to solve the above problems. The lens assembly of the invention, provided with characteristics of a shortened total lens length, an increased field of view, still has a good optical performance and can meet a requirement of resolution.

The lens assembly in accordance with an exemplary embodiment of the invention includes a first lens, a second lens, a third lens, a fourth lens, a fifth lens and a sixth lens, all of which are arranged in sequence from an object side to an image side along an optical axis. The first lens is with negative refractive power and includes a convex surface facing the object side and a concave surface facing the image side. The second, third and fourth lens are with refractive power. The fifth lens is with positive refractive power and includes a convex surface facing the image side. The sixth lens is with refractive power. The lens assembly satisfies: $0.078 \leq BFL/TTL \leq 0.4$, $0.01 \leq f/TTL \leq 0.61$, $(Nd_1+Nd_2+Nd_3+Nd_4+Nd_5+Nd_6)/6 < (Nd_2+Nd_3)/2$ wherein BFL is a distance from an image side surface of the sixth lens to an image plane along the optical axis, TTL is a distance from the convex surface of the first lens to the image plane along the optical axis, f is an effective focal length of the lens assembly, $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens and $Nd_6$ is an index of refraction of the sixth lens.

In another exemplary embodiment, the second lens is a biconcave lens and with negative refractive power; the third lens is with positive refractive power and includes a convex surface facing the object side; the fourth lens is a meniscus lens with negative refractive power and includes a convex surface facing the object side and a concave surface facing the image side; and the fifth lens further includes a convex surface facing the object side.

In yet another exemplary embodiment, the sixth lens is with positive refractive power or the sixth lens is with negative refractive power.

In another exemplary embodiment, the lens assembly further satisfies $0.01 \leq f/TTL \leq 0.2$, wherein f is an effective focal length of the lens assembly and TTL is a distance from the convex surface of the first lens to an image plane along the optical axis.

In yet another exemplary embodiment, the first lens and the second lens satisfy $3 \leq f_1/f_2 \leq 6$, wherein $f_1$ is an effective focal length of the first lens and $f_2$ is an effective focal length of the second lens.

In another exemplary embodiment, the fourth lens satisfies $0.54 < |f_4/f| < 20$, wherein $f_4$ is an effective focal length of the fourth lens and f is an effective focal length of the lens assembly.

In yet another exemplary embodiment, the sixth lens satisfies $-20 \leq f_6/f \leq 50$, wherein $f_6$ is an effective focal length of the sixth lens and f is an effective focal length of the lens assembly.

In another exemplary embodiment, the third lens satisfies $-10 \leq (R_{31}-R_{32})/(R_{31}+R_{32}) \leq 5$, wherein $R_{31}$ is a radius of curvature of the convex surface of the third lens and $R_{32}$ is a radius of curvature of an image side surface of the third lens.

In yet another exemplary embodiment, the fifth lens satisfies $-70 \leq (R_{51}-R_{52})/(R_5+R_{52}) \leq 20$, wherein $R_{51}$ is a radius of curvature of the convex surface of the object side of the fifth lens and $R_{52}$ is a radius of curvature of the convex surface of the image side of the fifth lens.

In another exemplary embodiment, the convex surface of the first lens and the concave surface of the first lens are spherical surfaces.

In yet another exemplary embodiment, the first lens is made of glass material.

In another exemplary embodiment, the lens assembly further includes a stop disposed between the third lens and the fourth lens.

In yet another exemplary embodiment, the second lens is a biconvex lens and with positive refractive power; the third lens is with negative refractive power and includes a concave surface facing the object side; the fourth lens is a biconvex lens and with positive refractive power; the fifth lens further includes a concave surface facing the object side; and the sixth lens is with negative refractive power and includes a convex surface facing the object side.

In another exemplary embodiment, the third lens further includes a concave surface facing the image side; and the sixth lens further includes a concave surface facing the image side.

In yet another exemplary embodiment, the lens assembly further satisfies $0.4 \leq f/TTL \leq 0.5$, wherein f is an effective focal length of the lens assembly and TTL is a distance from the convex surface of the first lens to an image plane along the optical axis.

In another exemplary embodiment, the first lens and the sixth lens satisfy $2 \leq f_1/f_6 \leq 5$, wherein $f_1$ is an effective focal length of the first lens and $f_6$ is an effective focal length of the sixth lens.

In yet another exemplary embodiment, the second lens satisfies $-3 \leq (R_{21}-R_{22})/(R_{21}+R_{22}) \leq -1$, wherein $R_{21}$ is a radius of curvature of an object side surface of the second lens and $R_{22}$ is a radius of curvature of an image side surface of the second lens.

In another exemplary embodiment, the fourth lens satisfies $-1 \leq (R_{41}-R_{42})/(R_{41}+R_{42}) \leq 20$, wherein $R_{41}$ is a radius of curvature of an object side surface of the fourth lens and $R_{42}$ is a radius of curvature of an image side surface of the fourth lens.

In yet another exemplary embodiment, the first lens satisfies $2.19 < |f_1/f| < 2.74$, wherein $f_1$ is an effective focal length of the first lens and f is an effective focal length of the lens assembly.

In another exemplary embodiment, the second lens satisfies $0.53 < |f_2/f| < 1.03$, wherein $f_2$ is an effective focal length of the second lens and f is an effective focal length of the lens assembly.

In yet another exemplary embodiment, the third lens satisfies 0.72<|f$_3$/f|<1.37, wherein f$_3$ is an effective focal length of the third lens and f is an effective focal length of the lens assembly.

In another exemplary embodiment, the lens assembly further satisfies 0.17<|BFL/TTL|<0.20, wherein TTL is a distance from an object side surface of the first lens to an image plane along the optical axis and BFL is a distance from an image side surface of the sixth lens to the image plane along the optical axis.

In yet another exemplary embodiment, the lens assembly further includes a stop disposed between the first lens and the third lens.

In another exemplary embodiment, the second lens is a meniscus lens with positive refractive power and includes a convex surface facing the object side and a concave surface facing the image side; the third lens is a meniscus lens with positive refractive power and includes a concave surface facing the object side and a convex surface facing the image side; the fourth lens is with positive refractive power; the fifth lens further includes a convex surface facing the object side; and the sixth lens is a biconcave lens with negative refractive power.

In yet another exemplary embodiment, the lens assembly further satisfies 0.2≤BFL/TTL≤0.4, wherein BFL is a distance from an image side surface of the sixth lens to an image plane along the optical axis and TTL is a distance from the convex surface of the first lens to the image plane along the optical axis.

In another exemplary embodiment, the first lens satisfies 0.5≤(R$_{11}$−R$_{12}$)/(R$_{11}$+R$_{12}$)≤0.9, wherein R$_{11}$ is a radius of curvature of the convex surface of the first lens and R$_{12}$ is a radius of curvature of the concave surface of the first lens.

In yet another exemplary embodiment, the second lens and the third lens satisfy 2≤f$_2$/f$_3$≤7, wherein f$_2$ is an effective focal length of the second lens and f$_3$ is an effective focal length of the third lens.

In another exemplary embodiment, the sixth lens satisfies −1.6≤(R$_{61}$−R$_{62}$)/(R$_{61}$+R$_{62}$)≤10, wherein R$_{61}$ is a radius of curvature of an object side surface of the sixth lens and R$_{62}$ is a radius of curvature of an image side surface of the sixth lens.

In yet another exemplary embodiment, the lens assembly satisfies Nd$_2$>Nd$_3$, wherein Nd$_2$ is an index of refraction of the second lens and Nd$_3$ is an index of refraction of the third lens.

In another exemplary embodiment, the lens assembly further includes a stop disposed between the second lens and the third lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 16A is a longitudinal aberration diagram of the lens assembly in accordance with the eighth embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
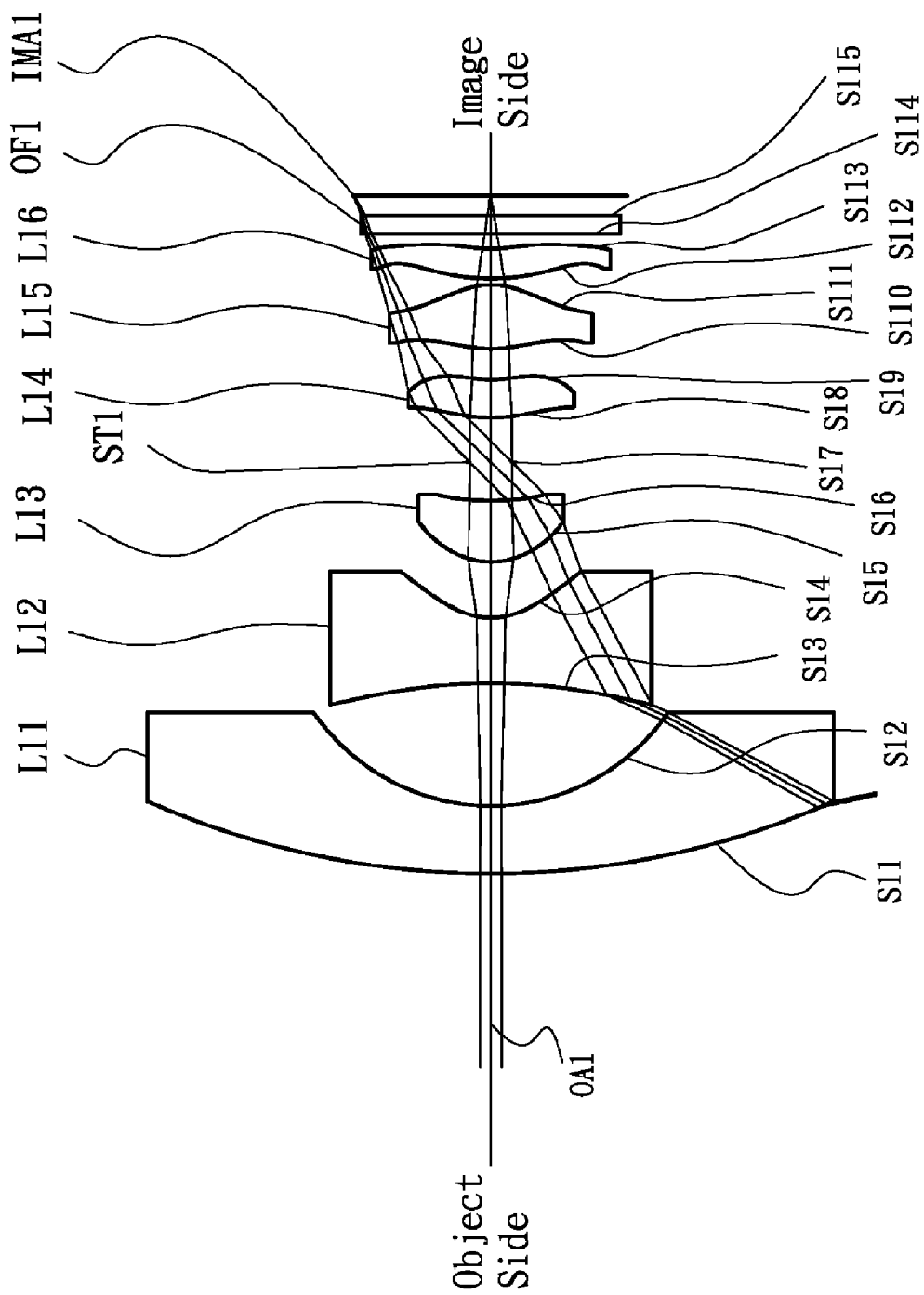
FIG. 1 is a lens layout and optical path diagram of a lens assembly in accordance with a first embodiment of the invention.

Referring to FIG. 1, FIG. 1 is a lens layout and optical path diagram of a lens assembly in accordance with a first embodiment of the invention. The lens assembly 1 includes a first lens L11, a second lens L12, a third lens L13, a stop ST1, a fourth lens L14, a fifth lens L15, a sixth lens L16 and an optical filter OF1, all of which are arranged in sequence from an object side to an image side along an optical axis OA1. In operation, an image of light rays from the object side is formed at an image plane IMA1. The stop ST1 can help to collect light effectively so as to increase the field of view. The first lens L11 is a meniscus lens, made of glass material and with negative refractive power, wherein the object side surface S11 is a convex surface, the image side surface S12 is a concave surface and both of the object side surface S11 and image side surface S12 are spherical surfaces. A spherical lens is easier for manufacture than an aspheric lens so selecting a spherical lens as the first lens L11 is advantageous to cost reduction. Another reason for selecting a spherical lens as the first lens L11 is that the influence on the resolution of the lens assembly 1 will be smaller. The effective focal length of the lens assembly 1 can be reduced, the total lens length of the lens assembly 1 can be shortened and the resolution of the lens assembly 1 can be increased as the first lens L11 is made of glass material because the index of refraction of the glass material is larger than the plastic material. The second lens L12 is a biconcave lens, made of plastic material and with negative refractive power, wherein both of the object side surface S13 and image side surface S14 are aspheric surfaces. The third lens L13 is a meniscus lens, made of plastic material and with positive refractive power, wherein the object side surface S15 is a convex surface, the image side surface S16 is a concave surface and both of the object side surface S15 and image side surface S16 are aspheric surfaces. The fourth lens L14 is a meniscus lens, made of plastic material and with negative refractive power, wherein the object side surface S18 is a convex surface, the image side surface S19 is a concave surface and both of the object side surface S18 and image side surface S19 are aspheric surfaces. The fifth lens L15 is a biconvex lens, made of plastic material and with positive refractive power, wherein both of the object side surface S110 and image side surface S111 are aspheric surfaces. The sixth lens L16 is a meniscus lens, made of plastic material and with negative refractive power, wherein the object side surface S112 is a convex surface, the image side surface S113 is a concave surface and both of the object side surface S112 and image side surface S113 are aspheric surfaces. Both of the object side surface S114 and image side surface S115 of the optical filter OF1 are plane surfaces.

In order to maintain excellent optical performance of the lens assembly in accordance with the first embodiment of the invention, the lens assembly 1 must satisfies the following eight conditions:

$$0.078 \leq BFL1/TTL1 \leq 0.4 \quad (1)$$

$$0.01 \leq f1/TTL1 \leq 0.2 \quad (2)$$

$$(Nd1_1+Nd1_2+Nd1_3+Nd1_4+Nd1_5+Nd1_6)/6 < (Nd1_2+Nd1_3)/2 \quad (3)$$

$$3 \leq f1_1/f1_2 \leq 6 \quad (4)$$

$$0.54 \leq |f1_4/f1| \leq 20 \quad (5)$$

$$-20 \leq f1_6/f1 \leq 50 \quad (6)$$

$$-10 \leq (R1_{31}-R1_{32})/(R1_{31}+R1_{32}) \leq 5 \quad (7)$$

$$-70 \leq (R1_{51}-R1_{52})/(R1_{51}+R1_{52}) \leq 20 \quad (8)$$

wherein BFL1 is a distance from the image side surface S113 of the sixth lens L16 to the image plane IMA1 along the optical axis OA1, f1 is an effective focal length of the lens assembly 1, TTL1 is a distance from the object side surface S11 of the first lens L11 to the image plane IMA1 along the optical axis OA1, $Nd1_1$ is an index of refraction of the first lens L11, $Nd1_2$ is an index of refraction of the second lens L12, $Nd1_3$ is an index of refraction of the third lens L13, $Nd1_4$ is an index of refraction of the fourth lens L14, $Nd1_5$ is an index of refraction of the fifth lens L15, $Nd1_6$ is an index of refraction of the sixth lens L16, f1 is an effective focal length of the first lens L11, $f1_2$ is an effective focal length of the second lens L12, $f1_4$ is an effective focal length of the fourth lens L14, $f1_6$ is an effective focal length of the sixth lens L16, $R1_{31}$ is a radius of curvature of the object side surface S15 of the third lens L13, $R1_{32}$ is a radius of curvature of the image side surface S16 of the third lens L13, $R1_{51}$ is a radius of curvature of the object side surface S110 of the fifth lens L15, and $R1_{52}$ is a radius of curvature of the image side surface S111 of the fifth lens L15. The BFL1 is longer as the lens assembly 1 satisfies condition (1). The longer the back focal length, the longer the focusing range. Thus, the sixth lens L16 stands little chance to collide with the optical filter OF1.

By the above design of the lenses and stop ST1, the lens assembly 1 is provided with a shortened total lens length, an increased field of view, an effective corrected aberration and an increased resolution.

In order to achieve the above purposes and effectively enhance the optical performance, the lens assembly 1 in accordance with the first embodiment of the invention is provided with the optical specifications shown in Table 1, which include the effective focal length, F-number, field of view, total lens length, radius of curvature of each lens surface, thickness between adjacent surface, refractive index of each lens and Abbe number of each lens. Table 1 shows that the effective focal length is equal to 0.8594 mm, F-number is equal to 2.4, field of view is equal to 204.2° and total lens length is equal to 11.000 mm for the lens assembly 1 of the first embodiment of the invention.

TABLE 1

Effective Focal Length = 0.8594 mm F-number = 2.4
Field of View = 204.2° Total Lens Length = 11.000 mm

| Surface Number | Radius of Curvature (mm) | Thickness (mm) | Nd | Vd | Remark |
|---|---|---|---|---|---|
| S11 | 14.045 | 1.096 | 1.583 | 59.4 | The First Lens L11 |
| S12 | 3.535 | 1.989 | | | |
| S13 | −8.828 | 1.060 | 1.535 | 55.7 | The Second Lens L12 |
| S14 | 1.176 | 0.909 | | | |
| S15 | 1.304 | 0.995 | 1.636 | 23.9 | The Third Lens L13 |
| S16 | 6.000 | 0.620 | | | |
| S17 | ∞ | 0.72 | | | Stop ST1 |
| S18 | 1.945 | 0.619 | 1.535 | 55.7 | The Fourth Lens L14 |
| S19 | 1.139 | 0.500 | | | |
| S110 | 1.155 | 1.041 | 1.535 | 55.7 | The Fifth Lens L15 |
| S111 | −1.195 | 0.100 | | | |
| S112 | 4.002 | 0.482 | 1.535 | 55.7 | The Sixth Lens L16 |
| S113 | 1.827 | 0.240 | | | |
| S114 | ∞ | 0.300 | 1.517 | 64.2 | Optical Filter OF1 |
| S115 | ∞ | 0.318 | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the first embodiment, the conic constant k and the aspheric coefficients A, B, C, D, E of each surface are shown in Table 2.

TABLE 2

| Surface Number | k | A | B | C | D | E |
|---|---|---|---|---|---|---|
| S13 | −5.4814E+00 | 2.4352E−04 | −7.8988E−05 | −7.3654E−07 | 3.3515E−06 | −2.1427E−07 |
| S14 | −5.1831E−01 | −5.8497E−02 | −2.0474E−02 | 5.0725E−04 | 6.7157E−04 | −4.0696E−04 |
| S15 | −1.7691E−01 | 1.4385E−02 | −2.3805E−02 | 4.0495E−03 | 2.1529E−03 | −1.7308E−04 |
| S16 | 2.0240E+01 | 5.8409E−02 | −9.0359E−02 | 1.2494E−01 | −7.8071E−02 | 1.8096E−02 |
| S18 | −2.3293E+01 | 8.0813E−03 | −8.2214E−03 | −5.0264E−03 | 2.1767E−03 | −6.2233E−05 |
| S19 | −5.3122E+01 | −9.6195E−02 | −1.3522E−03 | −4.8576E−03 | 1.0507E−03 | −6.2233E−05 |
| S110 | −3.7670E+01 | −5.0847E−03 | 2.0824E−03 | −6.5218E−03 | 1.1317E−03 | −6.2233E−05 |
| S111 | −2.7172E+00 | 3.7844E−02 | 6.6045E−03 | 1.2203E−03 | −3.0108E−04 | −6.2233E−05 |
| S112 | 1.8487E+00 | 2.3157E−02 | −1.5991E−02 | −7.4061E−04 | −4.0426E−05 | 7.8409E−05 |
| S113 | −3.6829E+01 | −7.3336E−02 | 2.5094E−02 | −1.9344E−03 | −5.0214E−04 | 6.2233E−05 |

For the lens assembly 1 of the first embodiment, the distance BFL1 from the image side surface S113 of the sixth lens L16 to the image plane IMA1 along the optical axis OA1 is equal to 0.858 mm, the effective focal length f1 of the lens assembly 1 is equal to 0.8594 mm, the distance TTL1 from the object side surface S11 of the first lens L11 to the image plane IMA1 along the optical axis OA1 is equal to 11.000 mm, the index of refraction $Nd_1$ of the first lens L11 is equal to 1.583, the index of refraction $Nd1_2$ of the second lens L12 is equal to 1.535, the index of refraction $Nd1_3$ of the third lens L13 is equal to 1.636, the index of refraction $Nd1_4$ of the fourth lens L14 is equal to 1.535, the index of refraction $Nd1_5$ of the fifth lens L15 is equal to 1.535, the index of refraction $Nd1_6$ of the sixth lens L16 is equal to 1.535, the effective focal length $f_1$ of the first lens L11 is equal to −8.39127 mm, the effective focal length $f1_2$ of the second lens L12 is equal to −1.86248 mm, the effective focal length $f1_3$ of the third lens L13 is equal to 2.39885 mm, the effective focal length $f1_4$ of the fourth lens L14 is equal to −7.0002 mm, the effective focal length $f1_5$ of the fifth lens L15 is equal to 1.29344 mm, the effective focal length $f1_6$ of the sixth lens L16 is equal to −6.77844 mm, the radius of curvature $R1_{31}$ of the object side surface S15 of the third lens L13 is equal to 1.30450 mm, the radius of curvature $R1_{32}$ of the image side surface S16 of the third lens L13 is equal to 6.00000 mm, the radius of curvature $R1_{51}$ of the object side surface S110 of the fifth lens L15 is equal to 1.15476 mm, and the radius of curvature $R1_{52}$ of the image side surface S111 of the fifth lens L15 is equal to −1.19538 mm. According to the above data, the following values can be obtained:

$BFL1/TTL1=0.078$ $f1/TTL1=0.0781$, $(Nd1_1+Nd1_2+Nd1_3+Nd1_4+Nd1_5+Nd1_6)/6=1.560$, $(Nd1_2+Nd1_3)/2=1.586$, $f1_1/f1_2=4.5054$, $|f1_4/f1|=8.1450$, $f1_6/f1=-7.8870$, $(R1_{31}-R1_{32})/(R1_{31}+R1_{32})=-0.6428$, $(R1_{51}-R1_{52})/(R1_{51}+R1_{52})=-57.8577$ which respectively satisfy the above conditions (1)-(8).

Figure 2A:
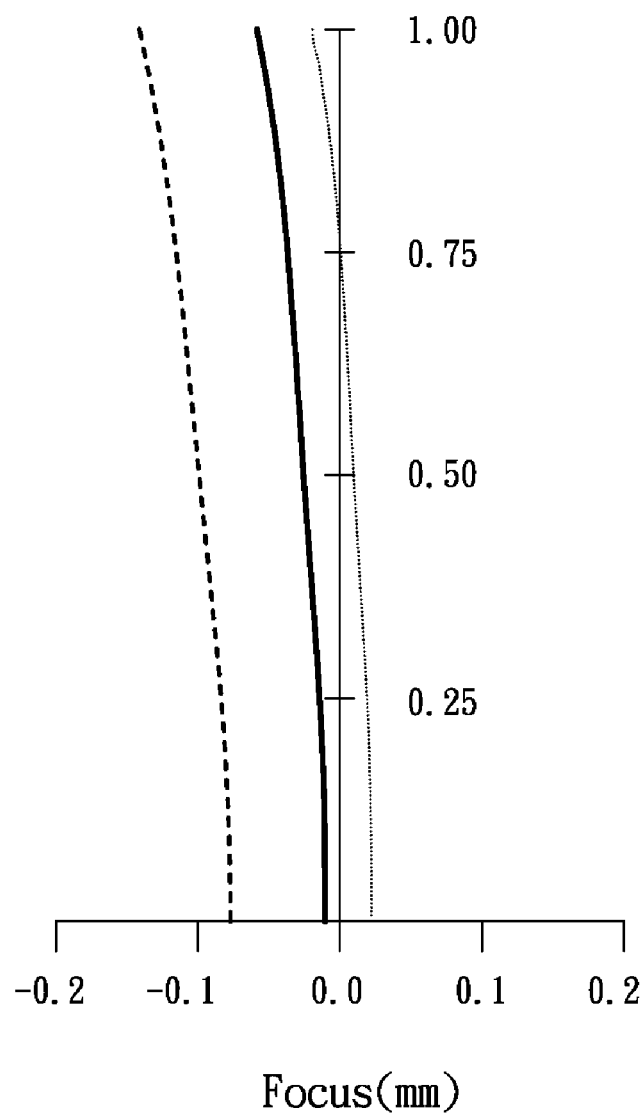
FIG. 2A depicts a longitudinal spherical aberration of the lens assembly in accordance with the first embodiment of the invention.
Figure 2B:
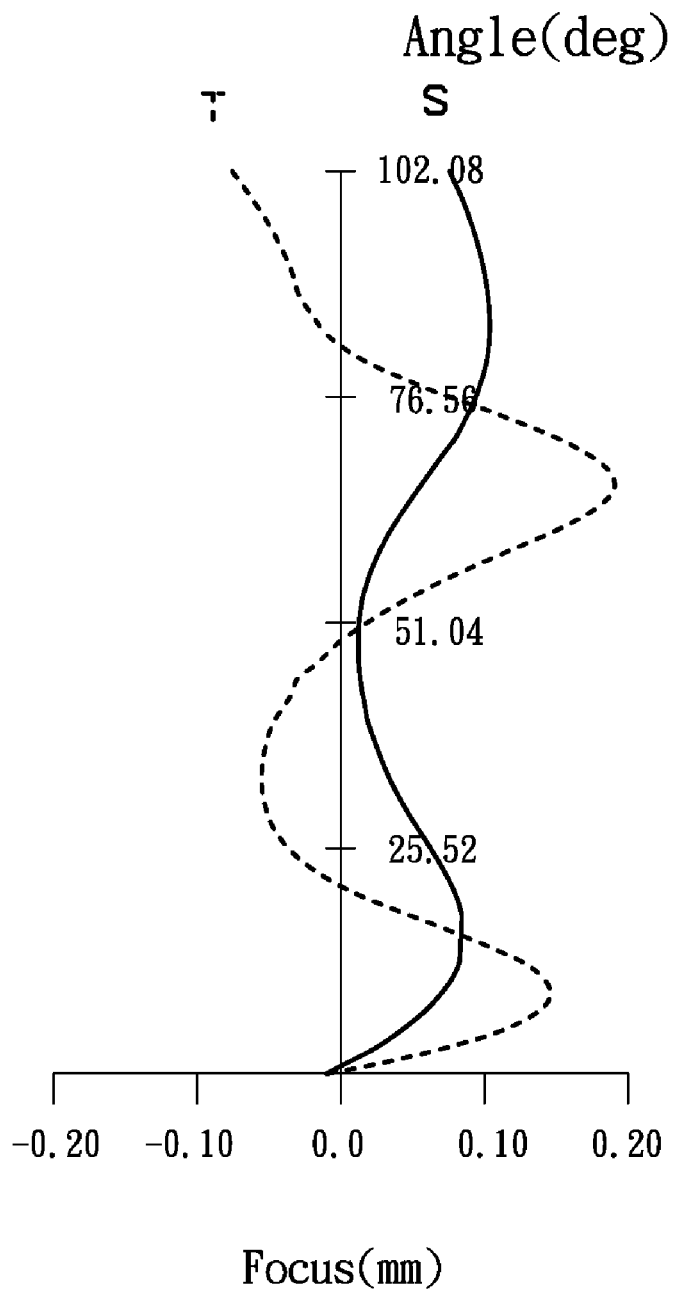
FIG. 2B is an astigmatic field curves diagram of the lens assembly in accordance with the first embodiment of the invention.
Figure 2C:
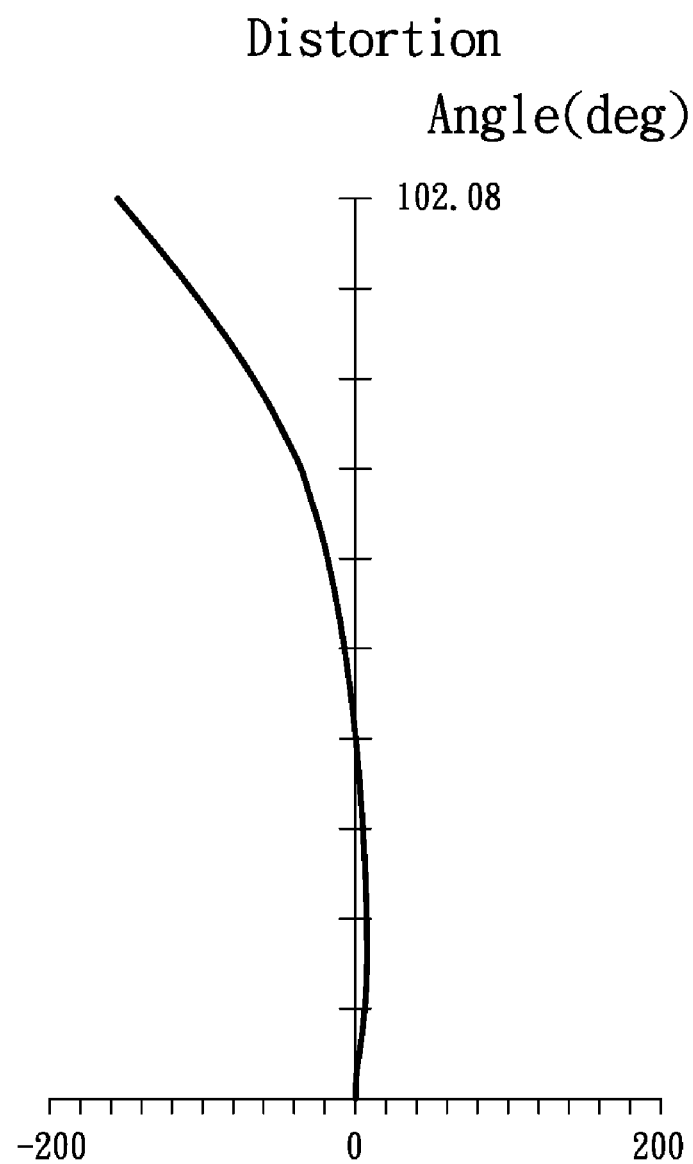
FIG. 2C is a distortion diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a longitudinal spherical aberration diagram of the lens assembly 1 in accordance with the first embodiment of the invention, FIG. 2B shows an astigmatic field curves of the lens assembly 1 in accordance with the first embodiment of the invention and FIG. 2C shows a distortion diagram of the lens assembly 1 in accordance with the first embodiment of the invention.

It can be seen from FIG. 2A that the longitudinal spherical aberration in the lens assembly 1 of the first embodiment ranges between −0.15 mm and 0.05 mm for the wavelength of 436.000 nm, 546.000 nm and 656.000 nm. It can be seen from FIG. 2B that the astigmatic field curves of tangential direction and sagittal direction in the lens assembly 1 of the first embodiment ranges between −0.10 mm and 0.20 mm for the wavelength of 546.000 nm. It can be seen from FIG. 2C that the distortion in the lens assembly 1 of the first embodiment ranges between −180% and 10% for the wavelength of 546.000 nm. It is obvious that the longitudinal spherical aberration, the astigmatic field curves and the distortion of the lens assembly 1 of the first embodiment can be corrected effectively. Therefore, the lens assembly 1 of the first embodiment is capable of good optical performance.

Figure 3:
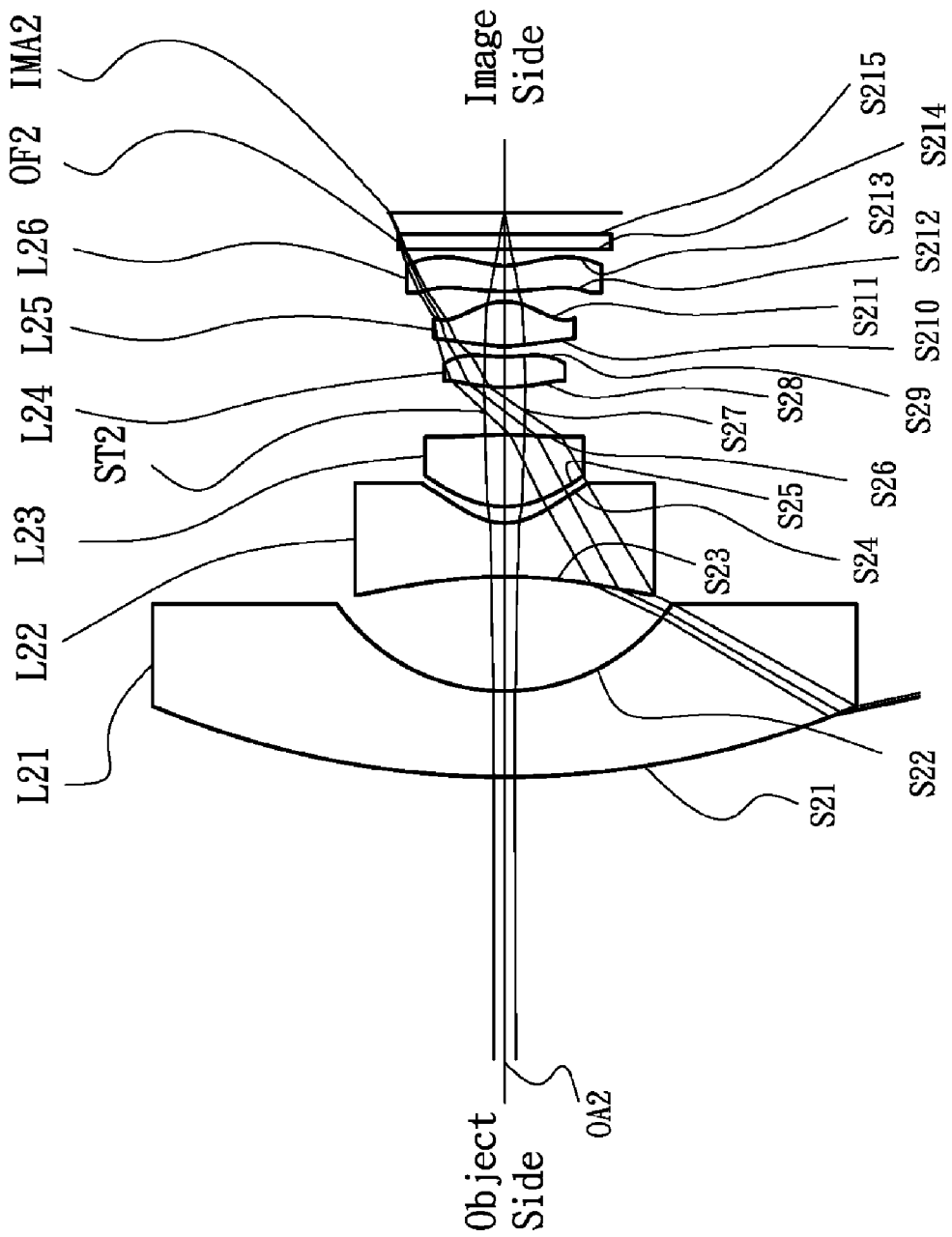
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a first lens L21, a second lens L22, a third lens L23, a stop ST2, a fourth lens L24, a fifth lens L25, a sixth lens L26 and an optical filter OF2, all of which are arranged in sequence from an object side to an image side along an optical axis OA2. In operation, an image of light rays from the object side is formed at an image plane IMA2. The stop ST2 can help to collect light effectively so as to increase the field of view. The first lens L21 is a meniscus lens, made of glass material and with negative refractive power, wherein the object side surface S21 is a convex surface, the image side surface S22 is a concave surface and both of the object side surface S21 and image side surface S22 are spherical surfaces. A spherical lens is easier for manufacture than an aspheric lens so selecting a spherical lens as the first lens L21 is advantageous to cost reduction. The other reason for selecting a spherical lens as the first lens L21 is that the influence on the resolution of the lens assembly 2 will be smaller. The effective focal length of the lens assembly 2 can be reduced, the total lens length of the lens assembly 2 can be shortened and the resolution of the lens assembly 2 can be increased as the first lens L21 is made of glass material because the index of refraction of the glass material is larger than the plastic material. The second lens L22 is a biconcave lens, made of plastic material and with negative refractive power, wherein both of the object side surface S23 and image side surface S24 are aspheric surfaces. The third lens L23 is a biconvex lens, made of plastic material and with positive refractive power, wherein both of the object side surface S25 and image side surface S26 are aspheric surfaces. The fourth lens L24 is a meniscus lens, made of plastic material and with negative refractive power, wherein the object side surface S28 is a convex surface, the image side surface S29 is a concave surface and both of the object side surface S28 and image side surface S29 are aspheric surfaces. The fifth lens L25 is a biconvex lens, made of plastic material and with positive refractive power, wherein both of the object side surface S210 and image side surface S211 are aspheric surfaces. The sixth lens L26 is a meniscus lens, made of plastic material and with negative refractive power, wherein the object side surface S212 is a convex surface, the image side surface S213 is a concave surface and both of the object side surface S212 and image side surface S213 are aspheric surfaces. Both of the object side surface S214 and image side surface S215 of the optical filter OF2 are plane surfaces.

In order to maintain excellent optical performance of the lens assembly in accordance with the second embodiment of the invention, the lens assembly 2 must satisfies the following eight conditions:

$0.078 \leq BFL2/TTL2 \leq 0.4$ (9)

$0.01 \leq f2/TTL2 \leq 0.2$ (10)

$(Nd2_1+Nd2_2+Nd2_3+Nd2_4+Nd2_5+Nd2_6)/6<(Nd2_2+Nd2_3)/2$ (11)

$3 \leq f2_1/f2_2 \leq 6$ (12)

$0.54<|f2_4/f2|<20$ (13)

$-20 \leq f2_6/f2 \leq 50$ (14)

$-10 \leq (R2_{31}-R2_{32})/(R2_{31}+R2_{32}) \leq 5$ (15)

$-70 \leq (R2_{51}-R2_{52})/(R2_{51}+R2_{52}) \leq 20$ (16)

wherein BFL2 is a distance from the image side surface S213 of the sixth lens L26 to the image plane IMA2 along the optical axis OA2, $Nd2_1$ is an index of refraction of the first lens L21, $Nd2_2$ is an index of refraction of the second lens L22, $Nd2_3$ is an index of refraction of the third lens L23, $Nd2_4$ is an index of refraction of the fourth lens L24, $Nd2_5$ is an index of refraction of the fifth lens L25, $Nd2_6$ is an index of refraction of the sixth lens L26, f2 is an effective focal length of the lens assembly 2, TTL2 is a distance from the object side surface S21 of the first lens L21 to the image plane IMA2 along the optical axis OA2, $f2_1$ is an effective focal length of the first lens L21, $f2_2$ is an effective focal length of the second lens L22, $f2_4$ is an effective focal length of the fourth lens L24, $f2_6$ is an effective focal length of the sixth lens L26, $R2_{31}$ is a radius of curvature of the object side surface S25 of the third lens L23, $R2_{32}$ is a radius of curvature of the image side surface S26 of the third lens L23, $R2_{51}$ is a radius of curvature of the object side surface S210 of the fifth lens L25, and $R2_{52}$ is a radius of curvature of the image side surface S211 of the fifth lens L25. The BFL2 is longer as the lens assembly 2 satisfies condition (9). The longer the back focal length, the longer the focusing range. Thus, the sixth lens L26 stands little chance to collide with the optical filter OF2.

In order to achieve the above purposes and effectively enhance the optical performance, the lens assembly 2 in accordance with the second embodiment of the invention is provided with the optical specifications shown in Table 3, which include the effective focal length, F-number, field of view, total lens length, radius of curvature of each lens surface, thickness between adjacent surface, refractive index of each lens and Abbe number of each lens. Table 3 shows that the effective focal length is equal to 1.0342 mm, F-number is equal to 2.4, field of view is equal to 207.2° and total lens length is equal to 11.000 mm for the lens assembly 2 of the second embodiment of the invention.

TABLE 3

Effective Focal Length = 1.0342 mm F-number = 2.4
Field of View = 207.2° Total Lens Length = 11.000 mm

| Surface Number | Radius of Curvature (mm) | Thickness (mm) | Nd | Vd | Remark |
|---|---|---|---|---|---|
| S21 | 18.068 | 1.671 | 1.583 | 59.4 | The First Lens L21 |
| S22 | 4.023 | 2.232 | | | |
| S23 | −9.278 | 1.053 | 1.535 | 55.7 | The Second Lens L22 |
| S24 | 1.204 | 0.318 | | | |
| S25 | 1.858 | 1.398 | 1.636 | 23.9 | The Third Lens L23 |
| S26 | −7.000 | 0.466 | | | |
| S27 | ∞ | 0.467 | | | Stop ST2 |
| S28 | 2.795 | 0.598 | 1.535 | 55.7 | The Fourth Lens L24 |
| S29 | 1.701 | 0.200 | | | |
| S210 | 1.436 | 0.878 | 1.535 | 55.7 | The Fifth Lens L25 |
| S211 | −1.035 | 0.200 | | | |
| S212 | 4.773 | 0.500 | 1.636 | 23.9 | The Sixth Lens L26 |
| S213 | 1.370 | 0.320 | | | |
| S214 | ∞ | 0.300 | 1.517 | 64.2 | Optical Filter OF2 |
| S215 | ∞ | 0.390 | | | |

The aspheric surface sag z of each lens in table 3 can be calculated by the following formula:

$$z = ch^2 / \{1 + [1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the second embodiment, the conic constant k and the aspheric coefficients A, B, C, D, E of each surface are shown in Table 4.

TABLE 4

| Surface Number | k | A | B | C | D | E |
|---|---|---|---|---|---|---|
| S23 | −1.3795E+01 | 8.0753E−05 | −1.3118E−04 | −3.5867E−06 | 4.0793E−06 | −2.1427E−07 |
| S24 | −5.3104E−01 | −6.3132E−02 | −2.3025E−02 | 1.1325E−03 | 1.1397E−03 | −4.0696E−04 |
| S25 | −1.0874E−02 | −1.1897E−02 | −1.1447E−02 | 2.1652E−03 | 1.0027E−03 | −1.7308E−04 |
| S26 | −2.4687E+01 | 7.0033E−02 | −9.8357E−02 | 1.2079E−01 | −7.7615E−02 | 1.8096E−02 |
| S28 | −4.2223E+01 | 3.6558E−02 | −1.0819E−02 | −1.0342E−02 | 4.1739E−03 | −6.2233E−05 |
| S29 | −1.1612E+02 | −1.0996E−01 | −8.5224E−03 | −3.9095E−03 | 2.8288E−03 | −6.2233E−05 |
| S210 | −5.3491E+01 | −6.3410E−03 | 7.2015E−03 | −5.4152E−03 | 2.0515E−03 | −6.2233E−05 |
| S211 | −1.5358E+00 | 7.8918E−02 | 2.4847E−02 | 7.5402E−04 | −7.5179E−04 | −6.2233E−05 |
| S212 | −5.6710E+00 | −1.8553E−02 | −1.2602E−02 | 1.2117E−03 | 1.7988E−04 | 7.8409E−05 |
| S213 | −6.6908E+00 | −1.0759E−01 | 3.0965E−02 | −3.2759E−03 | −3.5517E−04 | 6.2233E−05 |

By the above design of the lenses and stop ST2, the lens assembly 2 is provided with a shortened total lens length, an increased field of view, an effective corrected aberration and an increased resolution.

For the lens assembly 2 of the second embodiment, the distance BFL2 from the image side surface S213 of the sixth lens L26 to the image plane IMA2 along the optical axis OA2 is equal to 1.010 mm, the effective focal length f2 of the lens assembly 2 is equal to 1.0342 mm, the distance TTL2 from the object side surface S21 of the first lens L21 to the image plane IMA2 along the optical axis OA2 is equal to 11.000 mm, the index of refraction $Nd2_1$ of the first lens L21 is equal to 1.583, the index of refraction $Nd2_2$ of the second lens L22 is equal to 1.535, the index of refraction $Nd2_3$ of the third lens L23 is equal to 1.636, the index of refraction $Nd2_4$ of the fourth lens L24 is equal to 1.535, the index of refraction $Nd2_5$ of the fifth lens L25 is equal to 1.535, the index of refraction $Nd2_6$ of the sixth lens L26 is equal to 1.636, the effective focal length $f2_1$ of the first lens L21 is equal to −9.24583 mm, the effective focal length $f2_2$ of the second lens L22 is equal to −1.91628 mm, the effective focal length $f2_3$ of the third lens L23 is equal to 2.43877 mm, the effective focal length $f2_4$ of the fourth lens L24 is equal to −10.0000 mm, the effective focal length $f2_5$ of the fifth lens L25 is equal to 1.27827 mm, the effective focal length $f2_6$ of the sixth lens L26 is equal to −3.17657 mm, the radius of curvature $R2_{31}$ of the object side surface S25 of the third lens L23 is equal to 1.85827 mm, the radius of curvature $R2_{32}$ of the image side surface S26 of the third lens L23 is equal to −7.00000 mm, the radius of curvature $R2_{51}$ of the object side surface S210 of the fifth lens L25 is equal to 1.43575 mm, and the radius of curvature $R2_{52}$ of the image side surface S211 of the fifth lens L25 is equal to −1.03535 mm. According to the above data, the following values can be obtained:

$BFL2/TTL2=0.092$ $f2/TTL2=0.0940$, $(Nd2_1+Nd2_2+Nd2_3+Nd2_4+Nd2_5+Nd2_6)/6=1.577$, $(Nd2_2+Nd2_3)/2=1.586$, $f2_1/f2_2=4.8249$, $|f2_4/f2|=9.6698$, $f2_6/f2=-3.0717$, $$(R2_{31}-R2_{32})/(R2_{31}+R2_{32})=-1.7228,$$

$$(R2_{51}-R2_{52})/(R2_{51}+R2_{52})=6.1716$$

which respectively satisfy the above conditions (9)-(16).

Figure 4A:
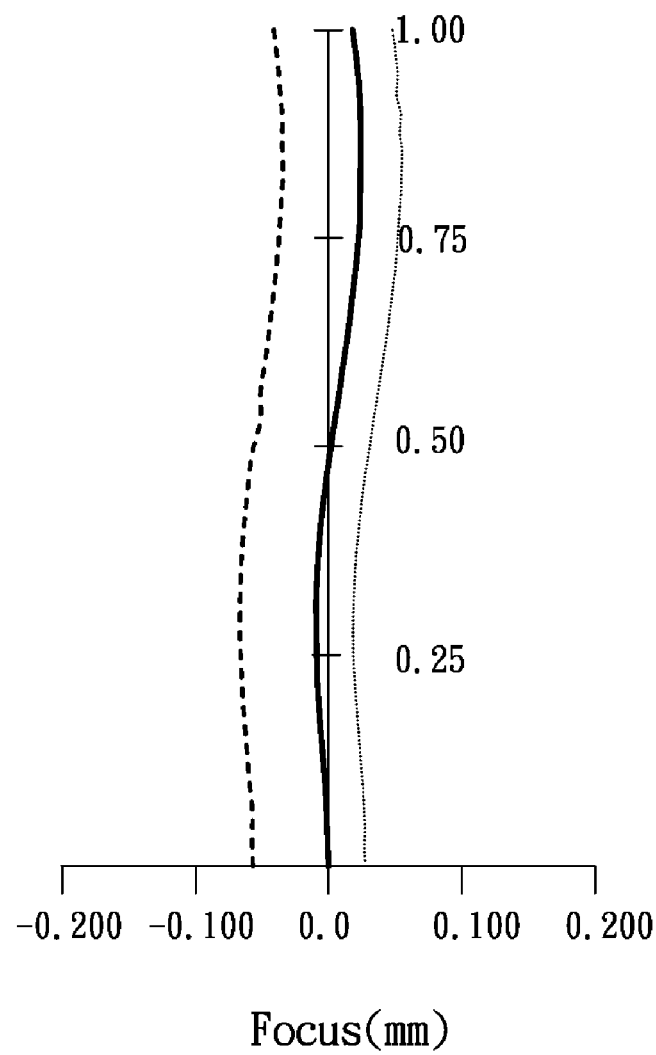
FIG. 4A depicts a longitudinal spherical aberration of the lens assembly in accordance with the second embodiment of the invention.
Figure 4B:
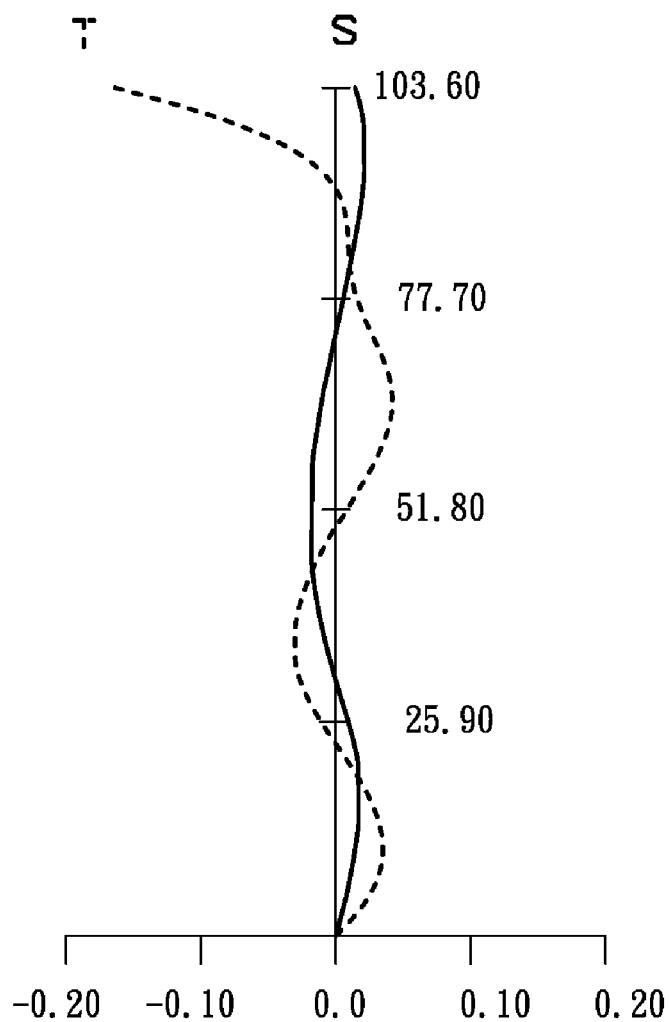
FIG. 4B is an astigmatic field curves diagram of the lens assembly in accordance with the second embodiment of the invention.
Figure 4C:
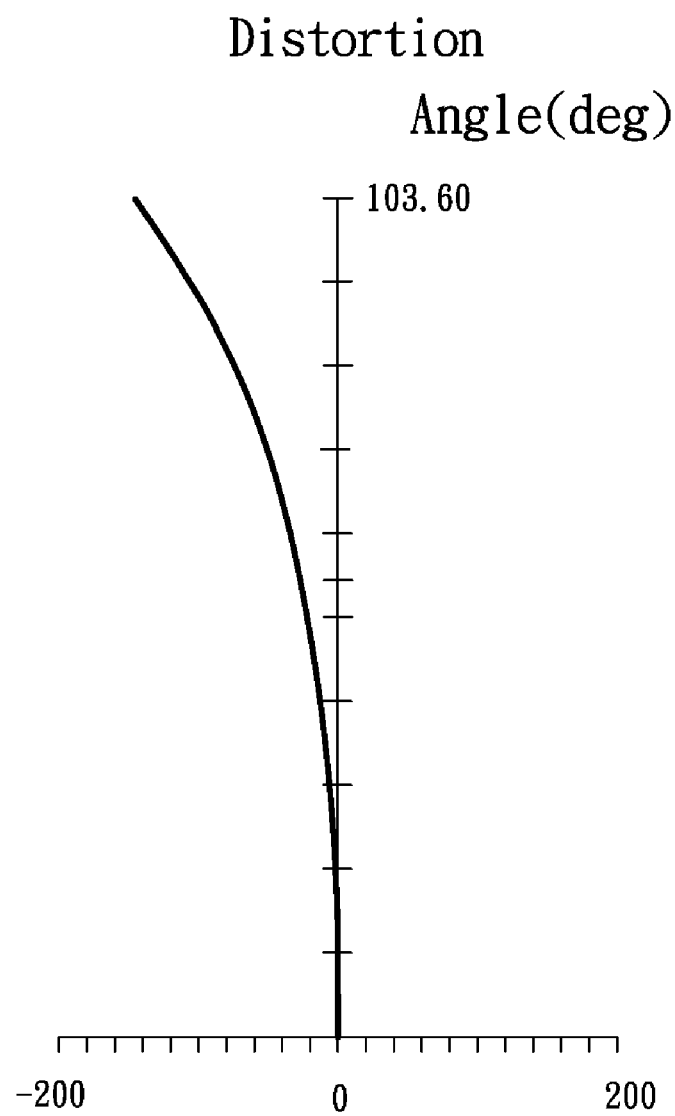
FIG. 4C is a distortion diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a longitudinal spherical aberration diagram of the lens assembly 2 in accordance with the second embodiment of the invention, FIG. 4B shows an astigmatic field curves of the lens assembly 2 in accordance with the second embodiment of the invention and FIG. 4C shows a distortion diagram of the lens assembly 2 in accordance with the second embodiment of the invention.

It can be seen from FIG. 4A that the longitudinal spherical aberration in the lens assembly 2 of the second embodiment ranges between −0.10 mm and 0.10 mm for the wavelength of 436.000 nm, 546.000 nm and 656.000 nm. It can be seen from FIG. 4B that the astigmatic field curves of tangential direction and sagittal direction in the lens assembly 2 of the second embodiment ranges between −0.20 mm and 0.05 mm for the wavelength of 546.000 nm. It can be seen from FIG. 4C that the distortion in the lens assembly 2 of the second embodiment ranges between −160% and 0% for the wavelength of 546.000 nm. It is obvious that the longitudinal spherical aberration, the astigmatic field curves and the distortion of the lens assembly 2 of the second embodiment can be corrected effectively. Therefore, the lens assembly 2 of the second embodiment is capable of good optical performance.

Figure 5:
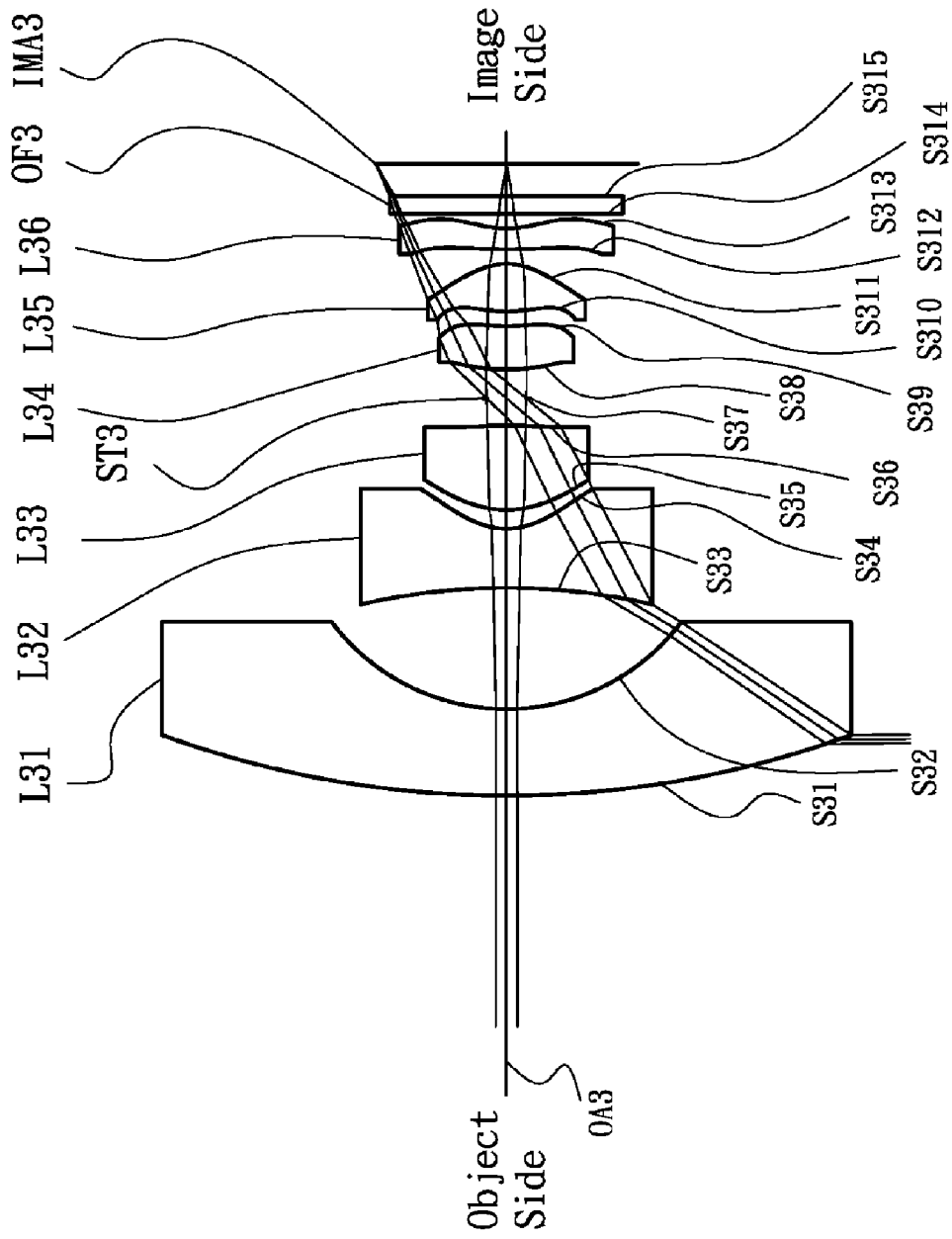
FIG. 5 is a lens layout and optical path diagram of a lens assembly in accordance with a third embodiment of the invention.

Referring to FIG. 5, FIG. 5 is a lens layout and optical path diagram of a lens assembly in accordance with a third embodiment of the invention. The lens assembly 3 includes a first lens L31, a second lens L32, a third lens L33, a stop ST3, a fourth lens L34, a fifth lens L35, a sixth lens L36 and an optical filter OF3, all of which are arranged in sequence from an object side to an image side along an optical axis OA3. In operation, an image of light rays from the object side is formed at an image plane IMA3. The stop ST3 can help to collect light effectively so as to increase the field of view. The first lens L31 is a meniscus lens, made of glass material and with negative refractive power, wherein the object side surface S31 is a convex surface, the image side surface S32 is a concave surface and both of the object side surface S31 and image side surface S32 are spherical surfaces. A spherical lens is easier for manufacture than aspheric lens so selecting a spherical lens as the first lens L31 is advantageous to cost reduction. The other reason for selecting a spherical lens as the first lens L31 is that the influence on the resolution of the lens assembly 3 will be smaller. The effective focal length of the lens assembly 3 can be reduced, the total lens length of the lens assembly 3 can be shortened and the resolution of the lens assembly 3 can be increased as the first lens L31 is made of glass material because the index of refraction of the glass material is larger than the plastic material. The second lens L32 is a biconcave lens, made of plastic material and with negative refractive power, wherein both of the object side surface S33 and image side surface S34 are aspheric surfaces. The third lens L33 is a biconvex lens, made of plastic material and with positive refractive power, wherein both of the object side surface S35 and image side surface S36 are aspheric surfaces. The fourth lens L34 is a meniscus lens, made of plastic material and with negative refractive power, wherein the object side surface S38 is a convex surface, the image side surface S39 is a concave surface and both of the object side surface S38 and image side surface S39 are aspheric surfaces. The fifth lens L35 is a biconvex lens, made of plastic material and with positive refractive power, wherein both of the object side surface S310 and image side surface S311 are aspheric surfaces. The sixth lens L36 is a meniscus lens, made of plastic material and with negative refractive power, wherein the object side surface S312 is a convex surface, the image side surface S313 is a concave surface and both of the object side surface S312 and image side surface S313 are aspheric surfaces. Both of the object side surface S314 and image side surface S315 of the optical filter OF3 are plane surfaces.

In order to maintain excellent optical performance of the lens assembly in accordance with the third embodiment of the invention, the lens assembly 3 must satisfies the following eight conditions:

$$0.078 \leq BFL3/TTL3 \leq 0.4 \qquad (17)$$

$$0.01 \leq f3/TTL3 \leq 0.2 \qquad (18)$$

$$(Nd3_1+Nd3_2+Nd3_3+Nd3_4+Nd3_5+Nd3_6)/6<(Nd3_2+Nd3_3)/2 \qquad (19)$$

$$3 \leq f3_1/f3_2 \leq 6 \qquad (20)$$

$$0.54<|f3_4/f3|<20 \qquad (21)$$

$$-20 \leq f3_6/f3 \leq 50 \qquad (22)$$

$$-10 \leq (R3_{31}-R3_{32})/(R3_{31}+R3_{32}) \leq 5 \qquad (23)$$

$$-70 \leq (R3_{51}-R3_{52})/(R3_{51}+R3_{52}) \leq 20 \qquad (24)$$

wherein BFL3 is a distance from the image side surface S313 of the sixth lens L36 to the image plane IMA3 along the optical axis OA3, $Nd3_1$ is an index of refraction of the first lens L31, $Nd3_2$ is an index of refraction of the second lens L32, $Nd3_3$ is an index of refraction of the third lens L33, $Nd3_4$ is an index of refraction of the fourth lens L34, $Nd3_5$ is an index of refraction of the fifth lens L35, $Nd3_6$ is an index of refraction of the sixth lens L36, f3 is an effective focal length of the lens assembly 3, TTL3 is a distance from the object side surface S31 of the first lens L31 to the image plane IMA3 along the optical axis OA3, f31 is an effective focal length of the first lens L31, $f3_2$ is an effective focal length of the second lens L32, $f3_4$ is an effective focal length of the fourth lens L34, $f3_6$ is an effective focal length of the sixth lens L36, $R3_{31}$ is a radius of curvature of the object side surface S35 of the third lens L33, $R3_{32}$ is a radius of curvature of the image side surface S36 of the third lens L33, $R3_{51}$ is a radius of curvature of the object side surface S310 of the fifth lens L35, and $R3_{52}$ is a radius of curvature of the image side surface S311 of the fifth lens L35. The BFL3 is longer as the lens assembly 3 satisfies condition (17). The longer the back focal length, the longer the focusing range. Thus, the sixth lens L36 stands little chance to collide with the optical filter OF3.

By the above design of the lenses and stop ST3, the lens assembly 3 is provided with a shortened total lens length, an increased field of view, an effective corrected aberration and an increased resolution.

In order to achieve the above purposes and effectively enhance the optical performance, the lens assembly 3 in accordance with the third embodiment of the invention is provided with the optical specifications shown in Table 5, which include the effective focal length, F-number, field of view, total lens length, radius of curvature of each lens surface, thickness between adjacent surface, refractive index of each lens and Abbe number of each lens. Table 5 shows that the effective focal length is equal to 1.0677 mm, F-number is equal to 2.8, field of view is equal to 180.7° and total lens length is equal to 10.919 mm for the lens assembly 3 of the third embodiment of the invention.

TABLE 5

Effective Focal Length = 1.0677 mm F-number = 2.8
Field of View = 180.7° Total Lens Length = 10.919 mm

| Surface Number | Radius of Curvature (mm) | Thickness (mm) | Nd | Vd | Remark |
|---|---|---|---|---|---|
| S31 | 17.597 | 1.502 | 1.583 | 59.4 | The First Lens L31 |
| S32 | 3.821 | 2.098 | | | |
| S33 | −9.106 | 1.023 | 1.535 | 55.7 | The Second Lens L32 |
| S34 | 1.212 | 0.329 | | | |
| S35 | 1.818 | 1.462 | 1.636 | 23.9 | The Third Lens L33 |
| S36 | −6.979 | 0.469 | | | |
| S37 | ∞ | 0.499 | | | Stop ST3 |
| S38 | 2.595 | 0.747 | 1.535 | 55.7 | The Fourth Lens L34 |
| S39 | 1.503 | 0.254 | | | |
| S310 | 1.314 | 0.827 | 1.535 | 55.7 | The Fifth Lens L35 |
| S311 | −1.107 | 0.251 | | | |
| S312 | 9.070 | 0.361 | 1.535 | 55.7 | The Sixth Lens L36 |
| S313 | 1.605 | 0.255 | | | |
| S314 | ∞ | 0.300 | 1.517 | 64.2 | Optical Filter OF3 |
| S315 | ∞ | 0.529 | | | |

The aspheric surface sag z of each lens in table 5 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the third embodiment, the conic constant k and the aspheric coefficients A, B, C, D, E of each surface are shown in Table 6.

TABLE 6

| Surface Number | k | A | B | C | D | E |
|---|---|---|---|---|---|---|
| S33 | −1.9819E+01 | 4.6415E−05 | −1.3334E−04 | −3.8455E−06 | 4.0195E−06 | −2.1427E−07 |
| S34 | −5.3335E−01 | −5.9861E−02 | −2.2449E−02 | 1.1656E−03 | 1.1429E−03 | −4.0696E−04 |
| S35 | −3.3057E−02 | −1.3981E−02 | −1.2778E−02 | −2.2626E−03 | 1.0448E−03 | −1.7308E−04 |
| S36 | −1.9042E+01 | 6.9144E−02 | −9.8242E−02 | 1.2128E−01 | −7.6861E−02 | 1.8096E−02 |
| S38 | −3.3306E+01 | 3.0698E−02 | −7.9512E−03 | −8.5601E−03 | 1.7832E−03 | −6.2233E−05 |
| S39 | −7.5252E+01 | −1.2509E−01 | −1.9026E−02 | −8.5583E−03 | 9.8157E−04 | −6.2233E−05 |
| S310 | −3.1995E+01 | −7.5992E−02 | −1.3853E−02 | −1.8360E−02 | −5.1216E−03 | −6.2233E−05 |
| S311 | −1.5256E+00 | 2.5146E−02 | 6.1938E−03 | 2.5435E−03 | −2.9201E−04 | −6.2233E−05 |
| S312 | 9.6844E+00 | −2.1231E−02 | −6.7460E−03 | 8.9000E−04 | −1.8957E−04 | 7.8409E−05 |
| S313 | −1.8379E+00 | −1.7094E−01 | 4.1269E−02 | −2.2677E−03 | −5.5572E−04 | 6.2233E−05 |

For the lens assembly 3 of the third embodiment, the distance BFL3 from the image side surface S313 of the sixth lens L36 to the image plane IMA3 along the optical axis OA3 is equal to 1.084 mm, the effective focal length f3 of the lens assembly 3 is equal to 1.0677 mm, the distance TTL3 from the object side surface S31 of the first lens L31 to the image plane IMA3 along the optical axis OA3 is equal to 10.919 mm, the index of refraction $Nd3_1$ of the first lens L31 is equal to 1.583, the index of refraction $Nd3_2$ of the second lens L32 is equal to 1.535, the index of refraction $Nd3_3$ of the third lens L33 is equal to 1.636, the index of refraction $Nd3_4$ of the fourth lens L34 is equal to 1.535, the index of refraction $Nd3_5$ of the fifth lens L35 is equal to 1.535, the index of refraction $Nd3_6$ of the sixth lens L36 is equal to 1.535, the effective focal length f31 of the first lens L31 is equal to −8.68560 mm, the effective focal length $f3_2$ of the second lens L32 is equal to −1.92412 mm, the effective focal length $f3_3$ of the third lens L33 is equal to 2.40349 mm, the effective focal length $f3_4$ of the fourth lens L34 is equal to −8.7391 mm, the effective focal length $f3_5$ of the fifth lens L35 is equal to 1.26991 mm, the effective focal length $f3_6$ of the sixth lens L36 is equal to −3.69033 mm, the radius of curvature $R3_{31}$ of the object side surface S35 of the third lens L33 is equal to 1.81783 mm, the radius of curvature $R3_{32}$ of the image side surface S36 of the third lens L33 is equal to −6.97855 mm, the radius of curvature $R3_{51}$ of the object side surface S310 of the fifth lens L35 is equal to 1.31412 mm, and the radius of curvature $R3_{52}$ of the image side surface S311 of the fifth lens L35 is equal to −1.10712 mm. According to the above data, the following values can be obtained:

$BFL3/TTL3 = 0.099$ $f3/TTL3 = 0.0978$, $(Nd3_1 + Nd3_2 + Nd3_3 + Nd3_4 + Nd3_5 + Nd3_6)/6 = 1.560$, $(Nd3_2 + Nd3_3)/2 = 1.586$, $f3_1/f3_2 = 4.5141$, $|f3_4/f3| = 8.1850$, $f3_6/f3 = -3.4564$, $(R3_{31} - R3_{32})/(R3_{31} + R3_{32}) = -1.7045$, $(R3_{51} - R3_{52})/(R3_{51} + R3_{52}) = 11.6968$ which respectively satisfy the above conditions (17)-(24).

Figure 6A:
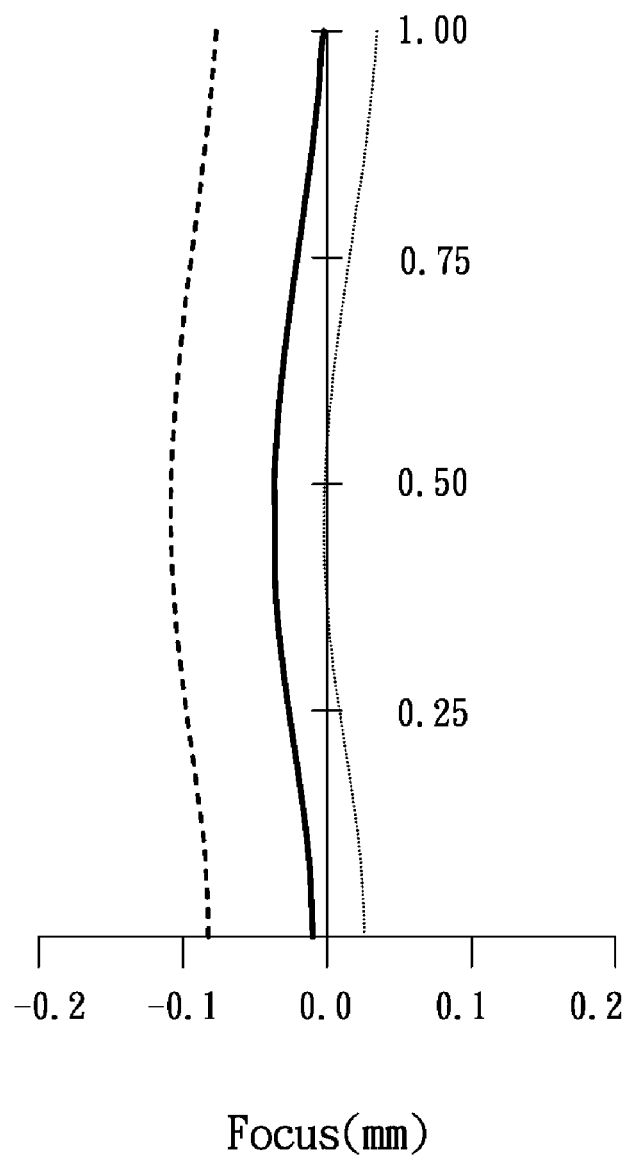
FIG. 6A depicts a longitudinal spherical aberration of the lens assembly in accordance with the third embodiment of the invention.
Figure 6B:
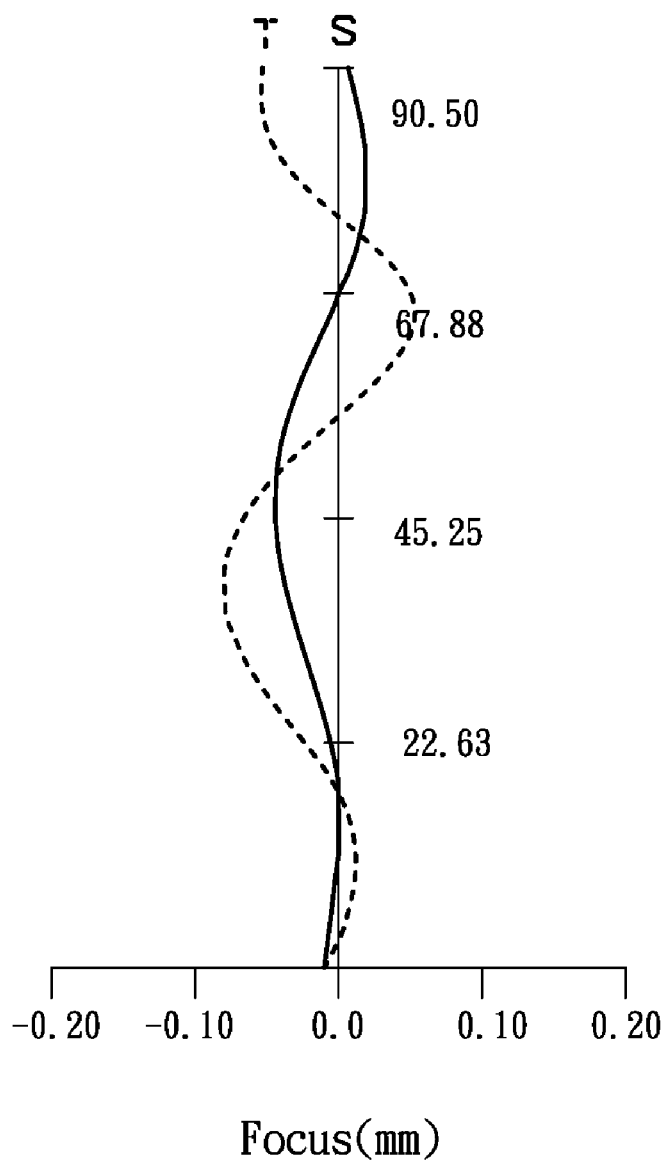
FIG. 6B is an astigmatic field curves diagram of the lens assembly in accordance with the third embodiment of the invention.
Figure 6C:
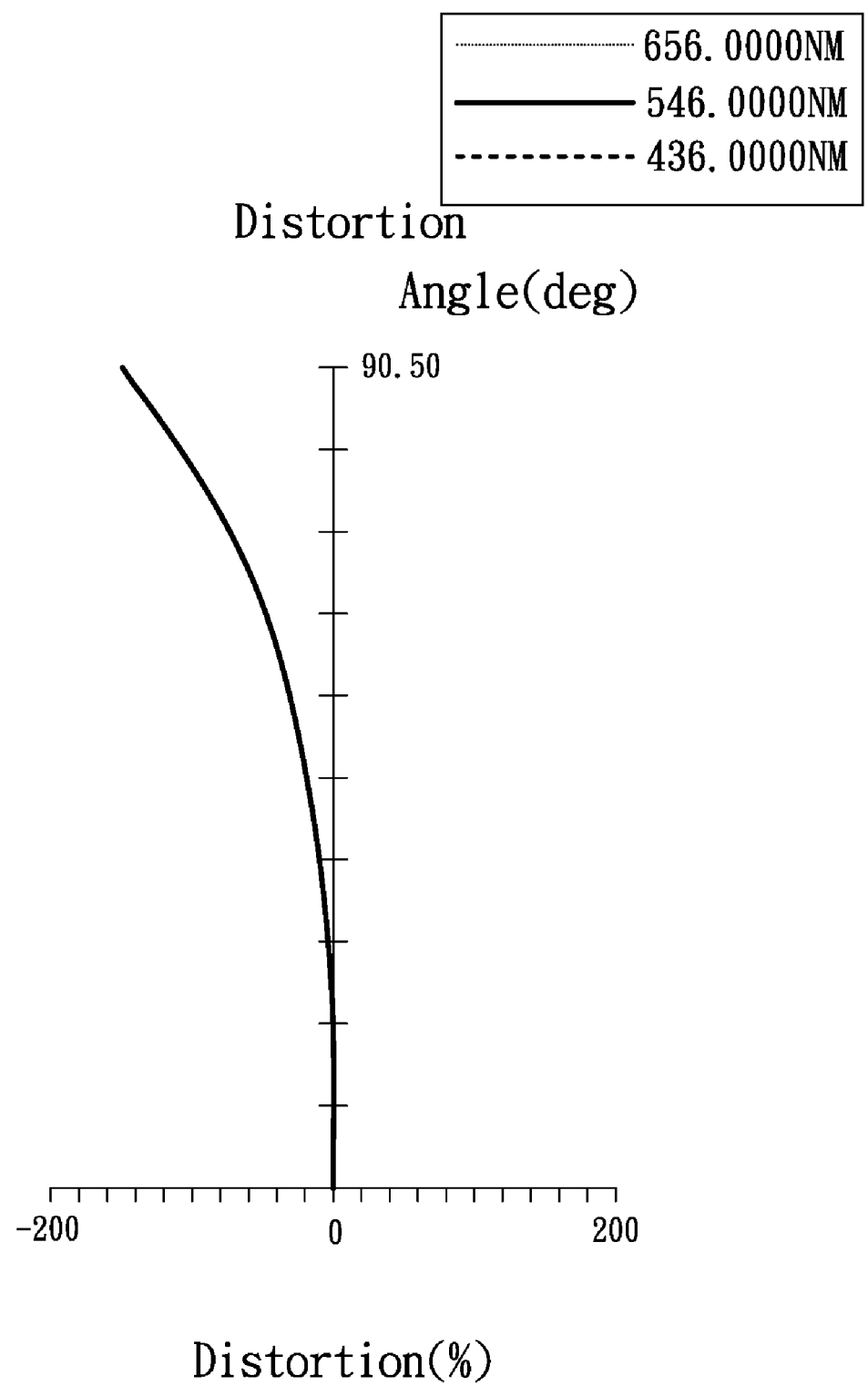
FIG. 6C is a distortion diagram of the lens assembly in accordance with the third embodiment of the invention.

By the above arrangements of the lenses and stop ST3, the lens assembly 3 of the third embodiment can meet the requirements of optical performance as seen in FIGS. 6A-6C, wherein FIG. 6A shows a longitudinal spherical aberration diagram of the lens assembly 3 in accordance with the third embodiment of the invention, FIG. 6B shows an astigmatic field curves of the lens assembly 3 in accordance with the third embodiment of the invention and FIG. 6C shows a distortion diagram of the lens assembly 3 in accordance with the third embodiment of the invention.

It can be seen from FIG. 6A that the longitudinal spherical aberration in the lens assembly 3 of the third embodiment ranges between −0.15 mm and 0.05 mm for the wavelength of 436.000 nm, 546.000 nm and 656.000 nm. It can be seen from FIG. 6B that the astigmatic field curves of tangential direction and sagittal direction in the lens assembly 3 of the third embodiment ranges between −0.10 mm and 0.05 mm for the wavelength of 546.000 nm. It can be seen from FIG.

6C that the distortion in the lens assembly 3 of the third embodiment ranges between −160% and 0% for the wavelength of 546.000 nm. It is obvious that the longitudinal spherical aberration, the astigmatic field curves and the distortion of the lens assembly 3 of the third embodiment can be corrected effectively. Therefore, the lens assembly 3 of the third embodiment is capable of good optical performance.

Figure 7:
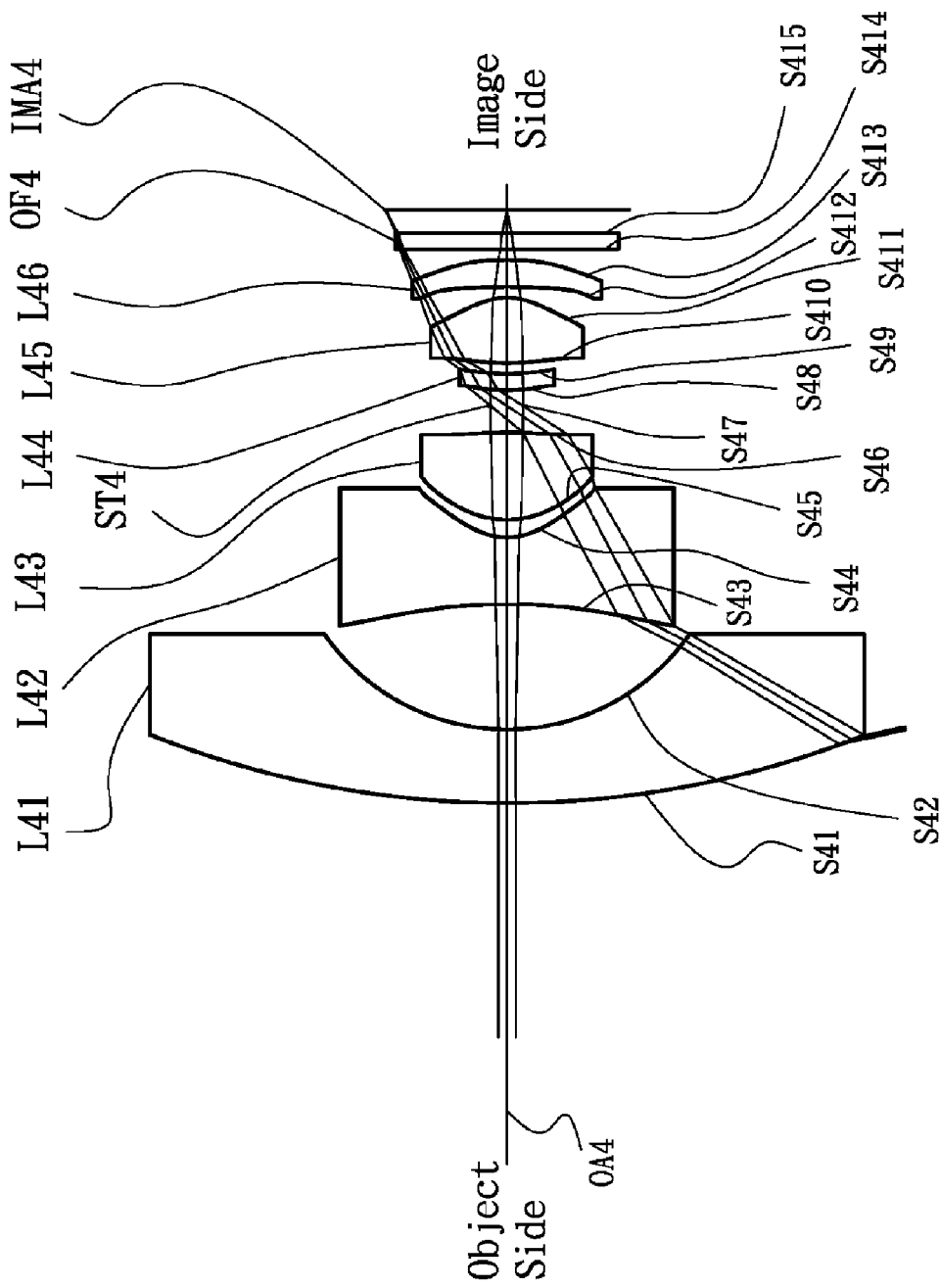
FIG. 7 is a lens layout and optical path diagram of a lens assembly in accordance with a fourth embodiment of the invention.

Referring to FIG. 7, FIG. 7 is a lens layout and optical path diagram of a lens assembly in accordance with a fourth embodiment of the invention. The lens assembly 4 includes a first lens L41, a second lens L42, a third lens L43, a stop ST4, a fourth lens L44, a fifth lens L45, a sixth lens L46 and an optical filter OF4, all of which are arranged in sequence from an object side to an image side along an optical axis OA4. In operation, an image of light rays from the object side is formed at an image plane IMA4. The stop ST4 can help to collect light effectively so as to increase the field of view. The first lens L41 is a meniscus lens, made of glass material and with negative refractive power, wherein the object side surface S41 is a convex surface, the image side surface S42 is a concave surface and both of the object side surface S41 and image side surface S42 are spherical surfaces. A spherical lens is easier for manufacture than aspheric lens so selecting a spherical lens as the first lens L41 is advantageous to cost reduction. The other reason for selecting a spherical lens as the first lens L41 is that the influence on the resolution of the lens assembly 4 will be smaller. The effective focal length of the lens assembly 4 can be reduced, the total lens length of the lens assembly 4 can be shortened and the resolution of the lens assembly 4 can be increased as the first lens L41 is made of glass material because the index of refraction of the glass material is larger than the plastic material. The second lens L42 is a biconcave lens, made of plastic material and with negative refractive power, wherein both of the object side surface S43 and image side surface S44 are aspheric surfaces. The third lens L43 is a biconvex lens, made of plastic material and with positive refractive power, wherein both of the object side surface S45 and image side surface S46 are aspheric surfaces. The fourth lens L44 is a meniscus lens, made of plastic material and with negative refractive power, wherein the object side surface S48 is a convex surface, the image side surface S49 is a concave surface and both of the object side surface S48 and image side surface S49 are aspheric surfaces. The fifth lens L45 is a biconvex lens, made of plastic material and with positive refractive power, wherein both of the object side surface S410 and image side surface S411 are aspheric surfaces. The sixth lens L46 is a meniscus lens, made of plastic material and with positive refractive power, wherein the object side surface S412 is a concave surface, the image side surface S413 is a convex surface and both of the object side surface S412 and image side surface S413 are aspheric surfaces. Both of the object side surface S414 and image side surface S415 of the optical filter OF4 are plane surfaces.

In order to maintain excellent optical performance of the lens assembly in accordance with the fourth embodiment of the invention, the lens assembly 4 must satisfies the following eight conditions:

$$0.078 \leq BFL4/TTL4 \leq 0.4 \quad (25)$$

$$0.01 \leq f4/TTL4 \leq 0.2 \quad (26)$$

$$(Nd4_1+Nd4_2+Nd4_3+Nd4_4+Nd4_5+Nd4_6)/6 < (Nd4_2+Nd4_3)/2 \quad (27)$$

$$3 \leq f4_6/f4_2 \leq 6 \quad (28)$$

$$0.54 \leq |f4_4/f4| \leq 20 \quad (29)$$

$$-20 \leq f4_6/f4 \leq 50 \quad (30)$$

$$-10 \leq (R4_{31}-R4_{32})/(R4_{31}+R4_{32}) \leq 5 \quad (31)$$

$$-70 \leq (R4_{51}-R4_{52})/(R4_{51}+R4_{52}) \leq 20 \quad (32)$$

wherein BFL4 is a distance from the image side surface S413 of the sixth lens L46 to the image plane IMA4 along the optical axis OA4, $Nd4_1$ is an index of refraction of the first lens L41, $Nd4_2$ is an index of refraction of the second lens L42, $Nd4_3$ is an index of refraction of the third lens L43, $Nd4_4$ is an index of refraction of the fourth lens L44, $Nd4_5$ is an index of refraction of the fifth lens L45, $Nd4_6$ is an index of refraction of the sixth lens L46, f4 is an effective focal length of the lens assembly 4, TTL4 is a distance from the object side surface S41 of the first lens L41 to the image plane IMA4 along the optical axis OA4, $f4_1$ is an effective focal length of the first lens L41, $f4_2$ is an effective focal length of the second lens L42, $f4_4$ is an effective focal length of the fourth lens L44, $f4_6$ is an effective focal length of the sixth lens L46, $R4_{31}$ is a radius of curvature of the object side surface S45 of the third lens L43, $R4_{32}$ is a radius of curvature of the image side surface S46 of the third lens L43, $R4_{51}$ is a radius of curvature of the object side surface S410 of the fifth lens L45, and $R4_{52}$ is a radius of curvature of the image side surface S411 of the fifth lens L45. The BFL4 is longer as the lens assembly 4 satisfies condition (25). The longer the back focal length, the longer the focusing range. Thus, the sixth lens L46 stands little chance to collide with the optical filter OF4.

By the above design of the lenses and stop ST4, the lens assembly 4 is provided with a shortened total lens length, an increased field of view, an effective corrected aberration and an increased resolution.

In order to achieve the above purposes and effectively enhance the optical performance, the lens assembly 4 in accordance with the fourth embodiment of the invention is provided with the optical specifications shown in Table 7, which include the effective focal length, F-number, field of view, total lens length, radius of curvature of each lens surface, thickness between adjacent surface, refractive index of each lens and Abbe number of each lens. Table 7 shows that the effective focal length is equal to 0.8462 mm, F-number is equal to 2.6, field of view is equal to 205.4° and total lens length is equal to 11.000 mm for the lens assembly 4 of the fourth embodiment of the invention.

TABLE 7

Effective Focal Length = 0.8462 mm F-number = 2.6
Field of View = 205.4° Total Lens Length = 11.000 mm

| Surface Number | Radius of Curvature (mm) | Thickness (mm) | Nd | Vd | Remark |
|---|---|---|---|---|---|
| S41 | 18.331 | 1.366 | 1.583 | 59.4 | The First Lens L41 |
| S42 | 4.169 | 2.339 | | | |
| S43 | −8.753 | 1.236 | 1.535 | 55.7 | The Second Lens L42 |
| S44 | 1.195 | 0.328 | | | |
| S45 | 1.790 | 1.627 | 1.636 | 23.9 | The Third Lens L43 |
| S46 | −5.250 | 0.491 | | | |
| S47 | ∞ | 0.294 | | | Stop ST4 |
| S48 | 2.351 | 0.299 | 1.535 | 55.7 | The Fourth Lens L44 |
| S49 | 1.563 | 0.200 | | | |
| S410 | 2.295 | 1.222 | 1.636 | 23.9 | The Fifth Lens L45 |
| S411 | −1.158 | 0.200 | | | |

TABLE 7-continued

Effective Focal Length = 0.8462 mm F-number = 2.6
Field of View = 205.4° Total Lens Length = 11.000 mm

| Surface Number | Radius of Curvature (mm) | Thickness (mm) | Nd | Vd | Remark |
|---|---|---|---|---|---|
| S412 | −11.006 | 0.500 | 1.535 | 55.7 | The Sixth Lens L46 |
| S413 | −6.862 | 0.200 | | | |
| S414 | ∞ | 0.300 | 1.517 | 64.2 | Optical Filter OF4 |
| S415 | ∞ | 0.390 | | | |

The aspheric surface sag z of each lens in table 7 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the fourth embodiment, the conic constant k and the aspheric coefficients A, B, C, D, E of each surface are shown in Table 8.

TABLE 8

| Surface Number | k | A | B | C | D | E |
|---|---|---|---|---|---|---|
| S43 | −2.8913E+01 | −5.9776E−04 | −1.5556E−04 | −4.0771E−06 | 4.1586E−06 | −2.1427E−07 |
| S44 | −5.3730E−01 | −5.6856E−02 | −2.0985E−02 | 1.2716E−03 | 1.0473E−03 | −4.0696E−04 |
| S45 | 2.8579E−02 | 1.9815E−04 | −1.3203E−02 | −2.2915E−03 | 1.1131E−03 | −1.7308E−04 |
| S46 | −3.5292E+01 | 6.9103E−02 | −1.0082E−01 | 1.2052E−01 | −7.5758E−02 | 1.8096E−02 |
| S48 | −7.9458E+01 | 4.1315E−02 | 1.8112E−02 | 3.9485E−02 | 3.5339E−02 | −6.2233E−05 |
| S49 | −6.9891E+01 | −6.7054E−02 | 4.5176E−02 | 3.7330E−02 | 3.3604E−02 | −6.2233E−05 |
| S410 | −8.8266E+01 | −2.4598E−03 | 3.6591E−03 | −5.4205E−03 | 2.9005E−03 | −6.2233E−05 |
| S411 | −2.1865E+00 | 3.1217E−02 | 6.4692E−03 | 2.7873E−03 | −7.6262E−04 | −6.2233E−05 |
| S412 | 4.1616E+01 | 3.2493E−02 | −2.6007E−02 | 5.0473E−03 | −3.8523E−04 | 7.8409E−05 |
| S413 | −3.0149E−01 | −7.9268E−02 | 3.4256E−02 | −3.0260E−03 | −7.0613E−04 | 6.2233E−05 |

For the lens assembly 4 of the fourth embodiment, the distance BFL4 from the image side surface S413 of the sixth lens L46 to the image plane IMA4 along the optical axis OA4 is equal to 0.890 mm, the index of refraction $Nd4_1$ of the first lens L41 is equal to 1.583, the index of refraction $Nd4_2$ of the second lens L42 is equal to 1.535, the index of refraction $Nd4_3$ of the third lens L43 is equal to 1.636, the index of refraction $Nd4_4$ of the fourth lens L44 is equal to 1.535, the index of refraction $Nd4_5$ of the fifth lens L45 is equal to 1.636, the index of refraction $Nd4_6$ of the sixth lens L46 is equal to 1.535, the effective focal length f4 of the lens assembly 4 is equal to 0.8462 mm, the distance TTL4 from the object side surface S41 of the first lens L41 to the image plane IMA4 along the optical axis OA4 is equal to 11.000 mm, the effective focal length $f4_1$ of the first lens L41 is equal to −9.55820 mm, the effective focal length $f4_2$ of the second lens L42 is equal to −1.87508 mm, the effective focal length $f4_3$ of the third lens L43 is equal to 2.28624 mm, the effective focal length $f4_4$ of the fourth lens L44 is equal to −9.9999 mm, the effective focal length $f4_5$ of the fifth lens L45 is equal to 1.39226 mm, the effective focal length $f4_6$ of the sixth lens L46 is equal to 32.54607 mm, the radius of curvature $R4_{31}$ of the object side surface S45 of the third lens L43 is equal to 1.78951 mm, the radius of curvature $R4_{32}$ of the image side surface S46 of the third lens L43 is equal to −5.25030 mm, the radius of curvature $R4_{51}$ of the object side surface S410 of the fifth lens L45 is equal to 2.29497 mm, and the radius of curvature $R4_{52}$ of the image side surface S411 of the fifth lens L45 is equal to −1.15849 mm. According to the above data, the following values can be obtained:

$BFL4/TTL4 = 0.081$ $f4/TTL4 = 0.0769$, $(Nd4_1 + Nd4_2 + Nd4_3 + Nd4_4 + Nd4_5 + Nd4_6)/6 = 1.577$, $(Nd4_2 + Nd4_3)/2 = 1.586$, $f4_1/f4_2 = 5.0975$, $|f4_4/f4| = 11.8173$, $f4_6/f4 = 38.4608$, $(R4_{31} − R4_{32})/(R4_{31} + R4_{32}) = −2.0342$, $(R4_{51} − R4_{52})/(R4_{51} + R4_{52}) = 3.0387$ which respectively satisfy the above conditions (25)-(32).

Figure 8A:
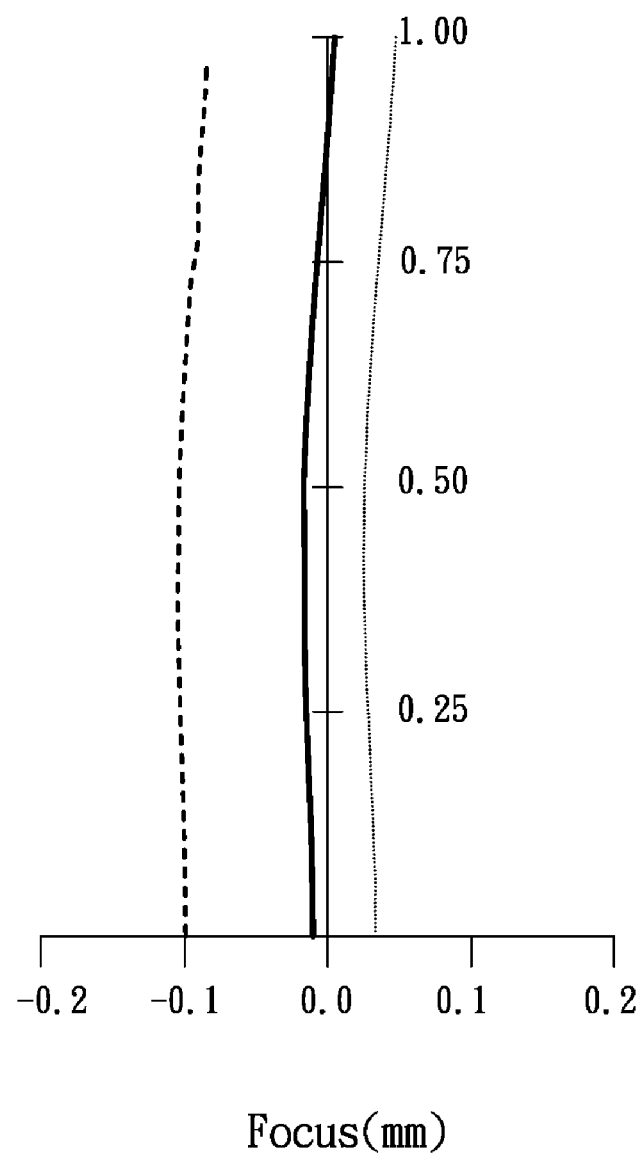
FIG. 8A depicts a longitudinal spherical aberration of the lens assembly in accordance with the fourth embodiment of the invention.
Figure 8B:
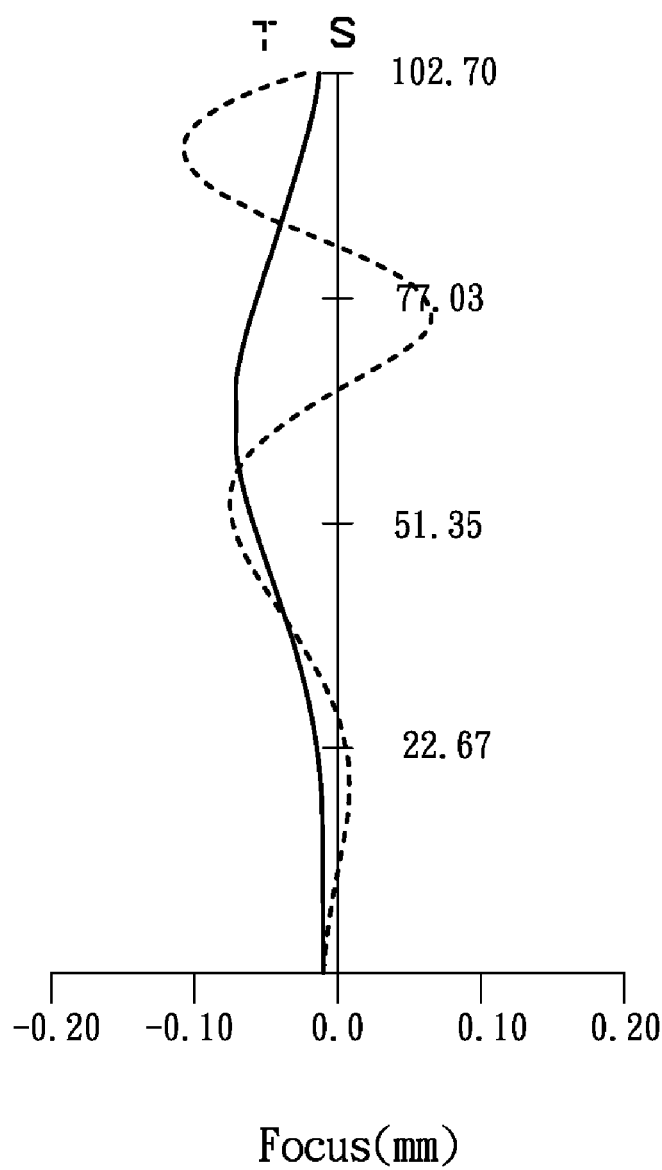
FIG. 8B is an astigmatic field curves diagram of the lens assembly in accordance with the fourth embodiment of the invention.
Figure 8C:
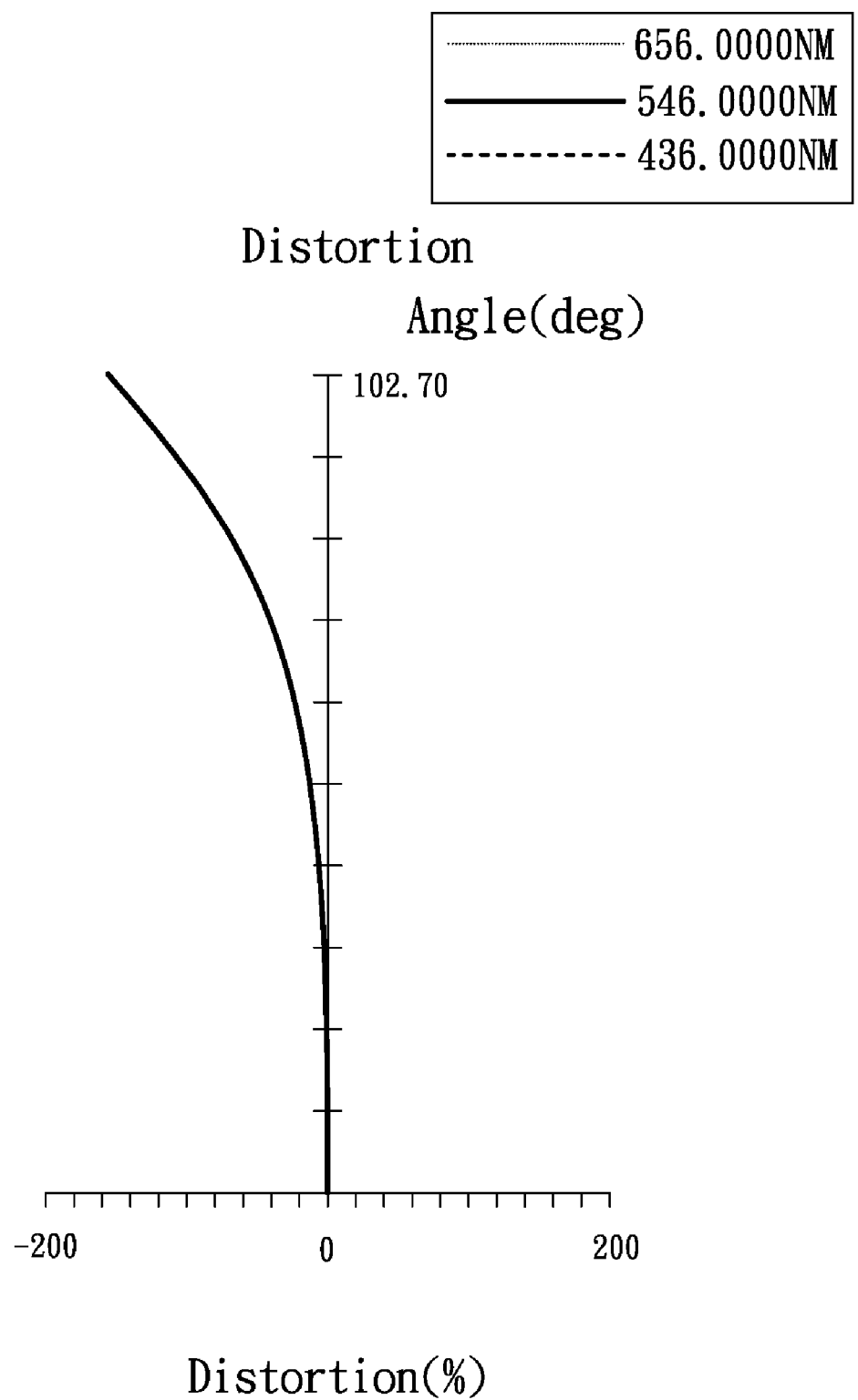
FIG. 8C is a distortion diagram of the lens assembly in accordance with the fourth embodiment of the invention.

By the above arrangements of the lenses and stop ST4, the lens assembly 4 of the fourth embodiment can meet the requirements of optical performance as seen in FIGS. 8A-8C, wherein FIG. 8A shows a longitudinal spherical aberration diagram of the lens assembly 4 in accordance with the fourth embodiment of the invention, FIG. 8B shows an astigmatic field curves of the lens assembly 4 in accordance with the fourth embodiment of the invention and FIG. 8C shows a distortion diagram of the lens assembly 4 in accordance with the fourth embodiment of the invention.

It can be seen from FIG. 8A that the longitudinal spherical aberration in the lens assembly 4 of the fourth embodiment ranges between −0.15 mm and 0.05 mm for the wavelength of 436.000 nm, 546.000 nm and 656.000 nm. It can be seen from FIG. 8B that the astigmatic field curves of tangential direction and sagittal direction in the lens assembly 4 of the fourth embodiment ranges between −0.15 mm and 0.10 mm for the wavelength of 546.000 nm. It can be seen from FIG. 8C that the distortion in the lens assembly 4 of the fourth embodiment ranges between −160% and 0% for the wavelength of 546.000 nm. It is obvious that the longitudinal spherical aberration, the astigmatic field curves and the distortion of the lens assembly 4 of the fourth embodiment can be corrected effectively. Therefore, the lens assembly 4 of the fourth embodiment is capable of good optical performance.

Figure 9:
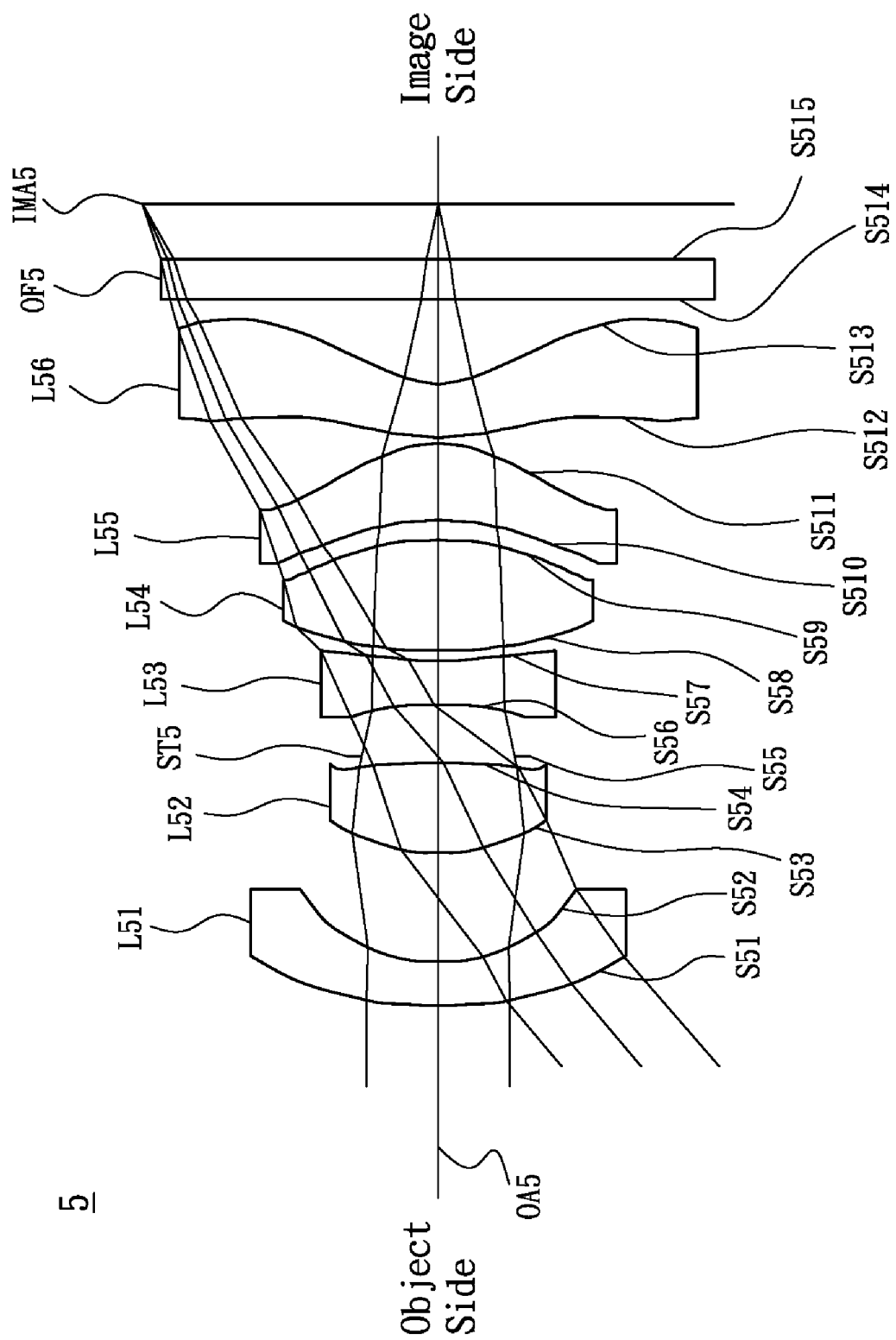
FIG. 9 is a lens layout and optical path diagram of a lens assembly in accordance with a fifth embodiment of the invention.

Referring to FIG. 9, FIG. 9 is a lens layout and optical path diagram of a lens assembly in accordance with a fifth embodiment of the invention. The lens assembly 5 includes a first lens L51, a second lens L52, a stop ST5, a third lens L53, a fourth lens L54, a fifth lens L55, a sixth lens L56 and an Optical filter OF5, all of which are arranged in sequence from an object side to an image side along an optical axis OA5. In operation, an image of light rays from the object side is formed at an image plane IMA5. The stop ST5 can help to collect light effectively so as to increase the field of view. The first lens L51 is a meniscus lens, made of plastic material and with negative refractive power, wherein the object side surface S51 is a convex surface, the image side surface S52 is a concave surface and both of the object side surface S51 and image side surface S52 are aspheric surfaces. The second lens L52 is a biconvex lens, made of plastic material and with positive refractive power, wherein both of the object side surface S53 and image side surface S54 are aspheric surfaces. The third lens L53 is a biconcave lens, made of plastic material and with negative refractive power, wherein both of the object side surface S56 and image side surface S57 are aspheric surfaces. The fourth lens L54 is a biconvex lens, made of plastic material and with positive refractive power, wherein both of the object side surface S58 and image side surface S59 are aspheric surfaces. The fifth lens L55 is a meniscus lens, made of plastic material and with positive refractive power, wherein the object side surface S510 is a concave surface, the image side surface S511 is a convex surface and both of the object side surface S510 and image side surface S511 are aspheric surfaces. The sixth lens L56 is a meniscus lens, made of plastic material and with negative refractive power, wherein the object side surface S512 is a convex surface, the image side surface S513 is a concave surface and both of the object side surface S512 and image side surface S513 are aspheric surfaces. Both of the object side surface S514 and image side surface S515 of the optical filter OF5 are plane surfaces.

In order to maintain excellent optical performance of the lens assembly in accordance with the fifth embodiment of the invention, the lens assembly 5 must satisfies the following six conditions:

$$0.078 \leq BFL5/TTL5 \leq 0.4 \quad (33)$$

$$0.4 \leq f5/TTL5 \leq 0.5 \quad (34)$$

$$(Nd5_1+Nd5_2+Nd5_3+Nd5_4+Nd5_5+Nd5_6)/6 < (Nd5_2+Nd5_3)/2 \quad (35)$$

$$2 \leq f5_1/f5_6 \leq 5 \quad (36)$$

$$-3 \leq (R5_{21}-R5_{22})/(R5_{21}+R5_{22}) \leq -1 \quad (37)$$

$$-1 \leq (R5_{41}-R5_{42})/(R5_{41}+R5_{42}) \leq 20 \quad (38)$$

wherein BFL5 is a distance from the image side surface S513 of the sixth lens L56 to the image plane IMA5 along the optical axis OA5, f5 is an effective focal length of the lens assembly 5, TTL5 is a distance from the object side surface S51 of the first lens L51 to the image plane IMA5 along the optical axis OA5, $Nd5_1$ is an index of refraction of the first lens L51, $Nd5_2$ is an index of refraction of the second lens L52, $Nd5_3$ is an index of refraction of the third lens L53, $Nd5_4$ is an index of refraction of the fourth lens L54, $Nd5_5$ is an index of refraction of the fifth lens L55, $Nd5_6$ is an index of refraction of the sixth lens L56, $f5_1$ is an effective focal length of the first lens L51, $f5_6$ is an effective focal length of the sixth lens L56, $R5_{21}$ is a radius of curvature of the object side surface S53 of the second lens L52, $R5_{22}$ is a radius of curvature of the image side surface S54 of the second lens L52, $R5_{31}$ is a radius of curvature of the object side surface S56 of the third lens L53, $R5_{32}$ is a radius of curvature of the image side surface S57 of the third lens L53, $R5_{41}$ is a radius of curvature of the object side surface S58 of the fourth lens L54, $R5_{42}$ is a radius of curvature of the image side surface S59 of the fourth lens L54, $R5_{51}$ is a radius of curvature of the object side surface S510 of the fifth lens L55, and $R5_{52}$ is a radius of curvature of the image side surface S511 of the fifth lens L55. The BFL5 is longer as the lens assembly 5 satisfies condition (33). The longer the back focal length, the longer the focusing range. Thus, the sixth lens L56 stands little chance to collide with the optical filter OF5.

By the above design of the lenses and stop ST5, the lens assembly 5 is provided with a shortened total lens length, an increased field of view, an effective corrected aberration and an increased resolution.

In order to achieve the above purposes and effectively enhance the optical performance, the lens assembly 5 in accordance with the fifth embodiment of the invention is provided with the optical specifications shown in Table 9, which include the effective focal length, F-number, field of view, total lens length, radius of curvature of each lens surface, thickness between adjacent surface, refractive index of each lens and Abbe number of each lens. Table 9 shows that the effective focal length is equal to 1.7974 mm, F-number is equal to 2.4, field of view is equal to 80° and total lens length is equal to 4.198 mm for the lens assembly 5 of the fifth embodiment of the invention.

TABLE 9

Effective Focal Length = 1.7974 mm F-number = 2.4
Field of View = 80° Total Lens Length = 4.198 mm

| Surface Number | Radius of Curvature (mm) | Thickness (mm) | Nd | Vd | Remark |
|---|---|---|---|---|---|
| S51 | 2.518 | 0.232 | 1.535 | 56.1 | The First Lens L51 |
| S52 | 1.016 | 0.569 | | | |
| S53 | 1.026 | 0.473 | 1.535 | 56.1 | The Second Lens L52 |
| S54 | −4.000 | 0.030 | | | |
| S55 | ∞ | 0.271 | | | Stop ST5 |
| S56 | −4.000 | 0.230 | 1.636 | 23.9 | The Third Lens L53 |
| S57 | 1.751 | 0.054 | | | |
| S58 | 2.376 | 0.580 | 1.535 | 56.1 | The Fourth Lens L54 |
| S59 | −1.639 | 0.103 | | | |
| S510 | −1.419 | 0.405 | 1.535 | 56.1 | The Fifth Lens L55 |
| S511 | −0.527 | 0.030 | | | |
| S512 | 1.131 | 0.279 | 1.535 | 56.1 | The Sixth Lens L56 |
| S513 | 0.389 | 0.442 | | | |
| S514 | ∞ | 0.210 | 1.517 | 64.2 | Optical Filter OF5 |
| S515 | ∞ | 0.290 | | | |

The aspheric surface sag z of each lens in table 9 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the fifth embodiment, the conic constant k and the aspheric coefficients A, B, C, D, E, F, G of each surface are shown in Table 10.

TABLE 10

| | \multicolumn{6}{c}{Surface Number} | | | | | |
|---|---|---|---|---|---|---|
| | S51 | S52 | S53 | S54 | S56 | S57 |
| k | −1.3757E−01 | 0.0000E+00 | 0.0000E+00 | 0.0000E+00 | 0.0000E+00 | −1.3879E+01 |
| A | 1.0692E−01 | 1.8869E−01 | 2.4337E−03 | −8.5823E−02 | −8.4821E−01 | −2.5685E−01 |
| B | −1.0944E−01 | −1.9638E−01 | 4.1909E−01 | −7.4269E−01 | 5.7472E−01 | 3.6153E−01 |
| C | 1.7359E−01 | 1.1439E+00 | −2.9366E+00 | 5.0678E+00 | −4.1976E+00 | −5.8624E−01 |
| D | −9.3876E−02 | −1.2186E+00 | 9.5366E+00 | −4.9739E+00 | 3.5725E+00 | 3.2658E−01 |
| E | −1.3196E−01 | 2.0556E−01 | −1.5796E+00 | −3.9038E+01 | 7.7512E−01 | −1.9948E−01 |
| F | 1.9516E−01 | 6.8183E−01 | −6.7230E+01 | −3.5221E+02 | 8.6848E+01 | −1.1340E+00 |
| G | −7.4438E−02 | 1.3820E+00 | 9.9266E+01 | 1.7718E+03 | −4.6785E+02 | 2.0693E+00 |

| | \multicolumn{6}{c}{Surface Number} | | | | | |
|---|---|---|---|---|---|---|
| | S58 | S59 | S510 | S511 | S512 | S513 |
| k | 0.0000E+00 | −1.0207E+01 | −1.2101E+01 | −4.2333E+00 | −7.0276E+00 | −3.8082E+00 |
| A | −4.4343E−02 | −4.5777E−01 | −4.1776E−01 | −2.9439E−01 | −2.7037E−01 | −2.1480E−01 |
| B | 8.6880E−02 | 4.3816E−01 | 5.0769E−01 | 4.6237E−01 | 1.4033E−01 | 1.3195E−01 |
| C | 1.2706E−01 | −9.6764E−02 | −1.2086E−01 | −1.3263E−01 | −2.1054E−02 | −6.5050E−02 |
| D | −2.0089E−01 | 7.5681E−02 | −3.9972E−02 | −8.0593E−03 | −2.5872E−02 | 9.2537E−03 |
| E | 2.0451E−02 | 1.9804E−01 | 5.8785E−02 | 1.1916E−01 | 1.1549E−02 | 2.0831E−03 |
| F | 1.7819E−01 | 2.1611E−02 | −3.4241E−02 | 3.7854E−02 | 1.0773E−02 | −6.0844E−04 |
| G | −5.6613E−02 | −1.4001E−01 | −1.4812E−01 | −1.1586E−01 | −5.2248E−03 | 1.8154E−04 |

For the lens assembly 5 of the fifth embodiment, the distance BFL5 from the image side surface S513 of the sixth lens L56 to the image plane IMA5 along the optical axis OA5 is equal to 0.942 mm, the effective focal length f5 of the lens assembly 5 is equal to 1.7974 mm, the distance TTL5 from the object side surface S51 of the first lens L51 to the image plane IMA5 along the optical axis OA5 is equal to 4.198 mm, the index of refraction $Nd5_1$ of the first lens L51 is equal to 1.535, the index of refraction $Nd5_2$ of the second lens L52 is equal to 1.535, the index of refraction $Nd5_3$ of the third lens L53 is equal to 1.636, the index of refraction $Nd5_4$ of the fourth lens L54 is equal to 1.535, the index of refraction $Nd5_5$ of the fifth lens L55 is equal to 1.535, the index of refraction $Nd5_6$ of the sixth lens L56 is equal to 1.535, the effective focal length $f5_1$ of the first lens L51 is equal to −3.35650 mm, the effective focal length $f5_2$ of the second lens L52 is equal to 1.57359 mm, the effective focal length $f5_3$ of the third lens L53 is equal to −1.87275 mm, the effective focal length $f5_4$ of the fourth lens L54 is equal to 1.9044 mm, the effective focal length $f5_5$ of the fifth lens L55 is equal to 1.34906 mm, the effective focal length $f5_6$ of the sixth lens L56 is equal to −1.27358 mm, the radius of curvature $R5_{21}$ of the object side surface S53 of the second lens L52 is equal to 1.02552 mm, the radius of curvature $R5_{22}$ of the image side surface S54 of the second lens L52 is equal to −4.00000 mm, the radius of curvature $R5_{31}$ of the object side surface S56 of the third lens L53 is equal to −4.00000 mm, the radius of curvature $R5_{32}$ of the image side surface S57 of the third lens L53 is equal to 1.75063 mm, the radius of curvature $R5_{41}$ of the object side surface S58 of the fourth lens L54 is equal to 2.37557 mm, the radius of curvature $R5_{42}$ of the image side surface S59 of the fourth lens L54 is equal to −1.63906 mm, the radius of curvature $R5_{51}$ of the object side surface S510 of the fifth lens L55 is equal to −1.41888 mm, the radius of curvature $R5_{52}$ of the image side surface S511 of the fifth lens L55 is equal to −0.52700 mm. According to the above data, the following values can be obtained:

$BFL5/TTL5=0.224$ $f5/TTL5=0.4282$, $(Nd5_1+Nd5_2+Nd5_3+Nd5_4+Nd5_5+Nd5_6)/6=1.552$, $(Nd5_2+Nd5_3)/2=1.586$, $f5_1/f5_6=2.6355$, $(R5_{21}-R5_{22})/(R5_{21}+R5_{22})=-1.6895$, $(R5_{41}-R5_{42})/(R5_{41}+R5_{42})=5.4509$, which respectively satisfy the above conditions (33)-(38).

Figure 10A:
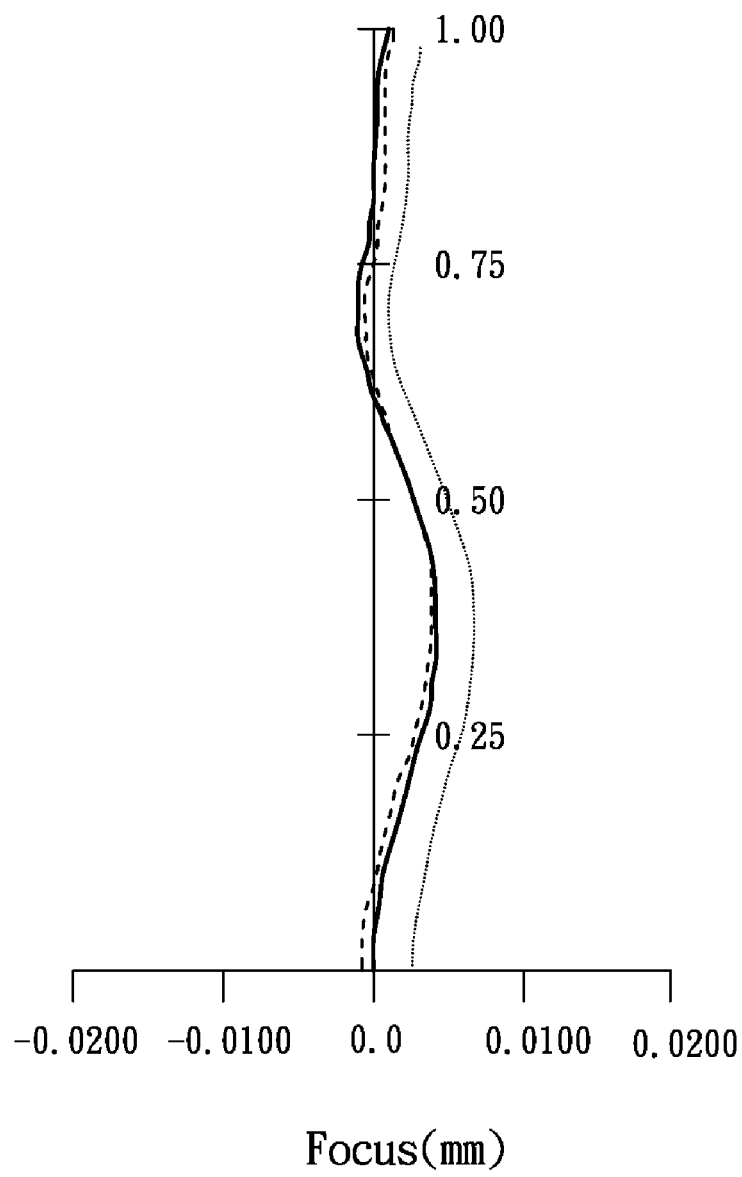
FIG. 10A depicts a longitudinal spherical aberration of the lens assembly in accordance with the fifth embodiment of the invention.
Figure 10B:
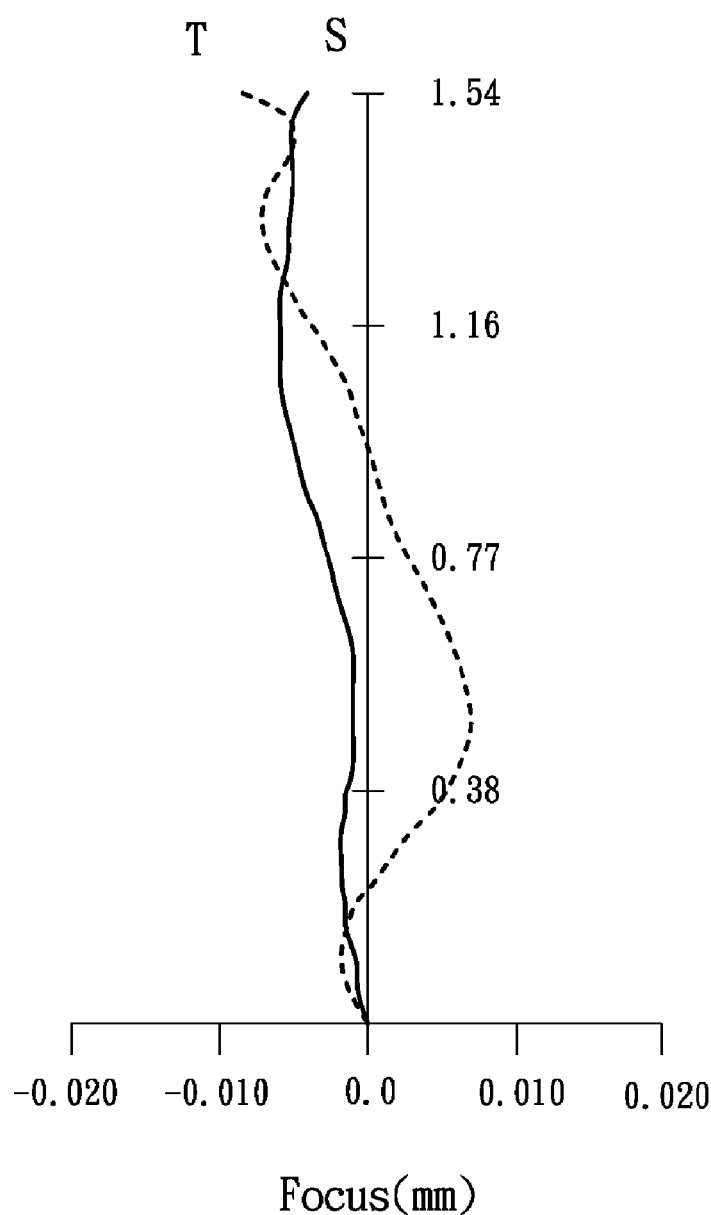
FIG. 10B is an astigmatic field curves diagram of the lens assembly in accordance with the fifth embodiment of the invention.
Figure 10C:
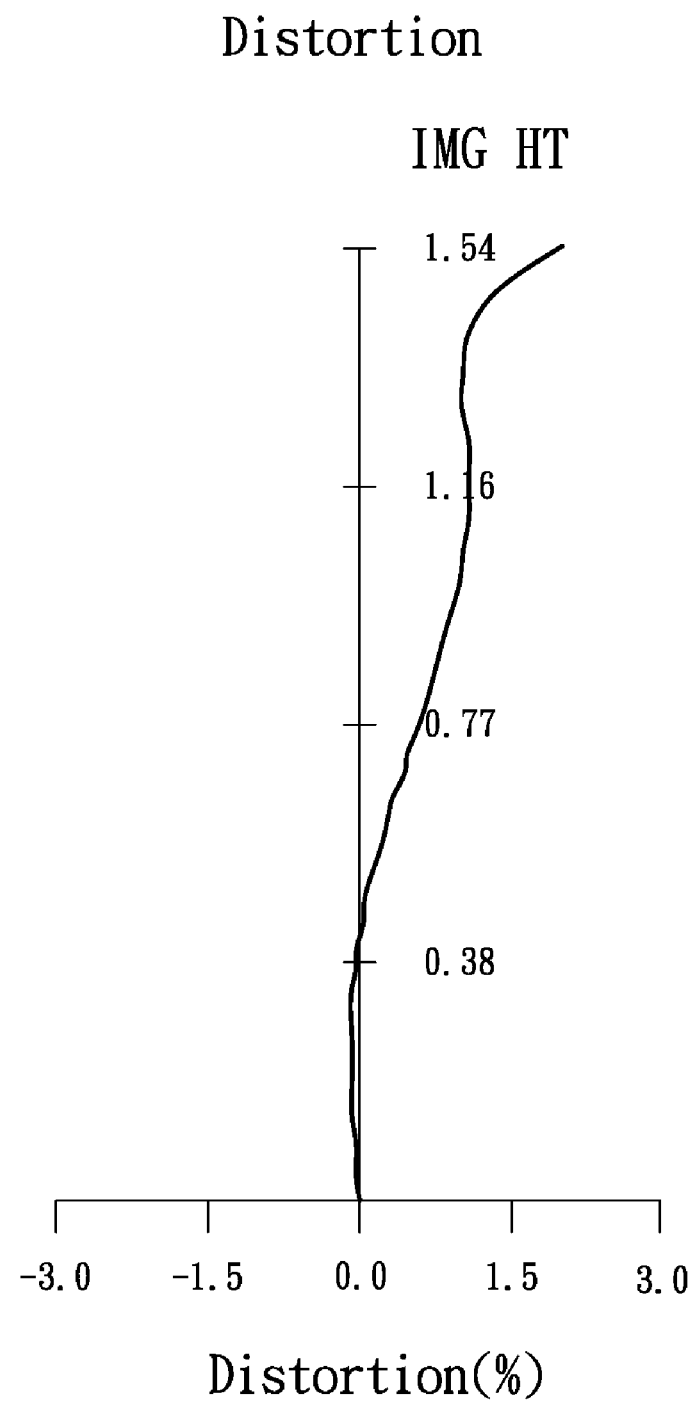
FIG. 10C is a distortion diagram of the lens assembly in accordance with the fifth embodiment of the invention.

By the above arrangements of the lenses and stop ST5, the lens assembly 5 of the fifth embodiment can meet the requirements of optical performance as seen in FIGS. 10A-10C, wherein FIG. 10A shows a longitudinal spherical aberration diagram of the lens assembly 5 in accordance with the fifth embodiment of the invention, FIG. 10B shows an astigmatic field curves of the lens assembly 5 in accordance with the fifth embodiment of the invention and FIG. 10C shows a distortion diagram of the lens assembly 5 in accordance with the fifth embodiment of the invention.

It can be seen from FIG. 10A that the longitudinal spherical aberration in the lens assembly 5 of the fifth embodiment ranges between −0.0050 mm and 0.0100 mm for the wavelength of 470.0000 nm, 555.0000 nm and 650.0000 nm. It can be seen from FIG. 10B that the astigmatic field curves of tangential direction and sagittal direction in the lens assembly 5 of the fifth embodiment ranges between −0.010 mm and 0.010 mm for the wavelength of 555.0000 nm. It can be seen from FIG. 10C that the distortion in the lens assembly 5 of the fifth embodiment ranges between −0.2% and 2.1% for the wavelength of 555.0000 nm. It is obvious that the longitudinal spherical aberration, the astigmatic field curves and the distortion of the lens assembly 5 of the fifth embodiment can be corrected effectively. Therefore, the lens assembly 5 of the fifth embodiment is capable of good optical performance.

Figure 11:
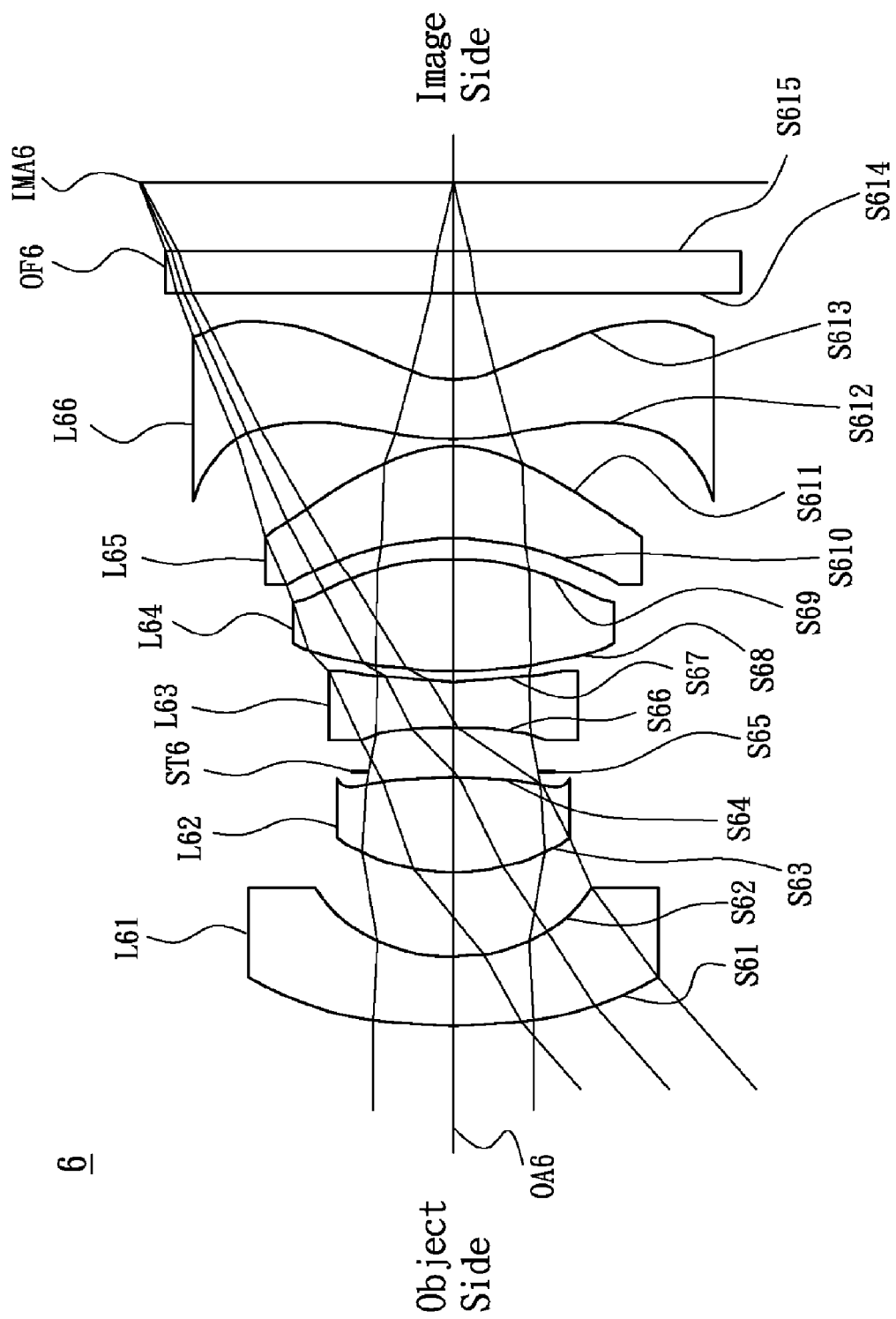
FIG. 11 is a lens layout and optical path diagram of a lens assembly in accordance with a sixth embodiment of the invention.

Referring to FIG. 11, FIG. 11 is a lens layout and optical path diagram of a lens assembly in accordance with a sixth embodiment of the invention. The lens assembly 6 includes a first lens L61, a second lens L62, a stop ST6, a third lens L63, a fourth lens L64, a fifth lens L65, a sixth lens L66 and an Optical filter OF6, all of which are arranged in sequence from an object side to an image side along an optical axis OA6. In operation, an image of light rays from the object side is formed at an image plane IMA6. The stop ST6 can help to collect light effectively so as to increase the field of view. The first lens L61 is a meniscus lens, made of plastic material and with negative refractive power, wherein the object side surface S61 is a convex surface, the image side surface S62 is a concave surface and both of the object side surface S61 and image side surface S62 are aspheric surfaces. The second lens L62 is a biconvex lens, made of plastic material and with positive refractive power, wherein both of the object side surface S63 and image side surface S64 are aspheric surfaces. The third lens L63 is a biconcave lens, made of plastic material and with negative refractive power, wherein both of the object side surface S66 and image side surface S67 are aspheric surfaces. The fourth lens L64 is a biconvex lens, made of plastic material and with positive refractive power, wherein both of the object side surface S68 and image side surface S69 are aspheric surfaces. The fifth lens L65 is a meniscus lens, made of plastic material and with positive refractive power, wherein the object side surface S610 is a concave surface, the image side surface S611 is a convex surface and both of the object side surface S610 and image side surface S611 are aspheric surfaces. The sixth lens L66 is a meniscus lens, made of plastic material and with negative refractive power, wherein the object side surface S612 is a convex surface, the image side surface S613 is a concave surface and both of the object side surface S612 and image side surface S613 are aspheric surfaces. Both of the object side surface S614 and image side surface S615 of the optical filter OF6 are plane surfaces.

In order to maintain excellent optical performance of the lens assembly in accordance with the sixth embodiment of the invention, the lens assembly 6 must satisfies the following six conditions:

$$0.078 \leq BFL6/TTL6 \leq 0.4 \quad (39)$$

$$0.4 \leq f6/TTL6 \leq 0.5 \quad (40)$$

$$(Nd6_1+Nd6_2+Nd6_3+Nd6_4+Nd6_5+Nd6_6)/6 < (Nd6_2+Nd6_3)/2 \quad (41)$$

$$2 \leq f6_1/f6_6 \leq 5 \quad (42)$$

$$-3 \leq (R6_{21}-R6_{22})/(R6_{21}+R6_{22}) \leq -1 \quad (43)$$

$$2 \leq (R6_{41}-R6_{42})/(R6_{41}+R6_{42}) \leq 20 \quad (44)$$

wherein BFL6 is a distance from the image side surface S613 of the sixth lens L66 to the image plane IMA6 along the optical axis OA6, f6 is an effective focal length of the lens assembly 6, TTL6 is a distance from the object side surface S61 of the first lens L61 to the image plane IMA6 along the optical axis OA6, $Nd6_1$ is an index of refraction of the first lens L61, $Nd6_2$ is an index of refraction of the second lens L62, $Nd6_3$ is an index of refraction of the third lens L63, $Nd6_4$ is an index of refraction of the fourth lens L64, $Nd6_5$ is an index of refraction of the fifth lens L65, $Nd6_6$ is an index of refraction of the sixth lens L66, $f6_1$ is an effective focal length of the first lens L61, $f6_6$ is an effective focal length of the sixth lens L66, $R6_{21}$ is a radius of curvature of the object side surface S63 of the second lens L62, $R6_{22}$ is a radius of curvature of the image side surface S64 of the second lens L62, $R6_{31}$ is a radius of curvature of the object side surface S66 of the third lens L63, $R6_{32}$ is a radius of curvature of the image side surface S67 of the third lens L63, $R6_{41}$ is a radius of curvature of the object side surface S68 of the fourth lens L64, $R6_{42}$ is a radius of curvature of the image side surface S69 of the fourth lens L64, $R6_{51}$ is a radius of curvature of the object side surface S610 of the fifth lens L65, and $R6_{52}$ is a radius of curvature of the image side surface S611 of the fifth lens L65. The BFL6 is longer as the lens assembly 6 satisfies condition (39). The longer the back focal length, the longer the focusing range. Thus, the sixth lens L66 stands little chance to collide with the optical filter OF6.

By the above design of the lenses and stop ST6, the lens assembly 6 is provided with a shortened total lens length, an increased field of view, an effective corrected aberration and an increased resolution.

In order to achieve the above purposes and effectively enhance the optical performance, the lens assembly 6 in accordance with the sixth embodiment of the invention is provided with the optical specifications shown in Table 11, which include the effective focal length, F-number, field of view, total lens length, radius of curvature of each lens surface, thickness between adjacent surface, refractive index of each lens and Abbe number of each lens. Table 11 shows that the effective focal length is equal to 1.7409 mm, F-number is equal to 2.2, field of view is equal to 81.8° and total lens length is equal to 4.177 mm for the lens assembly 6 of the sixth embodiment of the invention.

TABLE 11

Effective Focal Length = 1.7409 mm F-number = 2.2
Field of View = 81.8° Total Lens Length = 4.177 mm

| Surface Number | Radius of Curvature (mm) | Thickness (mm) | Nd | Vd | Remark |
|---|---|---|---|---|---|
| S61 | 2.980 | 0.342 | 1.535 | 55.7 | The First Lens L61 |
| S62 | 1.008 | 0.418 | | | |
| S63 | 1.070 | 0.467 | 1.535 | 55.7 | The Second Lens L62 |
| S64 | −3.500 | 0.030 | | | |
| S65 | ∞ | 0.217 | | | Stop ST6 |
| S66 | −3.500 | 0.230 | 1.643 | 22.4 | The Third Lens L63 |
| S67 | 1.968 | 0.053 | | | |
| S68 | 2.460 | 0.552 | 1.535 | 55.7 | The Fourth Lens L64 |
| S69 | −1.353 | 0.100 | | | |
| S610 | −1.410 | 0.463 | 1.535 | 55.7 | The Fifth Lens L65 |
| S611 | −0.521 | 0.030 | | | |
| S612 | 1.267 | 0.292 | 1.535 | 55.7 | The Sixth Lens L66 |
| S613 | 0.399 | 0.432 | | | |
| S614 | ∞ | 0.210 | 1.517 | 64.2 | Optical Filter OF6 |
| S615 | ∞ | 0.340 | | | |

The aspheric surface sag z of each lens in table 11 can be calculated by the following formula:

$$z = ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the sixth embodiment, the conic constant k and the aspheric coefficients A, B, C, D, E, F, G of each surface are shown in Table 12.

TABLE 12

| | Surface Number | | | | | |
|---|---|---|---|---|---|---|
| | S61 | S62 | S63 | S64 | S66 | S67 |
| k | −2.9584e−01 | 1.4036E−01 | 1.4519E−02 | −1.8341E+00 | −4.5981E+01 | −1.2180E+01 |
| A | 1.0547E−01 | 2.0829E−01 | 3.4337E−04 | −8.1769E−02 | −7.7851E−01 | −2.5002E−01 |

TABLE 12-continued

| | | | | | | |
|---|---|---|---|---|---|---|
| B | −1.0893E−01 | −1.8906E−01 | 4.8267E−01 | −7.5462E−01 | 6.2513E−01 | 3.4999E−01 |
| C | 1.7463E−01 | 1.1237E+00 | −2.9098E+00 | 5.0747E+00 | −4.1215E+00 | −6.5344E−01 |
| D | −9.3734E−02 | −1.0293E+00 | 8.8073E+00 | −6.5939E+00 | 3.3256E+00 | 2.1238E−01 |
| E | −1.3241E−01 | 2.0556E−01 | −1.5796E+00 | −3.9038E+01 | 7.7512E−01 | −1.9948E−01 |
| F | 1.9505E−01 | 6.8183E−01 | −6.7230E+01 | −3.5221E+02 | 8.6848E+01 | −1.1340E+00 |
| G | −7.3975E−02 | 1.3820E+00 | 9.9266E+01 | 1.7718E+03 | −4.6785E+02 | 2.0693E+00 |

| Surface Number | | | | | |
|---|---|---|---|---|---|
| S68 | S69 | S610 | S611 | S612 | S613 |
| k −1.4073E+00 | −8.7841E+00 | −1.5872E+01 | −4.2553E+00 | −8.8293E+00 | −4.0901E+00 |
| A −5.6855E−02 | −4.5312E−01 | −4.1457E−01 | −3.3736E−01 | −2.6860E−01 | −2.2837E−01 |
| B 8.9650E−02 | 4.5703E−01 | 4.8381E−01 | 4.1688E−01 | 1.2895E−01 | 1.1899E−01 |
| C 1.4771E−01 | −6.9110E−02 | −1.5613E−01 | −1.6962E−01 | −3.3664E−02 | −6.5535E−02 |
| D −1.8371E−01 | 1.1027E−01 | −7.3272E−02 | −3.8047E−02 | −3.2798E−02 | 1.0040E−02 |
| E −2.8417E−02 | 2.4144E−01 | 3.5436E−02 | 1.0082E−01 | 8.7576E−03 | 2.3509E−03 |
| F 1.7819E−01 | 2.1611E−02 | −3.4241E−02 | 2.6842E−02 | 9.6450E−03 | −5.0073E−04 |
| G −5.6613E−02 | −1.4001E−01 | −1.4812E−01 | −1.1276E−01 | −6.1753E−03 | 3.0162E−04 |

For the lens assembly 6 of the sixth embodiment, the distance BFL6 from the image side surface S613 of the sixth lens L66 to the image plane IMA6 along the optical axis OA6 is equal to 0.982 mm, the effective focal length f6 of the lens assembly 6 is equal to 1.7409 mm, the distance TTL6 from the object side surface S61 of the first lens L61 to the image plane IMA6 along the optical axis OA6 is equal to 4.177 mm, the index of refraction $Nd6_1$ of the first lens L61 is equal to 1.535, the index of refraction $Nd6_2$ of the second lens L62 is equal to 1.535, the index of refraction $Nd6_3$ of the third lens L63 is equal to 1.643, the index of refraction $Nd6_4$ of the fourth lens L64 is equal to 1.535, the index of refraction $Nd6_5$ of the fifth lens L65 is equal to 1.535, the index of refraction $Nd6_6$ of the sixth lens L66 is equal to 1.535, the effective focal length $f6_1$ of the first lens L61 is equal to −3.02095 mm, the effective focal length $f6_2$ of the second lens L62 is equal to 1.58304 mm, the effective focal length $f6_3$ of the third lens L63 is equal to −1.91264 mm, the effective focal length $f6_4$ of the fourth lens L64 is equal to 1.7129 mm, the effective focal length $f6_5$ of the fifth lens L65 is equal to 1.30196 mm, the effective focal length $f6_6$ of the sixth lens L66 is equal to −1.23124 mm, the radius of curvature $R6_{21}$ of the object side surface S63 of the second lens L62 is equal to 1.06990 mm, the radius of curvature $R6_{22}$ of the image side surface S64 of the second lens L62 is equal to −3.50000 mm, the radius of curvature $R6_{31}$ of the object side surface S66 of the third lens L63 is equal to −3.50000 mm, the radius of curvature $R6_{32}$ of the image side surface S67 of the third lens L63 is equal to 1.96810 mm, the radius of curvature $R6_{41}$ of the object side surface S68 of the fourth lens L64 is equal to 2.46034 mm, the radius of curvature $R6_{42}$ of the image side surface S69 of the fourth lens L64 is equal to −1.35300 mm, the radius of curvature $R6_{51}$ of the object side surface S610 of the fifth lens L65 is equal to −1.40995 mm, and the radius of curvature $R6_{52}$ of the image side surface S611 of the fifth lens L65 is equal to −0.52088 mm. According to the above data, the following values can be obtained:

$BFL6/TTL6=0.235$ $f6/TTL6=0.4168$, $(Nd6_1+Nd6_2+Nd6_3+Nd6_4+Nd6_5+Nd6_6)/6=1.553$, $(Nd6_2+Nd6_3)/2=1.589$, $f6_1/f6_6=2.4536$, $(R6_{21}-R6_{22})/(R6_{21}+R6_{22})=-1.8805$, $(R6_{41}-R6_{42})/(R6_{41}+R6_{42})=3.4437$, which respectively satisfy the above conditions (39)-(44).

Figure 12A:
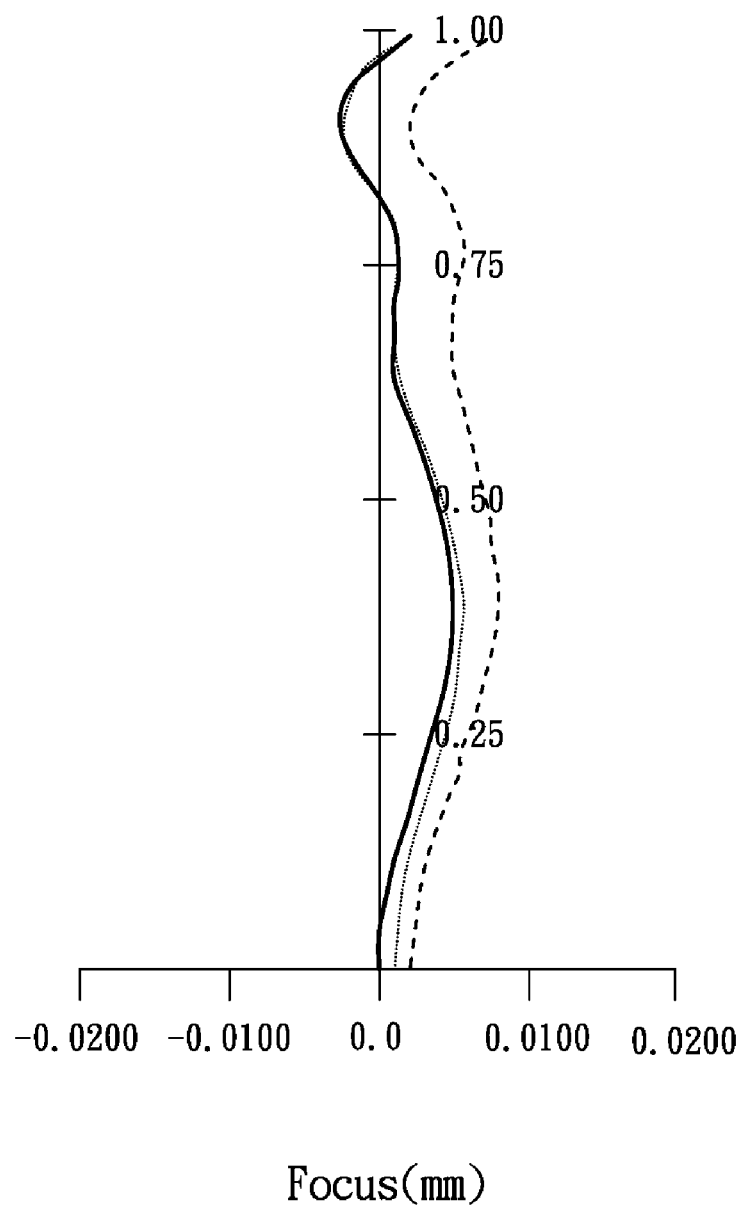
FIG. 12A depicts a longitudinal spherical aberration of the lens assembly in accordance with the sixth embodiment of the invention.
Figure 12B:
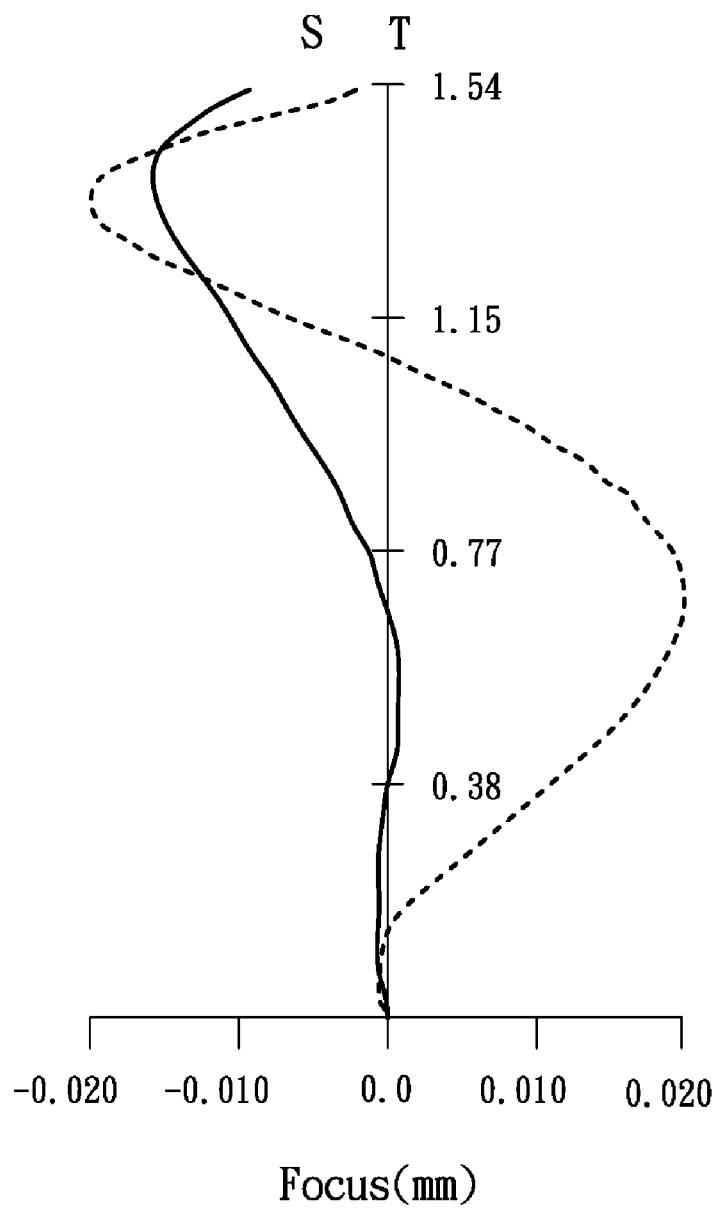
FIG. 12B is an astigmatic field curves diagram of the lens assembly in accordance with the sixth embodiment of the invention.
Figure 12C:
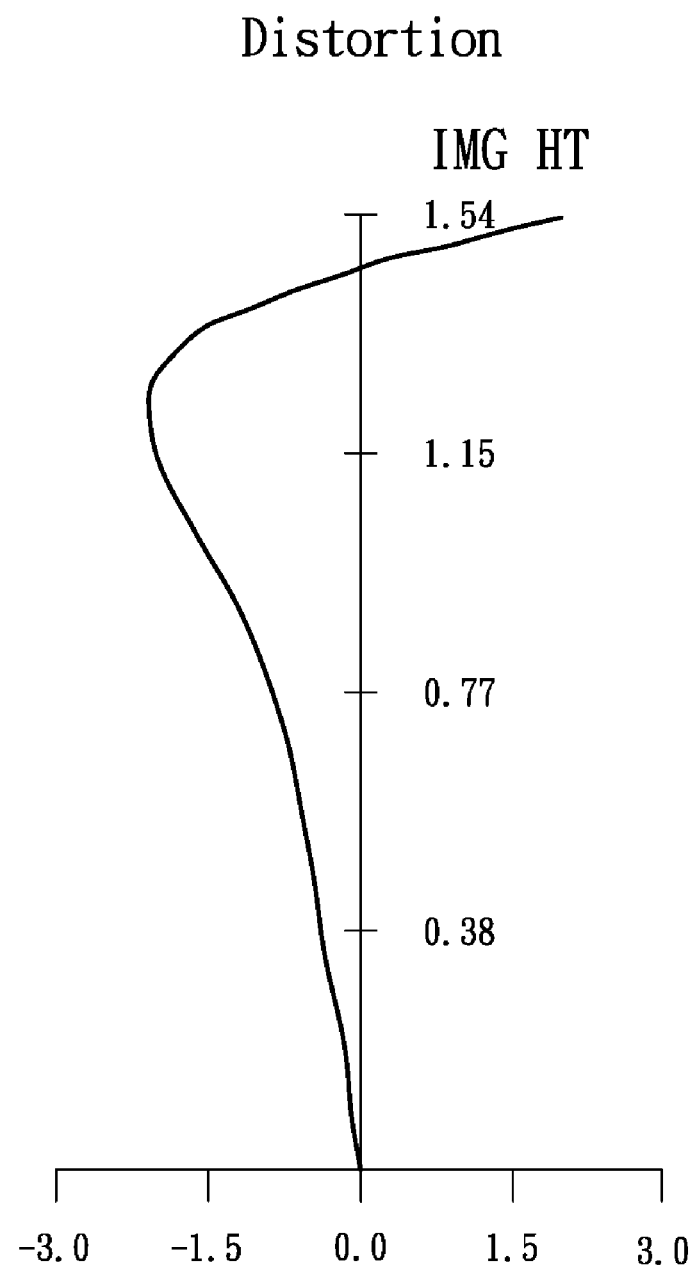
FIG. 12C is a distortion diagram of the lens assembly in accordance with the sixth embodiment of the invention.

By the above arrangements of the lenses and stop ST6, the lens assembly 6 of the sixth embodiment can meet the requirements of optical performance as seen in FIGS. 12A-12C, wherein FIG. 12A shows a longitudinal spherical aberration diagram of the lens assembly 6 in accordance with the sixth embodiment of the invention, FIG. 12B shows an astigmatic field curves of the lens assembly 6 in accordance with the sixth embodiment of the invention and FIG. 12C shows a distortion diagram of the lens assembly 6 in accordance with the sixth embodiment of the invention.

It can be seen from FIG. 12A that the longitudinal spherical aberration in the lens assembly 6 of the sixth embodiment ranges between −0.0050 mm and 0.0100 mm for the wavelength of 470.0000 nm, 555.0000 nm and 650.0000 nm. It can be seen from FIG. 12B that the astigmatic field curves of tangential direction and sagittal direction in the lens assembly 6 of the sixth embodiment ranges between −0.020 mm and 0.020 mm for the wavelength of 555.0000 nm. It can be seen from FIG. 12C that the distortion in the lens assembly 6 of the sixth embodiment ranges between −2.1% and 2.1% for the wavelength of 555.0000 nm. It is obvious that the longitudinal spherical aberration, the astigmatic field curves and the distortion of the lens assembly 6 of the sixth embodiment can be corrected effectively. Therefore, the lens assembly 6 of the sixth embodiment is capable of good optical performance.

Figure 13:
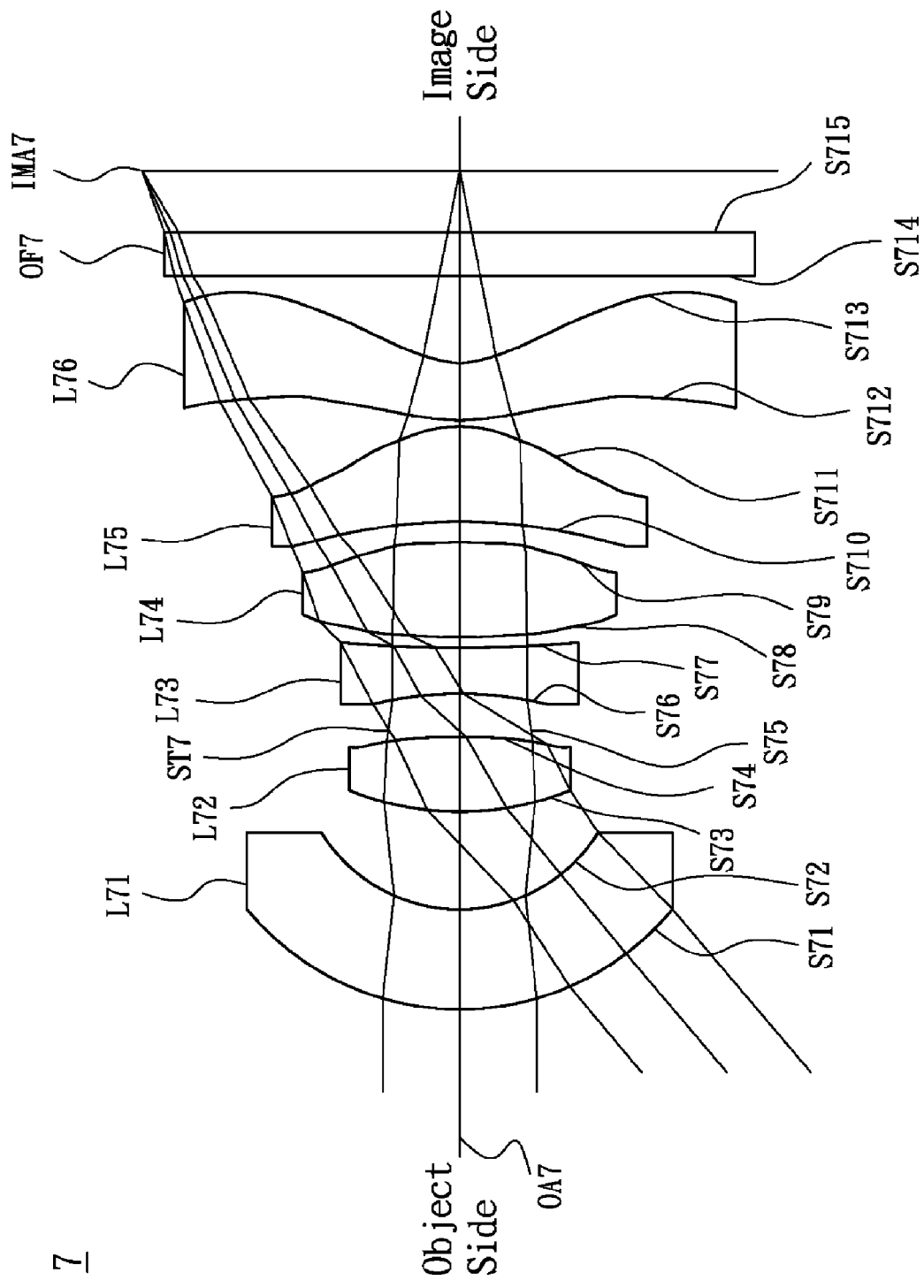
FIG. 13 is a lens layout and optical path diagram of a lens assembly in accordance with a seventh embodiment of the invention.

Referring to FIG. 13, FIG. 13 is a lens layout and optical path diagram of a lens assembly in accordance with a seventh embodiment of the invention. The lens assembly 7 includes a first lens L71, a second lens L72, a stop ST7, a third lens L73, a fourth lens L74, a fifth lens L75, a sixth lens L76 and an Optical filter OF7, all of which are arranged in sequence from an object side to an image side along an optical axis OA7. The stop ST7 can help to collect light effectively so as to increase the field of view. In operation, an image of light rays from the object side is formed at an image plane IMA7. The first lens L71 is a meniscus lens, made of plastic material and with negative refractive power, wherein the object side surface S71 is a convex surface, the image side surface S72 is a concave surface and both of the object side surface S71 and image side surface S72 are aspheric surfaces. The second lens L72 is a biconvex lens, made of plastic material and with positive refractive power, wherein both of the object side surface S73 and image side surface S74 are aspheric surfaces. The third lens L73 is a biconcave lens, made of plastic material and with negative refractive power, wherein both of the object side surface S76 and image side surface S77 are aspheric surfaces. The fourth lens L74 is a biconvex lens, made of plastic material and with positive refractive power, wherein both of the object side surface S78 and image side surface S79 are aspheric surfaces. The fifth lens L75 is a meniscus lens, made of plastic material and with positive refractive power, wherein the object side surface S710 is a concave surface, the image side surface S711 is a convex surface and both of the object side surface S710 and image side surface S711 are aspheric surfaces. The sixth lens L76 is a meniscus lens, made of plastic material and with negative refractive power, wherein the object side surface S712 is a convex surface, the image side surface S713 is a concave surface and both of the object side surface S712 and image side surface S713 are aspheric surfaces. Both of the object side surface S714 and image side surface S715 of the optical filter OF7 are plane surfaces.

In order to maintain excellent optical performance of the lens assembly in accordance with the seventh embodiment of the invention, the lens assembly 7 must satisfies the following six conditions:

$$0.078 \leq BFL7/TTL7 \leq 0.4 \quad (45)$$

$$0.4 \leq f7/TTL7 \leq 0.5 \quad (46)$$

$$(Nd7_1+Nd7_2+Nd7_3+Nd7_4+Nd7_5+Nd7_6)/6 < (Nd7_2+Nd7_3)/2 \quad (47)$$

$$2 \leq f7_1/f7_5 \leq 5 \quad (48)$$

$$-3 \leq (R7_{21}-R7_{22})/(R7_{21}+R7_{22}) \leq -1 \quad (49)$$

$$2 \leq (R7_{41}-R7_{42})/(R7_{41}+R7_{42}) \leq 20 \quad (50)$$

wherein BFL7 is a distance from the image side surface S713 of the sixth lens L76 to the image plane IMA7 along the optical axis OA7, f7 is an effective focal length of the lens assembly 7, TTL7 is a distance from the object side surface S71 of the first lens L71 to the image plane IMA7 along the optical axis OA7, $Nd7_1$ is an index of refraction of the first lens L71, $Nd7_2$ is an index of refraction of the second lens L72, $Nd7_3$ is an index of refraction of the third lens L73, $Nd7_4$ is an index of refraction of the fourth lens L74, $Nd7_5$ is an index of refraction of the fifth lens L75, $Nd7_6$ is an index of refraction of the sixth lens L76, $f7_1$ is an effective focal length of the first lens L71, $f7_6$ is an effective focal length of the sixth lens L76, $R7_{21}$ is a radius of curvature of the object side surface S73 of the second lens L72, $R7_{22}$ is a radius of curvature of the image side surface S74 of the second lens L72, $R7_{31}$ is a radius of curvature of the object side surface S76 of the third lens L73, $R7_{32}$ is a radius of curvature of the image side surface S77 of the third lens L73, $R7_{41}$ is a radius of curvature of the object side surface S78 of the fourth lens L74, $R7_{42}$ is a radius of curvature of the image side surface S79 of the fourth lens L74, $R7_{51}$ is a radius of curvature of the object side surface S710 of the fifth lens L75, and $R7_{52}$ is a radius of curvature of the image side surface S711 of the fifth lens L75. The BFL7 is longer as the lens assembly 7 satisfies condition (45). The longer the back focal length, the longer the focusing range. Thus, the sixth lens L76 stands little chance to collide with the optical filter OF7.

By the above design of the lenses and stop ST7, the lens assembly 7 is provided with a shortened total lens length, an increased field of view, an effective corrected aberration and an increased resolution.

In order to achieve the above purposes and effectively enhance the optical performance, the lens assembly 7 in accordance with the seventh embodiment of the invention is provided with the optical specifications shown in Table 13, which include the effective focal length, F-number, field of view, total lens length, radius of curvature of each lens surface, thickness between adjacent surface, refractive index of each lens and Abbe number of each lens. Table 13 shows that the effective focal length is equal to 1.7971 mm, F-number is equal to 2.4, field of view is equal to 80° and total lens length is equal to 4.104 mm for the lens assembly 7 of the seventh embodiment of the invention.

TABLE 13

Effective Focal Length = 1.7971 mm F-number = 2.4
Field of View = 80° Total Lens Length = 4.104 mm

| Surface Number | Radius of Curvature (mm) | Thickness (mm) | Nd | Vd | Remark |
|---|---|---|---|---|---|
| S71 | 1.462 | 0.494 | 1.636 | 23.9 | The First Lens L71 |
| S72 | 0.861 | 0.472 | | | |
| S73 | 1.341 | 0.364 | 1.535 | 56.1 | The Second Lens L72 |
| S74 | −4.000 | 0.030 | | | |
| S75 | ∞ | 0.177 | | | Stop ST7 |
| S76 | −4.000 | 0.230 | 1.636 | 23.9 | The Third Lens L73 |
| S77 | 2.614 | 0.052 | | | |
| S78 | 2.950 | 0.466 | 1.535 | 56.1 | The Fourth Lens L74 |
| S79 | −2.628 | 0.100 | | | |
| S710 | −3.305 | 0.466 | 1.535 | 56.1 | The Fifth Lens L75 |
| S711 | −0.536 | 0.030 | | | |
| S712 | 1.106 | 0.279 | 1.535 | 56.1 | The Sixth Lens L76 |
| S713 | 0.387 | 0.434 | | | |
| S714 | ∞ | 0.210 | 1.517 | 64.2 | Optical Filter OF7 |
| S715 | ∞ | 0.302 | | | |

The aspheric surface sag z of each lens in table 13 can be calculated by the following formula:

$$z=ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the seventh embodiment, the conic constant k and the aspheric coefficients A, B, C, D, E, F, G of each surface are shown in Table 14.

TABLE 14

| | Surface Number | | | | | |
|---|---|---|---|---|---|---|
| | S71 | S72 | S73 | S74 | S76 | S77 |
| k | −4.1464E−01 | 0.0000E+00 | 0.0000E+00 | 0.0000E+00 | 0.0000E+00 | −1.4504E+01 |
| A | 7.0604E−02 | 1.3761E−01 | −5.6799E−02 | −1.6028E−01 | −6.0861E−01 | −2.9561E−01 |

TABLE 14-continued

| | | | | | | |
|---|---|---|---|---|---|---|
| B | −8.5914E−02 | −2.4629E−01 | 3.6868E−01 | −1.2354E+00 | 2.8834E−01 | 2.3819E−01 |
| C | 1.8643E−01 | 1.2805E+00 | −3.0557E+00 | 4.0490E+00 | −4.3672E+00 | −6.8609E−01 |
| D | −8.4559E−02 | −1.0363E+00 | 5.4622E+00 | −1.0112E+00 | 6.8920E+00 | 6.1733E−01 |
| E | −1.2849E−01 | 2.0556E−01 | −1.5796E+00 | −3.9038E+01 | 7.7512E−01 | −1.9948E−01 |
| F | 1.9369E−01 | 6.8183E−01 | −6.7230E+01 | −3.5221E+02 | 8.6848E+01 | −1.1340E+00 |
| G | −7.7610E−02 | 1.3820E+00 | 9.9266E+01 | 1.7718E+03 | −4.6785E+02 | 2.0693E+00 |

| | Surface Number | | | | | |
|---|---|---|---|---|---|---|
| | S78 | S79 | S710 | S711 | S712 | S713 |
| k | 0.0000E+00 | −5.7364E+00 | −5.8719E+01 | −4.2615E+00 | −5.7081E+00 | −3.6188E+00 |
| A | −9.0358E−02 | −4.6070E−01 | −3.8311E−01 | −2.8820E−01 | −2.9858E−01 | −2.3003E−01 |
| B | 1.3150E−01 | 4.5958E−01 | 5.0759E−01 | 4.7790E−01 | 1.5133E−01 | 1.3658E−01 |
| C | 2.1419E−01 | −4.4686E−02 | −1.3519E−01 | −1.3800E−01 | −1.7734E−02 | −6.3025E−02 |
| D | −1.3006E−01 | 1.6753E−01 | −5.2224E−02 | −2.1957E−02 | −2.6290E−02 | 9.3503E−03 |
| E | −2.7579E−02 | 3.6099E−01 | 5.1572E−02 | 1.0520E−01 | 1.0681E−02 | 1.7828E−03 |
| F | 1.7819E−01 | 2.1611E−02 | −6.0175E−02 | 2.9136E−02 | 1.0272E−02 | −7.2428E−04 |
| G | −5.6613E−02 | −1.4001E−01 | −1.4812E−01 | −1.1457E−01 | −5.3379E−03 | 1.6493E−04 |

For the lens assembly 7 of the seventh embodiment, the distance BFL7 from the image side surface S713 of the sixth lens L76 to the image plane IMA7 along the optical axis OA7 is equal to 0.946 mm, the effective focal length f7 of the lens assembly 7 is equal to 1.7971 mm, the distance TTL7 from the object side surface S71 of the first lens L71 to the image plane IMA7 along the optical axis OA7 is equal to 4.104 mm, the index of refraction $Nd7_1$ of the first lens L71 is equal to 1.636, the index of refraction $Nd7_2$ of the second lens L72 is equal to 1.535, the index of refraction $Nd7_3$ of the third lens L73 is equal to 1.636, the index of refraction $Nd7_4$ of the fourth lens L74 is equal to 1.535, the index of refraction $Nd7_5$ of the fifth lens L65 is equal to 1.535, the index of refraction $Nd7_6$ of the sixth lens L76 is equal to 1.535, the effective focal length $f7_1$ of the first lens L71 is equal to −4.81271 mm, the effective focal length $f7_2$ of the second lens L72 is equal to 1.91781 mm, the effective focal length $f7_3$ of the third lens L73 is equal to −2.43617 mm, the effective focal length $f7_4$ of the fourth lens L74 is equal to 2.6691 mm, the effective focal length $f7_5$ of the fifth lens L75 is equal to 1.12753 mm, the effective focal length $f7_6$ of the sixth lens L76 is equal to −1.28548 mm, the radius of curvature $R7_{21}$ of the object side surface S73 of the second lens L72 is equal to 1.34072 mm, the radius of curvature $R7_{22}$ of the image side surface S74 of the second lens L72 is equal to −4.00000 mm, the radius of curvature $R7_{31}$ of the object side surface S76 of the third lens L73 is equal to −4.00000 mm, the radius of curvature $R7_{32}$ of the image side surface S77 of the third lens L73 is equal to 2.61394 mm, the radius of curvature $R7_{41}$ of the object side surface S78 of the fourth lens L74 is equal to 2.95016 mm, the radius of curvature $R7_{42}$ of the image side surface S79 of the fourth lens L74 is equal to −2.62791 mm, the radius of curvature $R7_{51}$ of the object side surface S710 of the fifth lens L75 is equal to −3.30516 mm, the radius of curvature $R7_{52}$ of the image side surface S711 of the fifth lens L75 is equal to −0.53635 mm. According to the above data, the following values can be obtained:

$BFL7/TTL7=0.231$ $f7/TTL7=0.4379$, $(Nd7_1+Nd7_2+Nd7_3+Nd7_4+Nd7_5+Nd7_6)/6=1.569$, $(Nd7_2+Nd7_3)/2=1.586$, $f7_1/f7_6=3.7439$, $(R7_{21}−R7_{22})/(R7_{21}+R7_{22})=−2.0083$, $(R7_{41}−R7_{42})/(R7_{41}+R7_{42})=17.3101$, which respectively satisfy the above conditions (45)-(50).

Figure 14A:
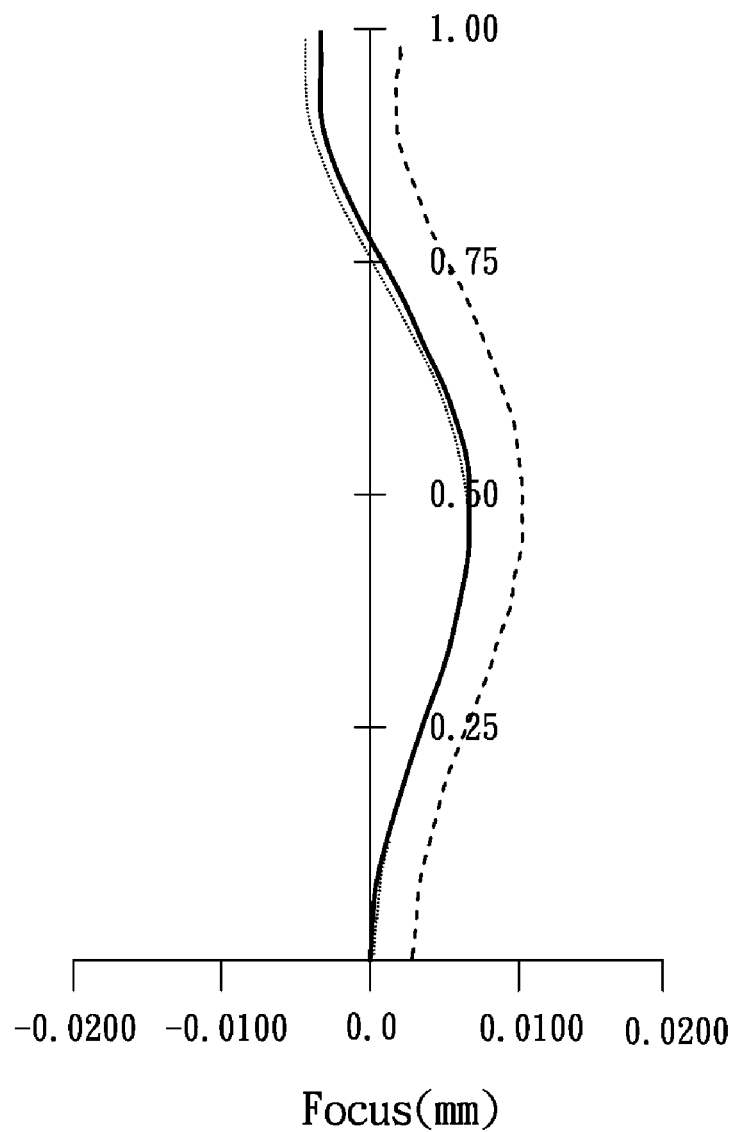
FIG. 14A depicts a longitudinal spherical aberration of the lens assembly in accordance with the seventh embodiment of the invention.
Figure 14B:
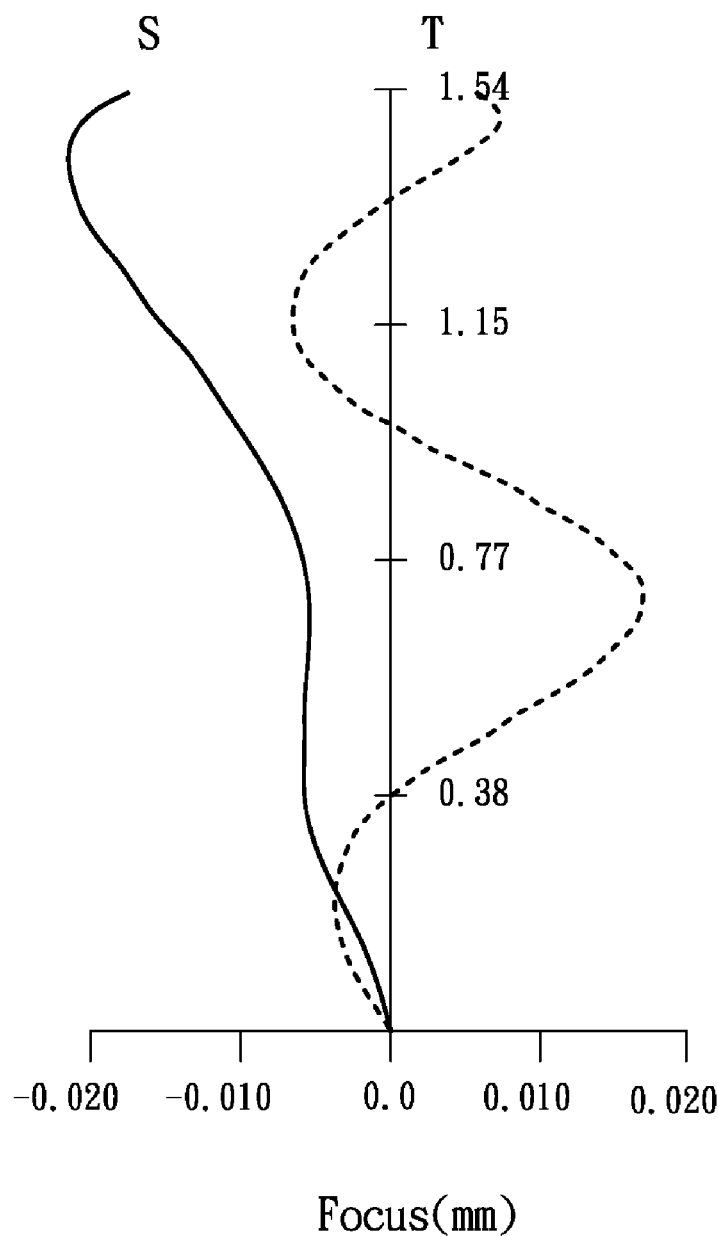
FIG. 14B is an astigmatic field curves diagram of the lens assembly in accordance with the seventh embodiment of the invention.
Figure 14C:
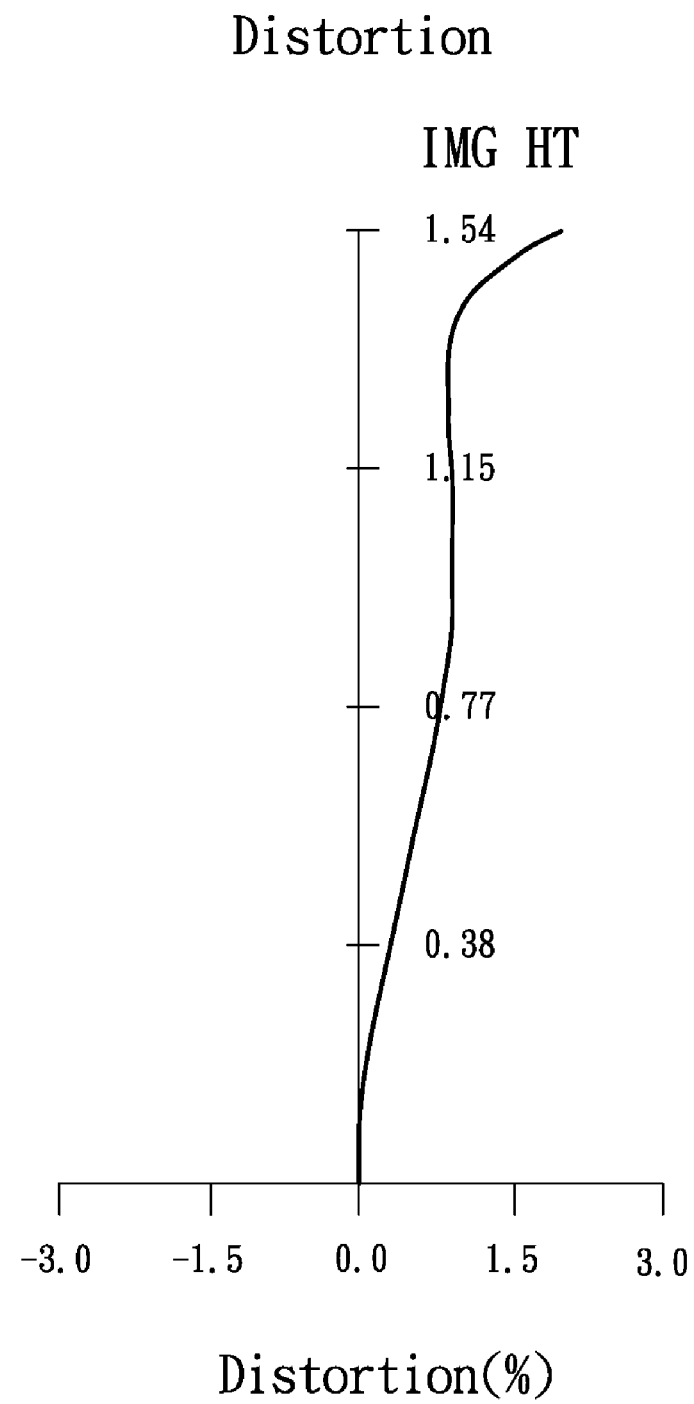
FIG. 14C is a distortion diagram of the lens assembly in accordance with the seventh embodiment of the invention.

By the above arrangements of the lenses and stop ST7, the lens assembly 7 of the seventh embodiment can meet the requirements of optical performance as seen in FIGS. 14A-14C, wherein FIG. 14A shows a longitudinal spherical aberration diagram of the lens assembly 7 in accordance with the seventh embodiment of the invention, FIG. 14B shows an astigmatic field curves of the lens assembly 7 in accordance with the seventh embodiment of the invention and FIG. 14C shows a distortion diagram of the lens assembly 7 in accordance with the seventh embodiment of the invention.

It can be seen from FIG. 14A that the longitudinal spherical aberration in the lens assembly 7 of the seventh embodiment ranges between −0.0050 mm and 0.0120 mm for the wavelength of 470.0000 nm, 555.0000 nm and 650.0000 nm. It can be seen from FIG. 14B that the astigmatic field curves of tangential direction and sagittal direction in the lens assembly 7 of the seventh embodiment ranges between −0.022 mm and 0.017 mm for the wavelength of 555.0000 nm. It can be seen from FIG. 14C that the distortion in the lens assembly 7 of the seventh embodiment ranges between 0.0% and 2.1% for the wavelength of 555.0000 nm. It is obvious that the longitudinal spherical aberration, the astigmatic field curves and the distortion of the lens assembly 7 of the seventh embodiment can be corrected effectively. Therefore, the lens assembly 7 of the seventh embodiment is capable of good optical performance.

Figure 15:
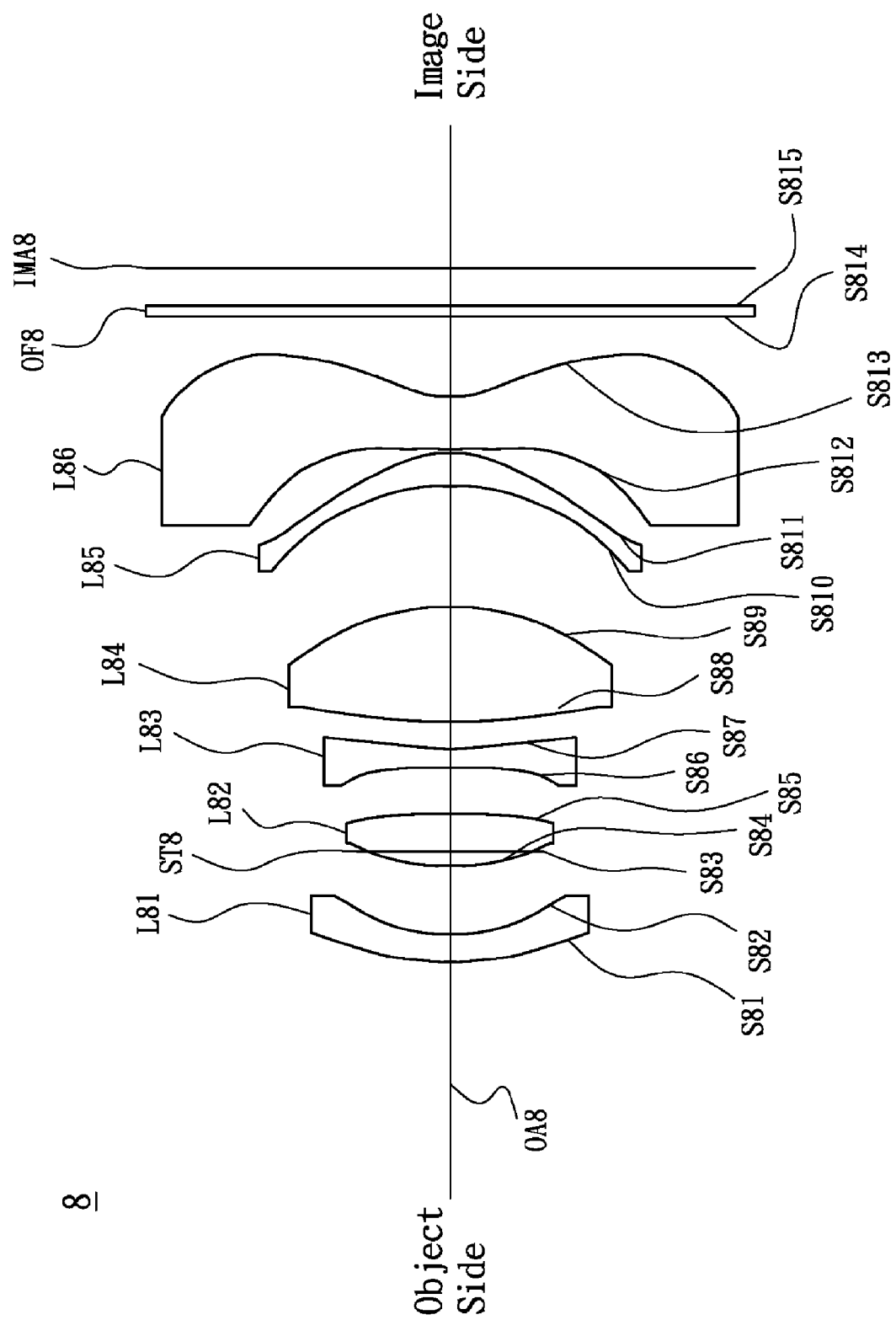
FIG. 15 is a lens layout diagram of a lens assembly in accordance with an eighth embodiment of the invention.

Referring to FIG. 15, FIG. 15 is a lens layout diagram of a lens assembly in accordance with an eighth embodiment of the invention. The lens assembly 8 includes a first lens L81, a stop ST8, a second lens L82, a third lens L83, a fourth lens L84, a fifth lens L85, a sixth lens L86 and an optical filter OF8, all of which are arranged in sequence from an object side to an image side along an optical axis OA8. In operation, an image of light rays from the object side is formed at an image plane IMA8. The stop ST8 can help to collect light effectively so as to increase the field of view. The first lens L81 is a meniscus lens, made of glass material and with negative refractive power, wherein the object side surface S81 is a convex surface, the image side surface S82 is a concave surface and both of the object side surface S81 and image side surface S82 are aspheric surfaces. The second lens L82 is a biconvex lens, made of plastic material and with positive refractive power, wherein both of the object side surface S84 and image side surface S85 are aspheric surfaces. The third lens L83 is a biconcave lens, made of plastic material and with negative refractive power, wherein both of the object side surface S86 and image side surface S87 are aspheric surfaces. The fourth lens L84 is a biconvex lens, made of plastic material and with positive refractive power, wherein both of the object side surface S88 and image side surface S89 are aspheric surfaces. The fifth lens L85 is a meniscus lens, made of plastic material and with positive refractive power, wherein the object side surface S810 is a concave surface, the image side surface S811 is a convex surface and both of the object side surface S810 and image side surface S811 are aspheric surfaces. The sixth lens L86 is a meniscus lens, made of plastic material and with negative refractive power, wherein the object side surface S812 is a convex surface, the image side surface S813 is a concave surface and both of the object side surface S812 and image side surface S813 are aspheric surfaces. Both of the object side surface S814 and image side surface S815 are plane surfaces.

In order to maintain excellent optical performance of the lens assembly in accordance with the eighth embodiment of the invention, the lens assembly 8 must satisfies the following six conditions:

$$0.17 < |BFL8/TTL8| < 0.2 \quad (51)$$

$$0.01 \le f8/TTL8 \le 0.61 \quad (52)$$

$$(Nd8_1 + Nd8_2 + Nd8_3 + Nd8_4 + Nd8_5 + Nd8_6)/6 < (Nd8_1 + Nd8_3)/2 \quad (53)$$

$$2.19 < |f8_1/f8| < 2.74 \quad (54)$$

$$0.53 < |f8_2/f8| < 1.03 \quad (55)$$

$$0.72 < |f8_3/f8| < 1.37 \quad (56)$$

wherein f8 is an effective focal length of the lens assembly 8, $Nd8_1$ is an index of refraction of the first lens L81, $Nd8_2$ is an index of refraction of the second lens L82, $Nd8_3$ is an index of refraction of the third lens L83, $Nd8_4$ is an index of refraction of the fourth lens L84, $Nd8_5$ is an index of refraction of the fifth lens L85, $Nd8_6$ is an index of refraction of the sixth lens L86, $f8_1$ is an effective focal length of the first lens L81, $f8_2$ is an effective focal length of the second lens L82, $f8_3$ is an effective focal length of the third lens L83, TTL8 is a distance from the object side surface S81 of the first lens L81 to the image plane IMA8 along the optical axis OA8, and BFL8 is a distance from the image side surface S813 of the sixth lens L86 to the image plane IMA8 along the optical axis OA8. The BFL8 is longer as the lens assembly 8 satisfies condition (51). The longer the back focal length, the longer the focusing range. Thus, the sixth lens L86 stands little chance to collide with the optical filter OF8.

By the above design of the lenses and stop ST8, the lens assembly 8 is provided with a shortened total lens length, an increased field of view, an effective corrected aberration and an increased resolution.

In order to achieve the above purpose and effectively enhance the optical performance, the lens assembly 8 in accordance with the eighth embodiment of the invention is provided with the optical specifications shown in Table 15, which include the effective focal length, F-number, total lens length, radius of curvature of each lens surface, thickness between adjacent surface, refractive index of each lens and Abbe number of each lens. Table 15 shows that the effective focal length is equal to 11.019 mm, F-number is equal to 2.4 and total lens length is equal to 18.324 mm for the lens assembly 8 of the eighth embodiment of the invention.

TABLE 15

Effective Focal Length = 11.019 mm F-number = 2.4
Total Lens Length = 18.324 mm

| Surface Number | Radius of Curvature (mm) | Thickness (mm) | Nd | Vd | Remark |
|---|---|---|---|---|---|
| S81 | 7.788225 | 0.7340979 | 1.583 | 59.39 | The First Lens L81 |
| S82 | 5.040156 | 2.202912 | | | |
| S83 | ∞ | −0.4005714 | | | Stop ST8 |
| S84 | 6.358281 | 1.393725 | 1.535 | 56.07 | The Second Lens L82 |
| S85 | −15.66211 | 1.198876 | | | |
| S86 | −717.1156 | 0.4999966 | 1.636 | 23.9 | The Third Lens L83 |
| S87 | 7.42923 | 0.7206423 | | | |
| S88 | 17.13634 | 3.026845 | 1.535 | 56.07 | The Fourth Lens L84 |
| S89 | −6.826577 | 3.204384 | | | |
| S810 | −5.459802 | 0.8637714 | 1.535 | 56.07 | The Fifth Lens L85 |
| S811 | −2.509638 | 0.08933055 | | | |
| S812 | 20.14244 | 1.397706 | 1.535 | 56.07 | The Sixth Lens L86 |
| S813 | 2.323568 | 2.1 | | | |
| S814 | ∞ | 0.3 | 1.517 | 64.17 | Optical Filter OF8 |
| S815 | ∞ | 0.9921266 | | | |

The aspheric surface sag z of each lens in table 15 can be calculated by the following formula:

$$z = ch^2/\{1 + [1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the eighth embodiment, the conic constant k and the aspheric coefficients A, B, C, D, E, F, G of each surface are shown in Table 16.

TABLE 16

| | Surface Number | | | | | |
|---|---|---|---|---|---|---|
| | S81 | S82 | S84 | S85 | S86 | S87 |
| k | 2.605309 | 1.300119 | 0.6038539 | −51.60108 | −2980.793 | −23.6953 |
| A | −0.00018 | 0.000203 | 0.000898 | −0.00098 | −0.00914 | −0.00209 |
| B | −0.00011 | −0.00024 | 0.000129 | 4.25E−06 | 0.001043 | 0.000184 |
| C | −2.37E−06 | 1.21E−05 | −4.54E−05 | 2.85E−05 | −0.00013 | −9.22E−06 |
| D | −1.18E−07 | −2.79E−06 | 7.41E−06 | −3.96E−06 | 1.38E−06 | −5.27E−08 |
| E | 3.95E−08 | −1.81E−07 | −1.10E−07 | −7.67E−07 | −2.24E−03 | 1.41E−08 |
| F | −3.65E−09 | 5.76E−08 | −7.13E−08 | 2.23E−07 | 6.36E−12 | 5.59E−10 |
| G | 7.79E−11 | −4.14E−09 | 1.83E−09 | −1.85E−11 | −2.71E−09 | −5.06E−11 |

TABLE 16-continued

| | Surface Number | | | | | |
|---|---|---|---|---|---|---|
| | S88 | S89 | S810 | S811 | S812 | S813 |
| k | −1.253132 | 0 | 0 | −4.480995 | −9.786828 | −5.562295 |
| A | −0.00059 | −0.00055 | 0.001032 | −0.00268 | −0.00481 | −0.0022 |
| B | 1.56E−03 | 5.94E−06 | −1.91E−05 | 0.000133 | 2.95E−05 | 1.08E−04 |
| C | 1.46E−06 | −2.45E−07 | 2.42E−07 | −6.06E−06 | 2.50E−06 | −1.11E−06 |
| D | −1.10E−07 | −4.81E−09 | −2.54E−08 | −1.74E−08 | −3.60E−08 | 8.31E−09 |
| E | 1.26E−10 | 2.78E−10 | −3.40E−10 | 2.04E−09 | −1.50E−09 | 2.28E−11 |
| F | 5.64E−08 | 1.46E−11 | 1.66E−11 | 7.61E−11 | 8.06E−12 | −9.46E−13 |
| G | −2.35E−11 | 6.45E−12 | 2.30E−12 | −2.58E−12 | 2.75E−13 | 4.29E−15 |

For the lens assembly 8 of the eighth embodiment, the effective focal length f8 of the lens assembly 8 is equal to 11.019 mm, the index of refraction $Nd8_1$ of the first lens L81 is equal to 1.583, the index of refraction $Nd8_2$ of the second lens L82 is equal to 1.535, the index of refraction $Nd8_3$ of the third lens L83 is equal to 1.636, the index of refraction $Nd8_4$ of the fourth lens L84 is equal to 1.535, the index of refraction $Nd8_5$ of the fifth lens L85 is equal to 1.535, the index of refraction $Nd8_6$ of the sixth lens L86 is equal to 1.535, the effective focal length f81 of the first lens L81 is equal to −27.092 mm, the effective focal length $f8_2$ of the second lens L82 is equal to 8.622 mm, the effective focal length $f8_3$ of the third lens L83 is equal to −11.482 mm, the effective focal length $f8_4$ of the fourth lens L84 is equal to 9.522 mm, the effective focal length $f8_5$ of the fifth lens L85 is equal to 7.857 mm, the effective focal length $f8_6$ of the sixth lens L86 is equal to −5.035 mm, the distance TTL8 from the object side surface S81 of the first lens L81 to the image plane IMA8 along the optical axis OA8 is equal to 18.324 mm, and the distance BFL8 from the image side surface S813 of the sixth lens L86 to the image plane IMA8 along the optical axis OA8 is equal to 3.392 mm. According to the above data, the following values can be obtained:

$$f8/TTL8=0.601,$$

$$(Nd8_1+Nd8_2+Nd8_3+Nd8_4+Nd8_5+Nd8_6)/6=1.553,$$

$$(Nd8_2+Nd8_3)/2=1.589,$$

$$|f8_1/f8|=2.459,$$

$$|f8_2/f8|=0.782,$$

$$|f8_3/f8|=1.042,$$

$$|BFL8/TTL8|=0.185$$

which respectively satisfy the above conditions (51)-(56).

Figure 16B:
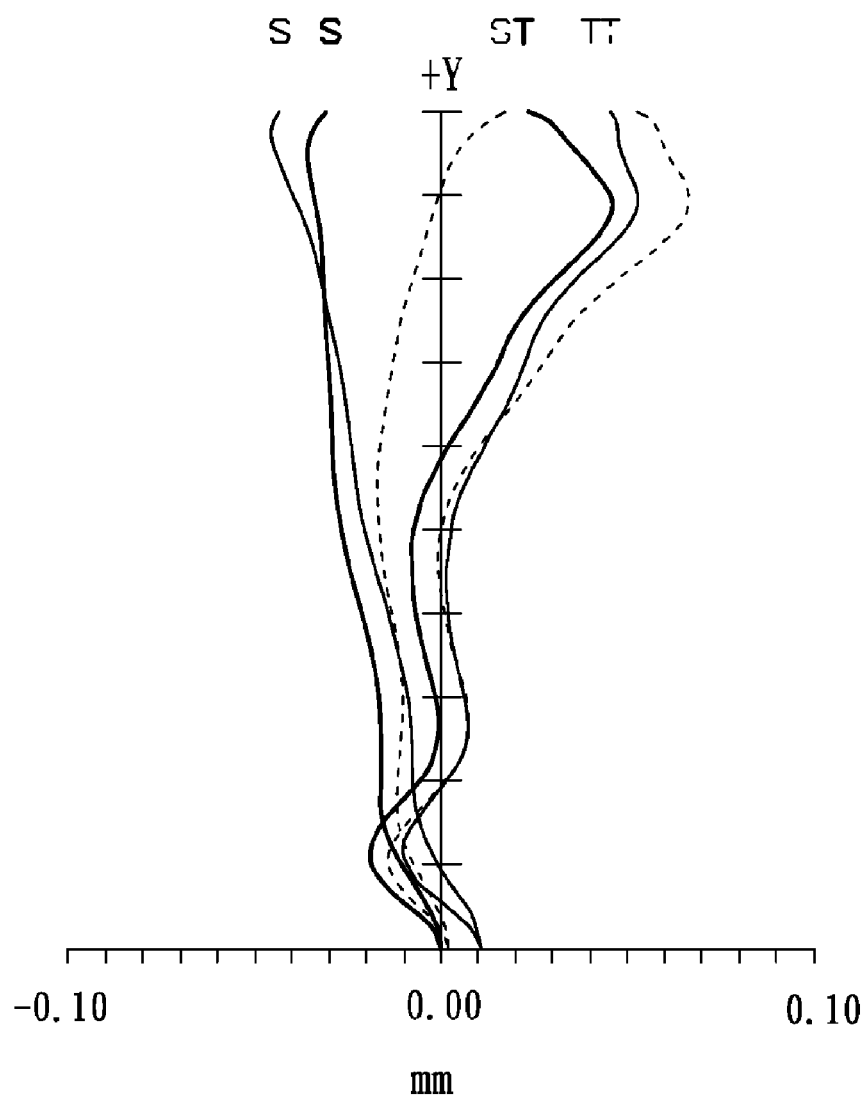
FIG. 16B is a field curvature diagram of the lens assembly in accordance with the eighth embodiment of the invention.
Figure 16C:
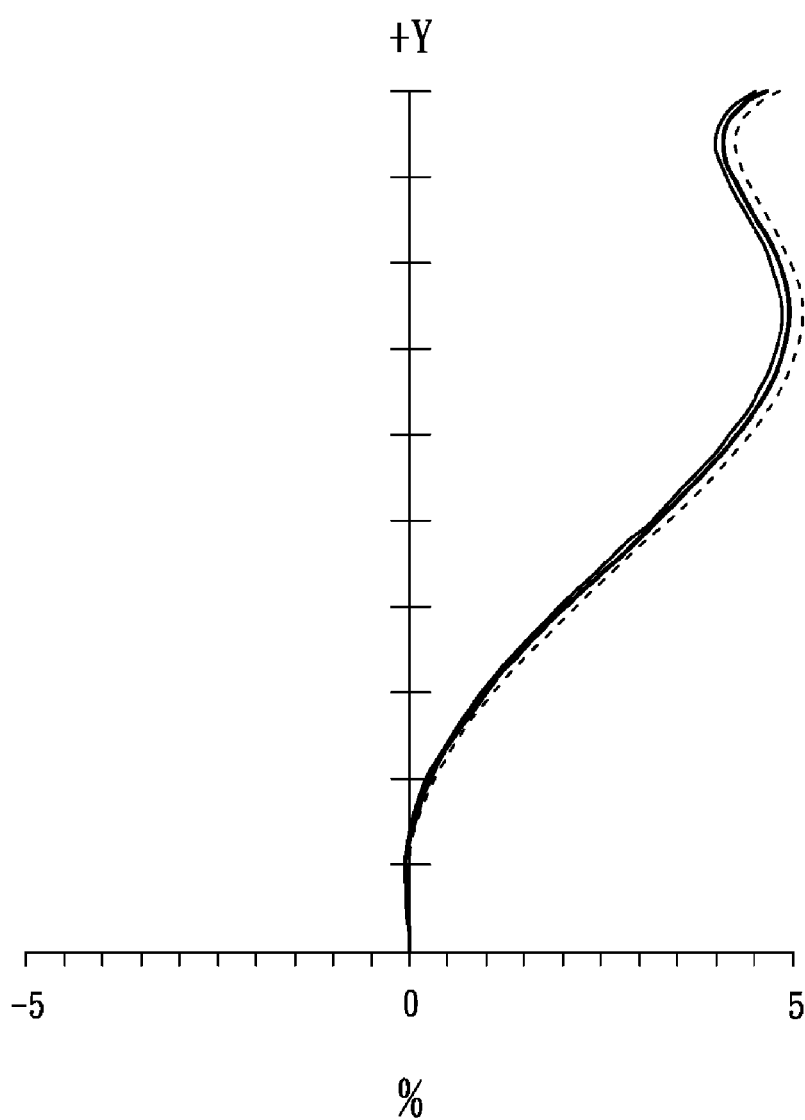
FIG. 16C is a distortion diagram of the lens assembly in accordance with the eighth embodiment of the invention.
Figure 16D:
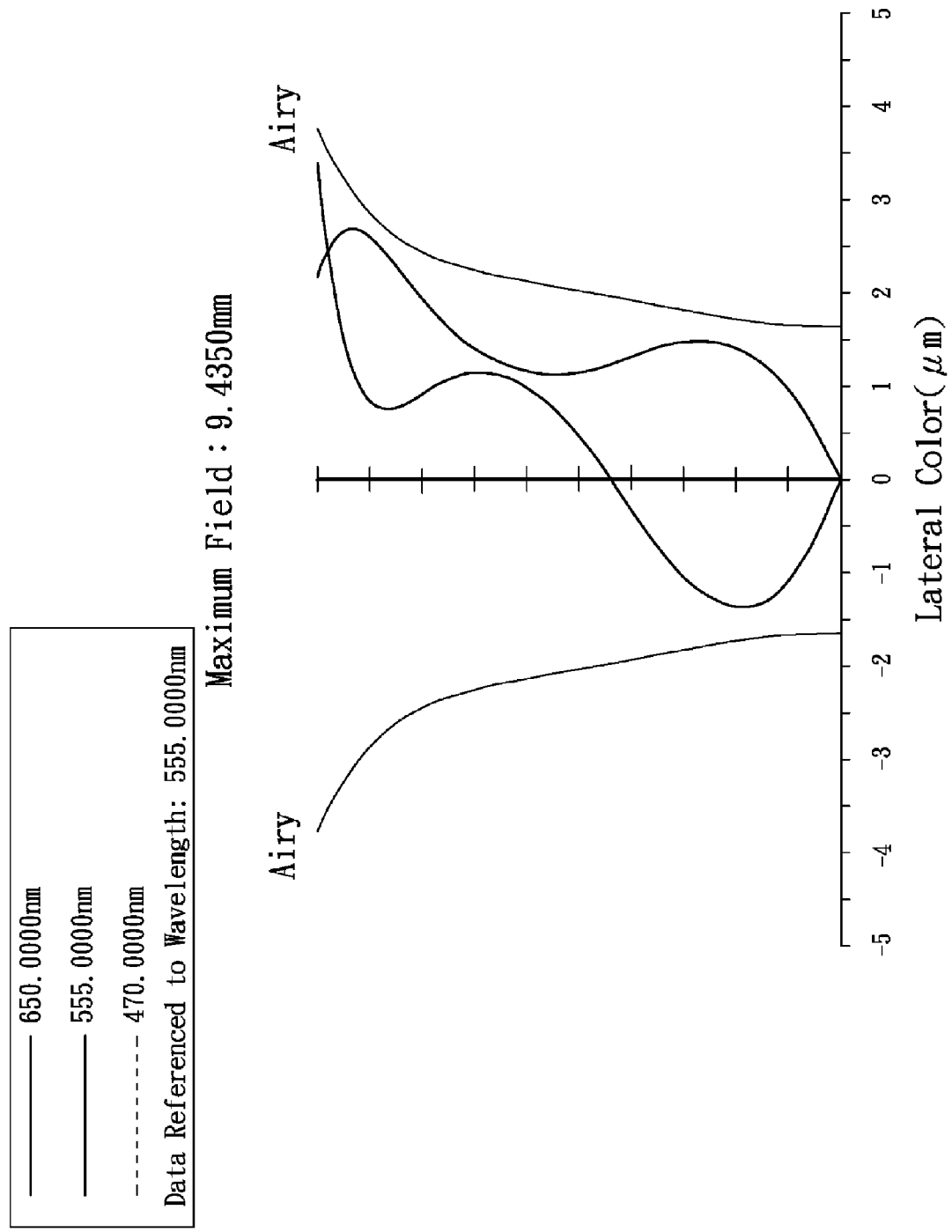
FIG. 16D is a lateral color diagram of the lens assembly in accordance with the eighth embodiment of the invention.
Figure 16E:
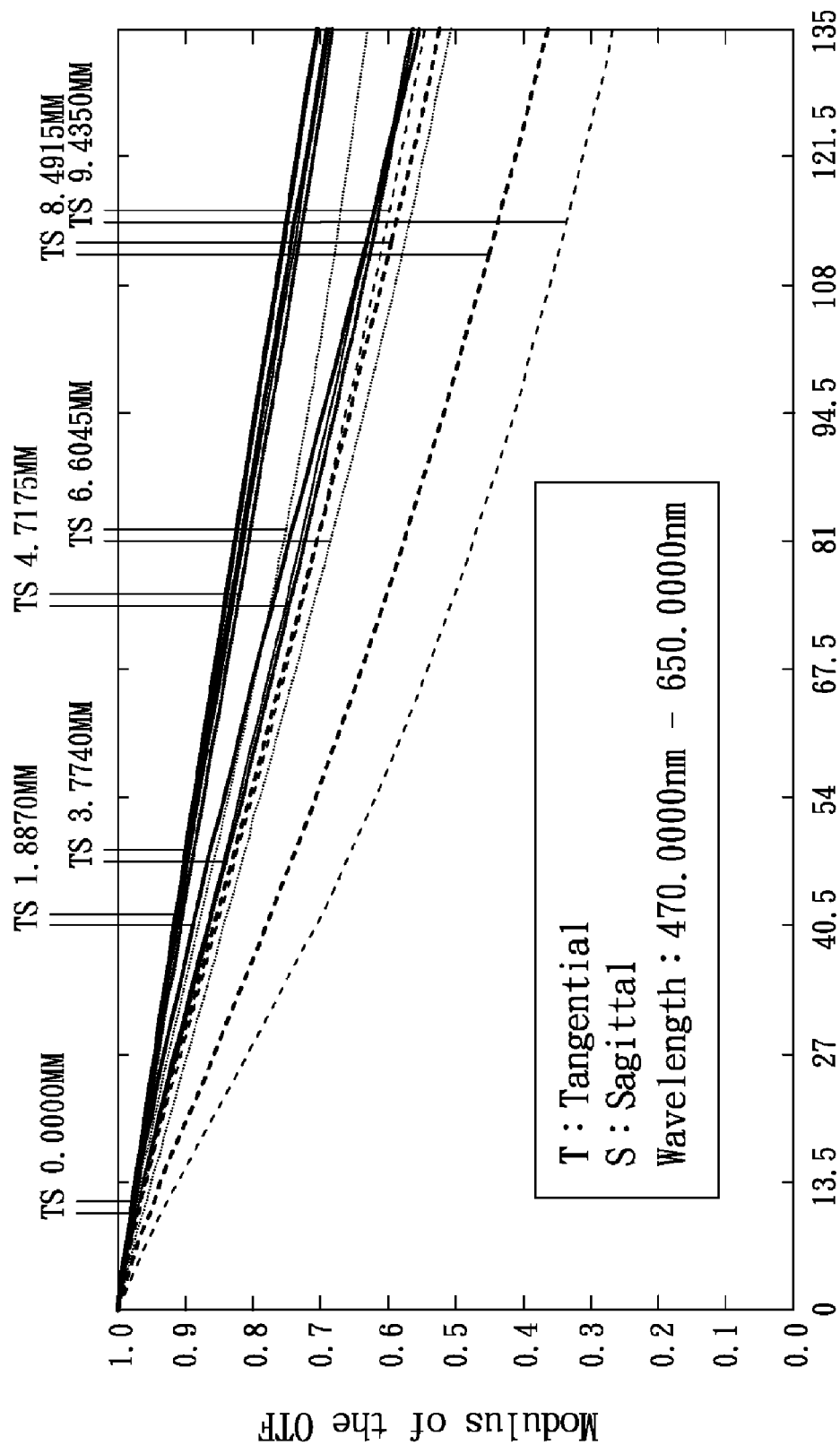
FIG. 16E is a modulation transfer function diagram of the lens assembly in accordance with the eighth embodiment of the invention.
Figure 16F:
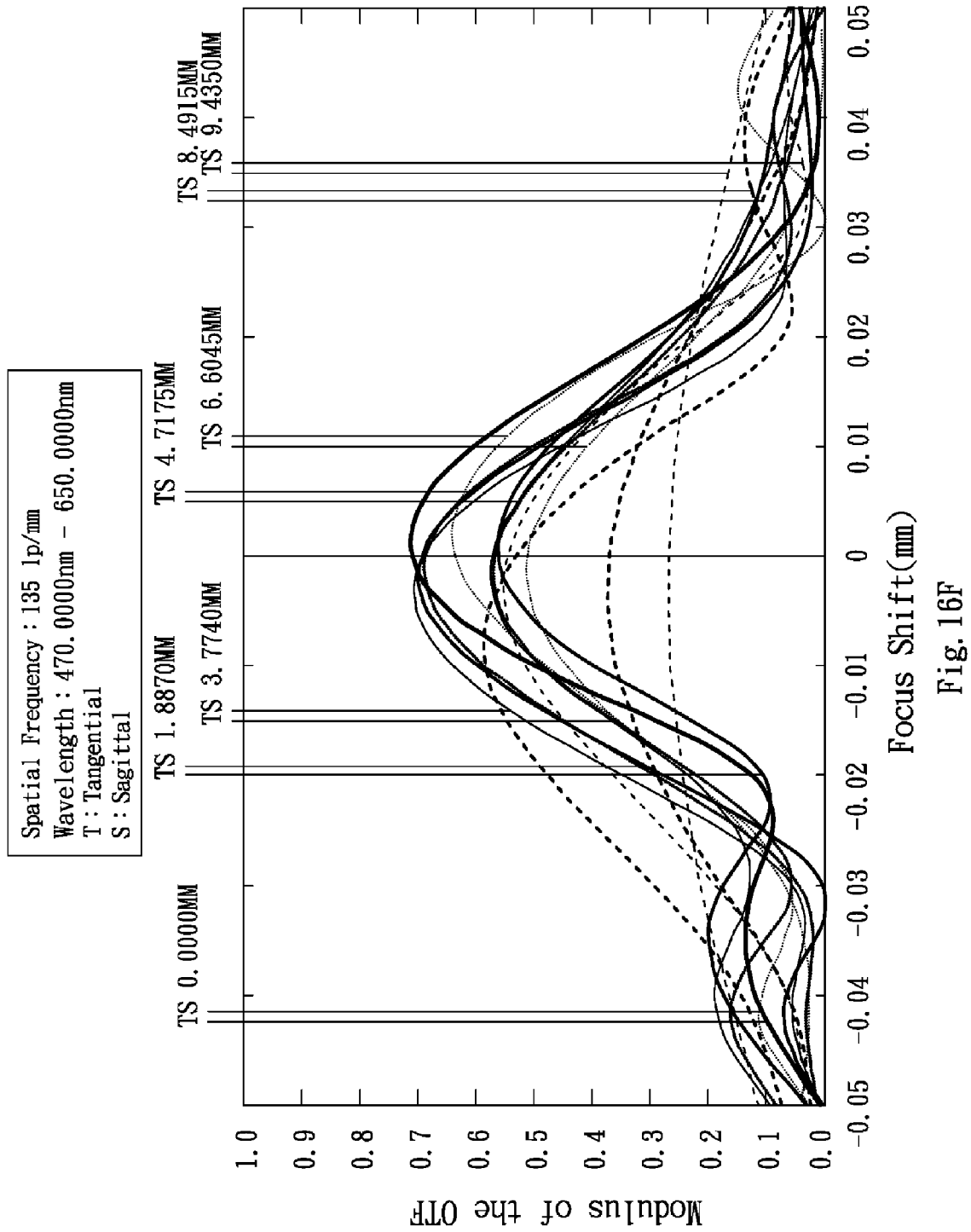
FIG. 16F is a through focus modulation transfer function diagram of the lens assembly in accordance with the eighth embodiment of the invention.
Figure 16G:
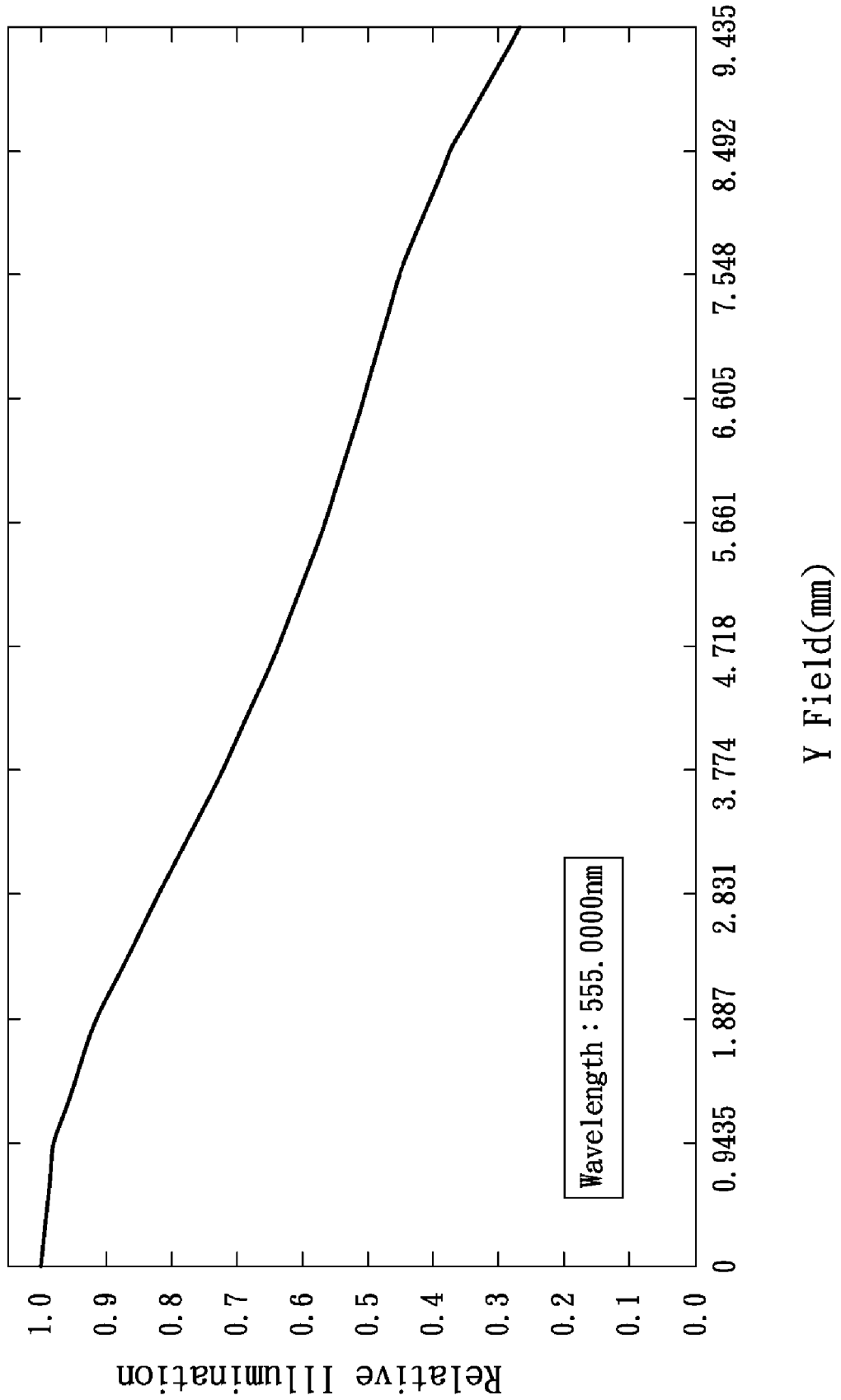
FIG. 16G is a relative illumination diagram of the lens assembly in accordance with the eighth embodiment of the invention.

By the above arrangements of the lenses and stop ST8, the lens assembly 8 of the eighth embodiment can meet the requirements of optical performance as seen in FIGS. 16A-16G, wherein FIG. 16A shows a longitudinal aberration diagram of the lens assembly 8 in accordance with the eighth embodiment of the invention, FIG. 16B shows a field curvature diagram of the lens assembly 8 in accordance with the eighth embodiment of the invention, FIG. 16C shows a distortion diagram of the lens assembly 8 in accordance with the eighth embodiment of the invention, FIG. 16D shows a lateral color diagram of the lens assembly 8 in accordance with the eighth embodiment of the invention, FIG. 16E shows a modulation transfer function diagram of the lens assembly 8 in accordance with the eighth embodiment of the invention, FIG. 16F shows a through focus modulation transfer function diagram of the lens assembly 8 in accordance with the eighth embodiment of the invention and FIG. 16G shows a relative illumination diagram of the lens assembly 8 in accordance with the eighth embodiment of the invention.

It can be seen from FIG. 16A that the longitudinal aberration in the lens assembly 8 of the eighth embodiment ranges between −0.01 mm and 0.04 mm for the wavelength of 470.0000 nm, 555.0000 nm and 650.0000 nm. It can be seen from FIG. 16B that the field curvature of tangential direction and sagittal direction in the lens assembly 8 of the eighth embodiment ranges between −0.05 mm and 0.07 mm for the wavelength of 470.0000 nm, 555.0000 nm and 650.0000 nm. It can be seen from FIG. 16C that the distortion in the lens assembly 8 of the eighth embodiment ranges between −0.2% and 5.2% for the wavelength of 470.0000 nm, 555.0000 nm and 650.0000 nm. It can be seen from FIG. 16D that the lateral color of different fields in the lens assembly 8 of the eighth embodiment ranges between −1.5 m and 3.5 m for the wavelength of 470.0000 nm, 555.0000 nm and 650.0000 nm. It can be seen from FIG. 16E that the modulation transfer function of tangential direction and sagittal direction in the lens assembly 8 of the eighth embodiment ranges between 0.26 and 1.0 wherein the wavelength ranges between 470.0000 nm and 650.0000 nm, each field is 0.0000 mm, 1.8870 mm, 3.7740 mm, 4.7175 mm, 6.6045 mm, 8.4915 mm and 9.4350 mm, spatial frequency ranges between 0 lp/mm and 135 lp/mm. It can be seen from FIG. 16F that the through focus modulation transfer function of tangential direction and sagittal direction in the lens assembly 8 of the eighth embodiment is greater than 0.2 as focus shift ranges between −0.016 mm and 0.014 mm wherein the wavelength ranges between 470.0000 nm and 650.0000 nm, each field is 0.0000 mm, 1.8870 mm, 3.7740 mm, 4.7175 mm, 6.6045 mm, 8.4915 mm and 9.4350 mm, and spatial frequency is equal to 135 lp/mm. It can be seen from FIG. 16G that the relative illumination in the lens assembly 8 of the eighth embodiment ranges between 0.26 and 1.0 for the wavelength of 555.0000 nm and Y field ranges between 0 mm and 9.435 mm. It is obvious that the longitudinal aberration, the field curvature, the distortion and the lateral color of the lens assembly 8 of the eighth embodiment can be corrected effectively, and the resolution of lens, depth of focus and relative illumination can meet the requirement. Therefore, the lens assembly 8 of the eighth embodiment is capable of good optical performance.

Figure 17:
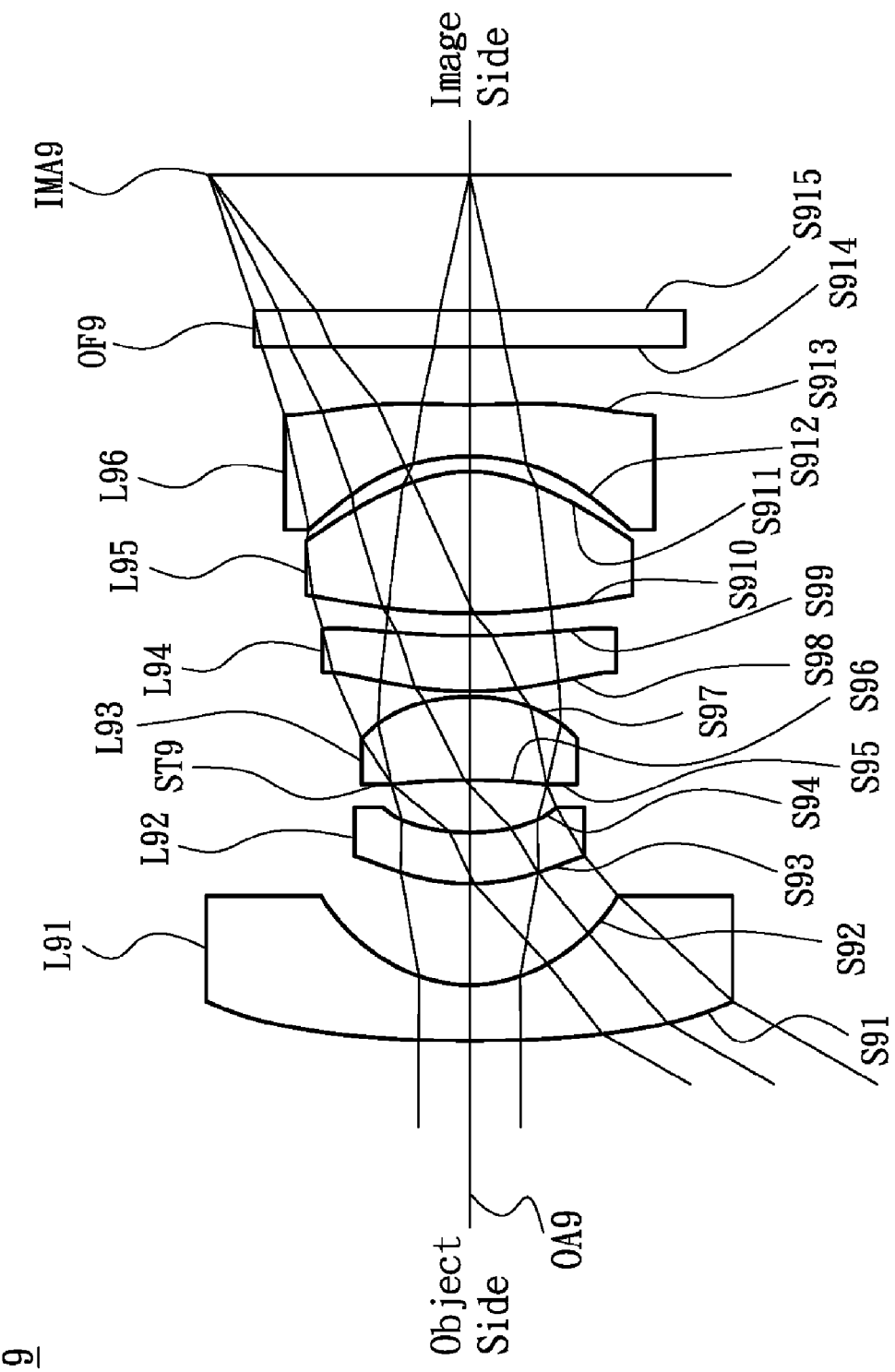
FIG. 17 is a lens layout and optical path diagram of a lens assembly in accordance with a ninth embodiment of the invention.

Referring to FIG. 17, FIG. 17 is a lens layout and optical path diagram of a lens assembly in accordance with a ninth embodiment of the invention. The lens assembly 9 includes a first lens L91, a second lens L92, a stop ST9, a third lens L93, a fourth lens L94, a fifth lens L95, a sixth lens L96 and an Optical filter OF9, all of which are arranged in sequence from an object side to an image side along an optical axis OA9. In operation, an image of light rays from the object side is formed at an image plane IMA9. The stop ST9 can help to collect light effectively so as to increase the field of view. The first lens L91 is a meniscus lens, made of plastic material and with negative refractive power, wherein the object side surface S91 is a convex surface, the image side surface S92 is a concave surface and both of the object side surface S91 and image side surface S92 are aspheric surfaces. The second lens L92 is a meniscus lens, made of plastic material and with positive refractive power, wherein the object side surface S93 is a convex surface, the image side surface S94 is a concave surface and both of the object side surface S93 and image side surface S94 are aspheric surfaces. The third lens L93 is a meniscus lens, made of plastic material and with positive refractive power, wherein the object side surface S96 is a concave surface, the image side surface S97 is a convex surface and both of the object side surface S96 and image side surface S97 are aspheric surfaces. The fourth lens L94 is a meniscus lens, made of plastic material and with positive refractive power, wherein the object side surface S98 is a convex surface, the image side surface S99 is a concave surface and both of the object side surface S98 and image side surface S99 are aspheric surfaces. The fifth lens L95 is a biconvex lens, made of plastic material and with positive refractive power, wherein both of the object side surface S910 and image side surface S911 are aspheric surfaces. The sixth lens L96 is a biconcave lens, made of plastic material and with negative refractive power, wherein both of the object side surface S912 and image side surface S913 are aspheric surfaces. Both of the object side surface S914 and image side surface S915 of the optical filter OF9 are plane surfaces.

In order to maintain excellent optical performance of the lens assembly in accordance with the ninth embodiment of the invention, the lens assembly 9 must satisfies the following seven conditions:

$$0.2 \leq BFL9/TTL9 \leq 0.4 \quad (57)$$

$$0.01 \leq f9/TTL9 \leq 0.61 \quad (58)$$

$$(Nd9_1+Nd9_2+Nd9_3+Nd9_4+Nd9_5+Nd9_6)/6 < (Nd9_2+Nd9_3)/2 \quad (59)$$

$$0.5 \leq (R9_{11}-R9_{12})/(R9_{11}+R9_{12}) \leq 0.9 \quad (60)$$

$$2 \leq f9_2/f9 \leq 7 \quad (61)$$

$$-1.6 \leq (R9_{61}-R9_{62})/(R9_{61}+R9_{62}) \leq 10 \quad (62)$$

$$Nd9_2 > Nd9_1 \quad (63)$$

wherein BFL9 is a distance from the image side surface S913 of the sixth lens L96 to the image plane IMA9 along the optical axis OA9, TTL9 is a distance from the object side surface S91 of the first lens L91 to the image plane IMA9 along the optical axis OA9, f9 is an effective focal length of the lens assembly 9, $R9_{11}$ is a radius of curvature of the object side surface S91 of the first lens L91, $R9_{12}$ is a radius of curvature of the image side surface S92 of the first lens L91, $f9_2$ is an effective focal length of the second lens L92, $f9_3$ is an effective focal length of the third lens L93, $R9_{61}$ is a radius of curvature of the object side surface S912 of the sixth lens L96, $R9_{62}$ is a radius of curvature of the image side surface S913 of the sixth lens L96, $Nd9_1$ is an index of refraction of the first lens L91, $Nd9_2$ is an index of refraction of the second lens L92, $Nd9_3$ is an index of refraction of the third lens L93, $Nd9_4$ is an index of refraction of the fourth lens L94, $Nd9_5$ is an index of refraction of the fifth lens L95, and $Nd9_6$ is an index of refraction of the sixth lens L96. The BFL9 is longer as the lens assembly 9 satisfies condition (57). The longer the back focal length, the longer the focusing range. Thus, the sixth lens L96 stands little chance to collide with the optical filter OF9.

By the above design of the lenses and stop ST9, the lens assembly 9 is provided with a shortened total lens length, an increased field of view, an effective corrected aberration and an increased resolution.

In order to achieve the above purposes and effectively enhance the optical performance, the lens assembly 9 in accordance with the ninth embodiment of the invention is provided with the optical specifications shown in Table 17, which include the effective focal length, F-number, field of view, total lens length, radius of curvature of each lens surface, thickness between adjacent surface, refractive index of each lens and Abbe number of each lens. Table 17 shows that the effective focal length is equal to 1.3612 mm, F-number is equal to 2.0, field of view is equal to 120° and total lens length is equal to 5.037 mm for the lens assembly 9 of the ninth embodiment of the invention.

TABLE 17

Effective Focal Length = 1.3612 mm F-number = 2.0
Field of View = 120° Total Lens Length = 5.037 mm

| Surface Number | Radius of Curvature (mm) | Thickness (mm) | Nd | Vd | Remark |
|---|---|---|---|---|---|
| S91 | 7.953 | 0.325 | 1.544 | 56.1 | The First Lens L91 |
| S92 | 0.855 | 0.590 | | | |
| S93 | 1.218 | 0.298 | 1.632 | 23.4 | The Second Lens L92 |
| S94 | 1.264 | 0.276 | | | |
| S95 | ∞ | 0.030 | | | Stop ST9 |
| S96 | -3.844 | 0.485 | 1.544 | 56.1 | The Third Lens L93 |
| S97 | -1.072 | 0.030 | | | |
| S98 | 2.175 | 0.324 | 1.544 | 56.1 | The Fourth Lens L94 |
| S99 | 4.521 | 0.131 | | | |
| S910 | 3.664 | 0.824 | 1.544 | 56.1 | The Fifth Lens L95 |
| S911 | -0.797 | 0.089 | | | |
| S912 | -1.208 | 0.300 | 1.632 | 23.4 | The Sixth Lens L96 |
| S913 | 5.573 | 0.337 | | | |
| S914 | ∞ | 0.210 | 1.517 | 64.2 | Optical Filter OF9 |
| S915 | ∞ | 0.789 | | | |

The aspheric surface sag z of each lens in table 17 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the ninth embodiment, the conic constant k and the aspheric coefficients A, B, C, D, E, F, G of each surface are shown in Table 18.

TABLE 18

| | Surface Number | | | | | |
|---|---|---|---|---|---|---|
| | S91 | S92 | S93 | S94 | S96 | S97 |
| k | -1.5670E+01 | -6.6249E-01 | 1.3445E+00 | 3.8114E+00 | 0.0000E+00 | -3.7606E+00 |
| A | 9.5299E-03 | -3.5658E-03 | -8.3593E-02 | 2.2429E-01 | 2.5749E-02 | -4.9295E-02 |

TABLE 18-continued

| | | | | | | |
|---|---|---|---|---|---|---|
| B | 3.9990E−03 | 2.0775E−02 | −4.8456E−02 | −3.6452E−01 | 3.0947E−01 | −2.3839E−01 |
| C | 0.0000E+00 | −5.0025E−01 | −6.7702E−02 | 2.0784E−01 | −2.4415E+00 | 4.8621E−01 |
| D | 0.0000E+00 | 4.9585E−01 | −8.8585E−01 | 1.2177E+00 | 5.0686E+00 | −2.0390E+00 |
| E | 0.0000E+00 | 0.0000E+00 | 0.0000E+00 | 0.0000E+00 | 0.0000E+00 | 0.0000E+00 |
| F | 0.0000E+00 | 0.0000E+00 | 0.0000E+00 | 0.0000E+00 | 0.0000E+00 | 0.0000E+00 |
| G | 0.0000E+00 | 0.0000E+00 | 0.0000E+00 | 0.0000E+00 | 0.0000E+00 | 0.0000E+00 |

| | Surface Number | | | | | |
|---|---|---|---|---|---|---|
| | S98 | S99 | S910 | S911 | S912 | S913 |
| k | −1.1117E+00 | −1.3840E+00 | 8.8041E−01 | −3.7486E+00 | −1.5912E+00 | −1.3068E+01 |
| A | −1.8021E−02 | −1.5393E−02 | 3.5362E−03 | −3.0165E−02 | −5.0709E−02 | −4.3310E−01 |
| B | −1.0610E−02 | −9.4816E−02 | −8.0323E−02 | −3.1684E−02 | −7.7739E−01 | 5.3253E−01 |
| C | 8.9675E−02 | 1.1085E−01 | 1.3641E−01 | 5.2553E−01 | 1.3219E+00 | −4.1484E−01 |
| D | −1.6169E−01 | −1.5411E−01 | −9.1579E−02 | −2.4613E−01 | −6.0907E−01 | 2.2424E−01 |
| E | 0.0000E+00 | 0.0000E+00 | 0.0000E+00 | 0.0000E+00 | 3.0664E−15 | −4.0157E−02 |
| F | 0.0000E+00 | 0.0000E+00 | 0.0000E+00 | 0.0000E+00 | 2.3924E−15 | −8.7901E−03 |
| G | 0.0000E+00 | 0.0000E+00 | 0.0000E+00 | 0.0000E+00 | 4.8294E−16 | −7.8568E−04 |

For the lens assembly 9 of the ninth embodiment, the distance BFL9 from the image side surface S913 of the sixth lens L96 to the image plane IMA9 along the optical axis OA9 is equal to 1.336 mm, the distance TTL9 from the object side surface S91 of the first lens L91 to the image plane IMA9 along the optical axis OA9 is equal to 5.037 mm, the effective focal length f9 of the lens assembly 9 is equal to 1.3612 mm, the radius of curvature $R9_{11}$ of the object side surface S91 of the first lens L91 is equal to 7.95292 mm, the radius of curvature $R9_{12}$ of the image side surface S92 of the first lens L91 is equal to 0.85503 mm, the effective focal length $f9_1$ of the first lens L91 is equal to −1.78369 mm, the effective focal length $f9_2$ of the second lens L92 is equal to 14.91451 mm, the effective focal length $f9_3$ of the third lens L93 is equal to 2.56607 mm, the effective focal length $f9_4$ of the fourth lens L94 is equal to 7.3199 mm, the effective focal length $f9_5$ of the fifth lens L95 is equal to 1.28234 mm, the effective focal length $f9_6$ of the sixth lens L96 is equal to −1.53079 mm, the radius of curvature $R9_{61}$ of the object side surface S912 of the sixth lens L96 is equal to −1.20763 mm, the radius of curvature $R9_{62}$ of the image side surface S913 of the sixth lens L96 is equal to 5.57254 mm, the index of refraction $Nd9_1$ of the first lens L91 is equal to 1.544, the index of refraction $Nd9_2$ of the second lens L92 is equal to 1.632, the index of refraction $Nd9_3$ of the third lens L93 is equal to 1.544, the index of refraction $Nd9_4$ of the fourth lens L94 is equal to 1.544, the index of refraction $Nd9_5$ of the fifth lens L95 is equal to 1.544, and the index of refraction $Nd9_6$ of the sixth lens L96 is equal to 1.632. According to the above data, the following values can be obtained:

*BFL9/TTL9*=0.2652,

*f9/TTL9*=0.2702, $(R9_{11}−R9_{12})/(R9_{11}+R9_{12})$=0.8059, $f9_2/f9_3$=5.8122, $(R9_{61}−R9_{62})/(R9_{61}+R9_{62})$=−1.5533, $(Nd9_1+Nd9_2++Nd9_3+Nd9_4+Nd9_5+Nd9_6)/6$=1.573, $(Nd9_2+Nd9_3)/2$=1.588 which respectively satisfy the above conditions (57)-(63).
By the above arrangements of the lenses and stop ST9, the lens assembly 9 of the ninth embodiment can meet the requirements of optical performance as seen in FIGS. 18A-18C, wherein FIG. 18A shows a longitudinal spherical aberration diagram of the lens assembly 9 in accordance with the ninth embodiment of the invention, FIG. 18B shows an astigmatic field curves of the lens assembly 9 in accordance with the ninth embodiment of the invention and FIG. 18C shows a distortion diagram of the lens assembly 9 in accordance with the ninth embodiment of the invention.

Figure 18A:
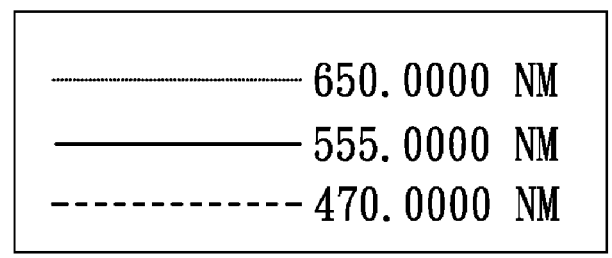
FIG. 18A depicts a longitudinal spherical aberration of the lens assembly in accordance with the ninth embodiment of the invention.
Figure 18A:
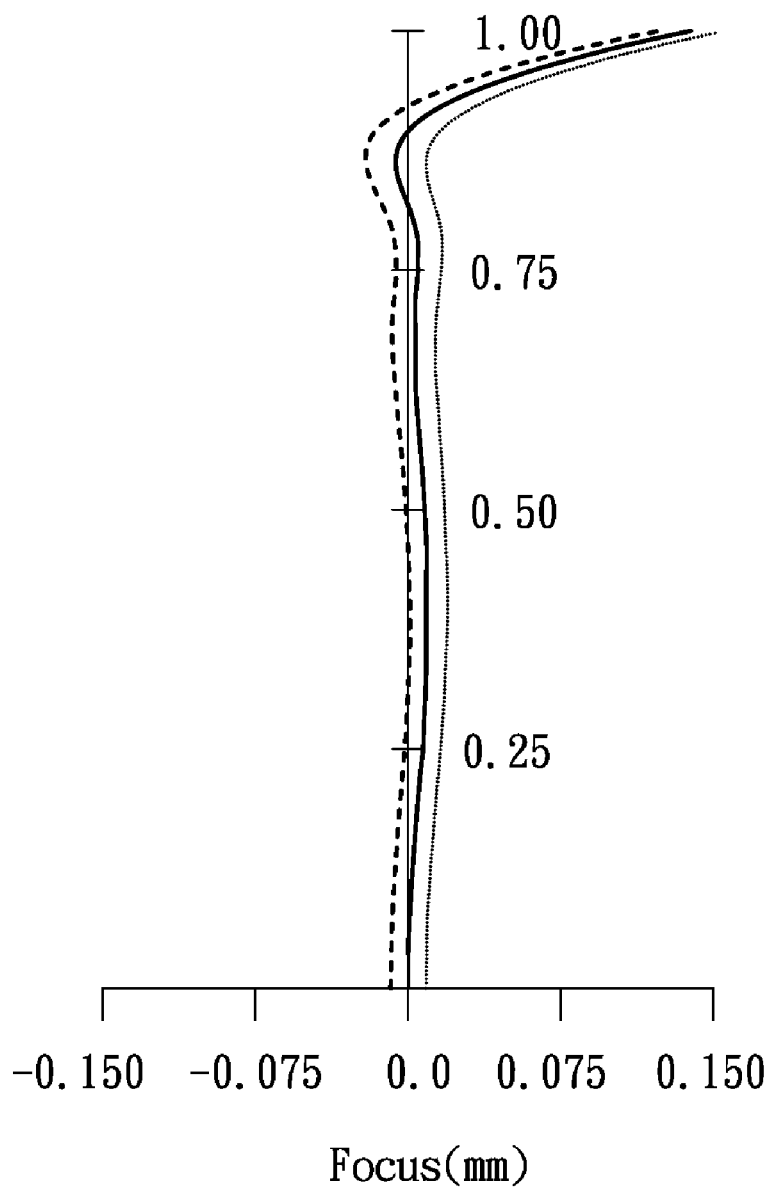
Figure 18B:
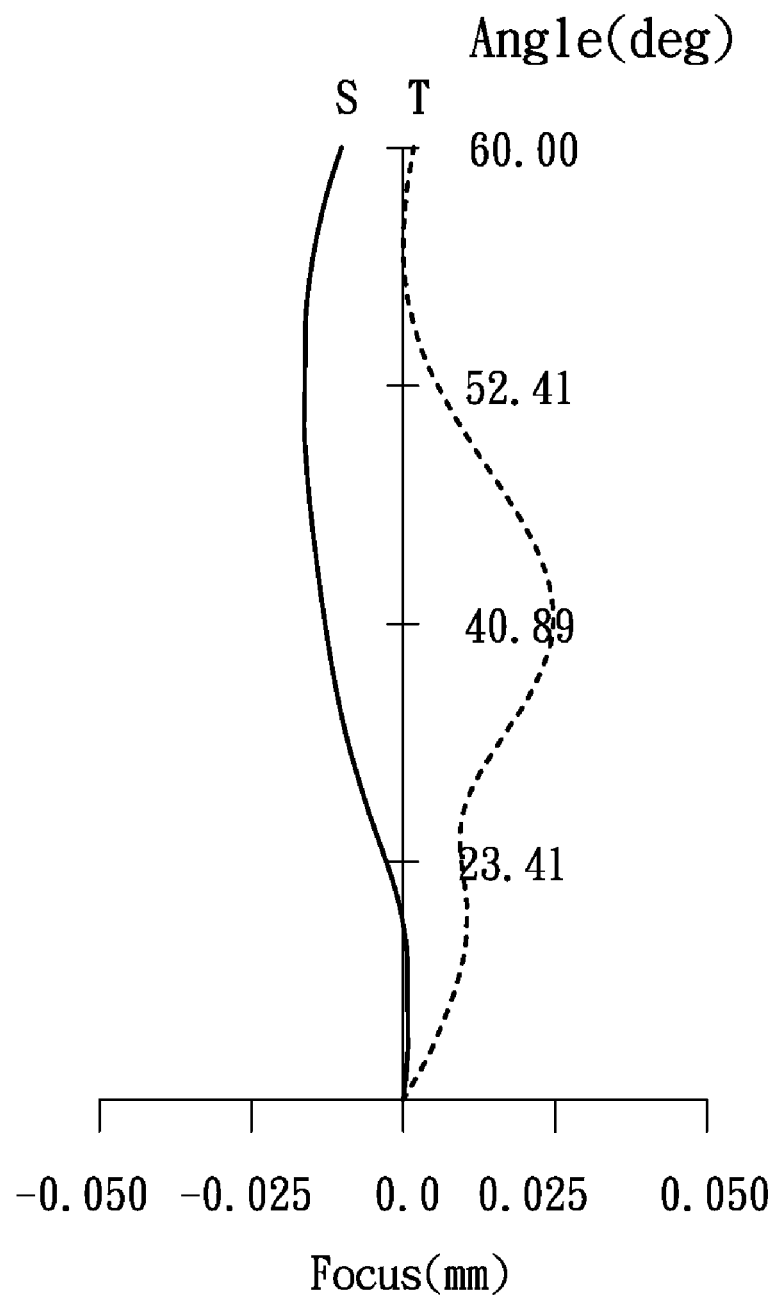
FIG. 18B is an astigmatic field curves diagram of the lens assembly in accordance with the ninth embodiment of the invention.
Figure 18C:
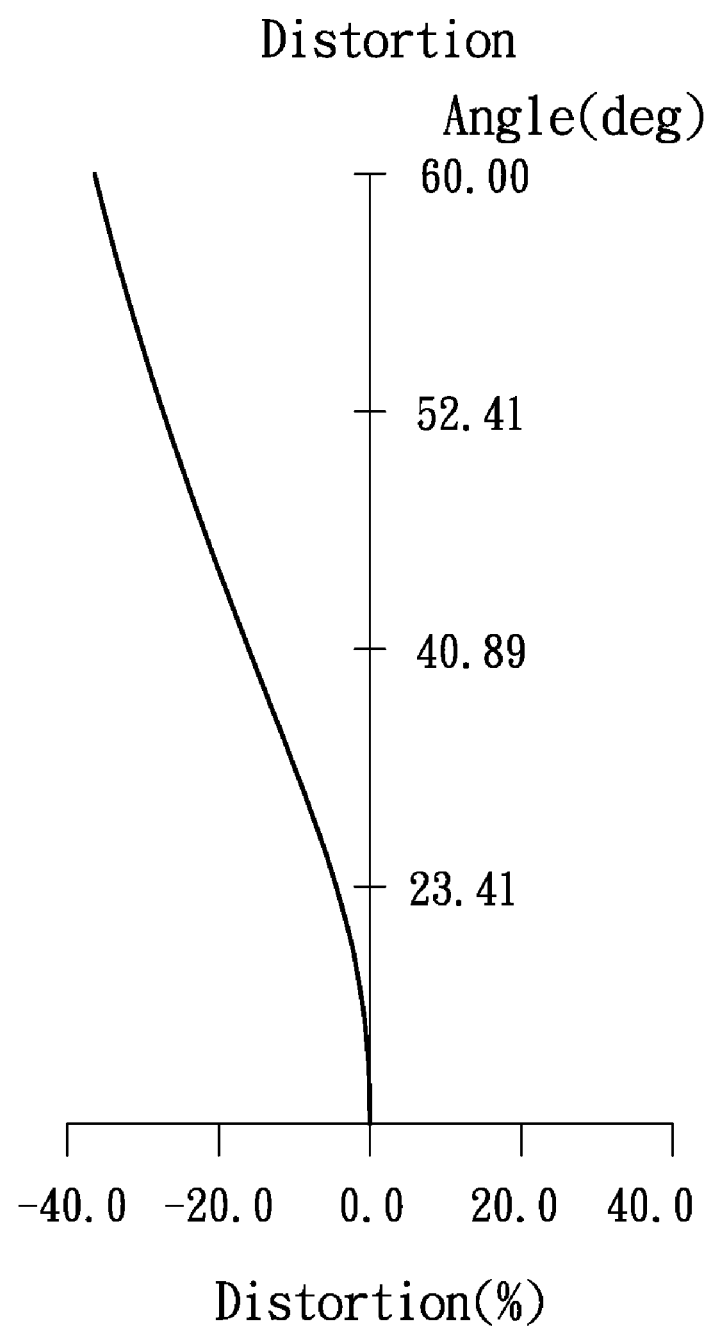
FIG. 18C is a distortion diagram of the lens assembly in accordance with the ninth embodiment of the invention.

It can be seen from FIG. 18A that the longitudinal spherical aberration in the lens assembly 9 of the ninth embodiment ranges between −0.021 mm and 0.150 mm for the wavelength of 470.0000 nm, 555.0000 nm and 650.0000 nm. It can be seen from FIG. 18B that the astigmatic field curves of tangential direction and sagittal direction in the lens assembly 9 of the ninth embodiment ranges between −0.025 mm and 0.025 mm for the wavelength of 555.0000 nm. It can be seen from FIG. 18C that the distortion in the lens assembly 9 of the ninth embodiment ranges between −40.0% and 0.0% for the wavelength of 555.0000 nm. It is obvious that the longitudinal spherical aberration, the astigmatic field curves and the distortion of the lens assembly 9 of the ninth embodiment can be corrected effectively. Therefore, the lens assembly 9 of the ninth embodiment is capable of good optical performance.

Figure 19:
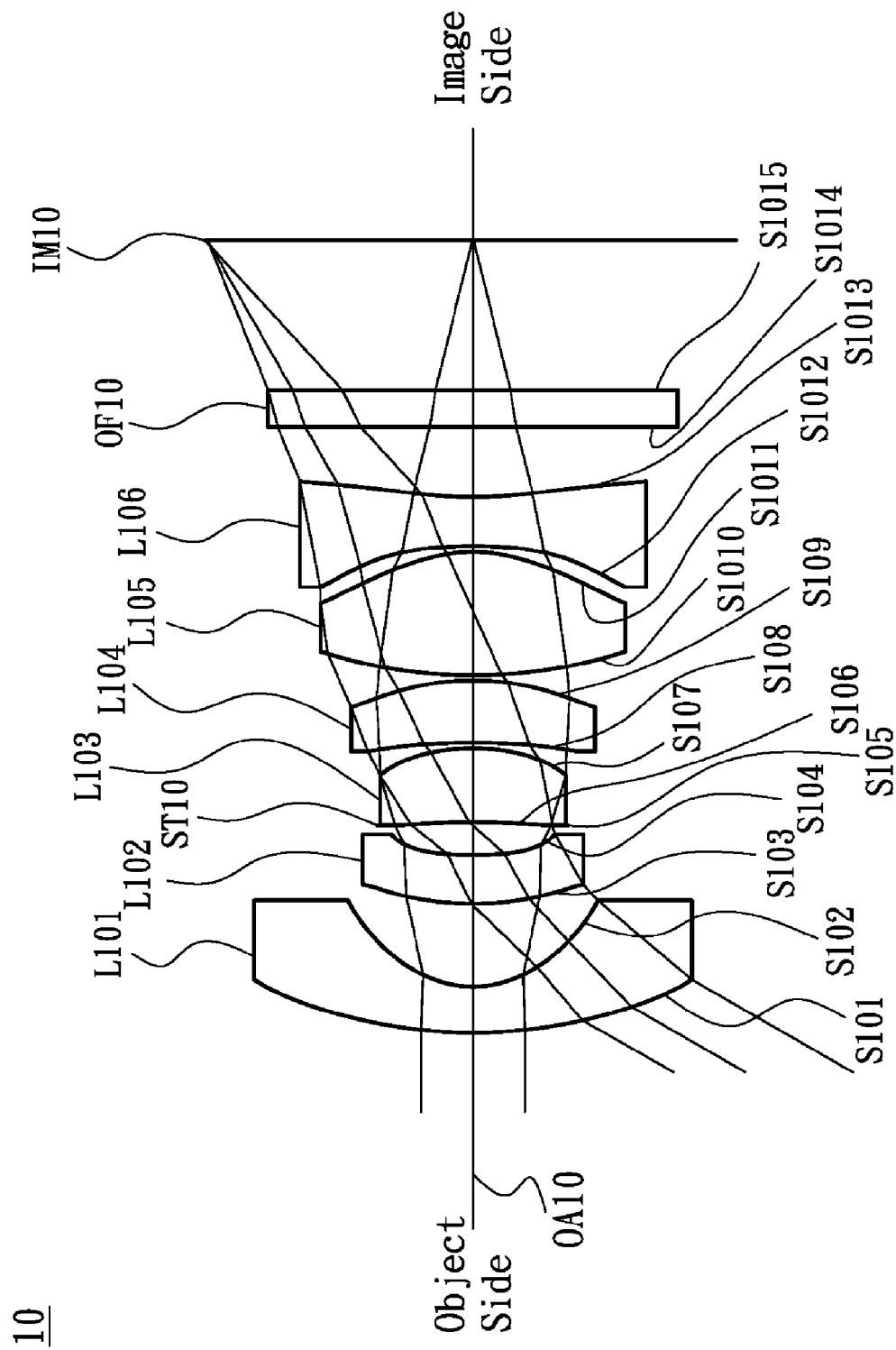
FIG. 19 is a lens layout and optical path diagram of a lens assembly in accordance with a tenth embodiment of the invention.

Referring to FIG. 19, FIG. 19 is a lens layout and optical path diagram of a lens assembly in accordance with a tenth embodiment of the invention. The lens assembly 10 includes a first lens L101, a second lens L102, a stop ST10, a third lens L103, a fourth lens L104, a fifth lens L105, a sixth lens L106 and an Optical filter OF10, all of which are arranged in sequence from an object side to an image side along an optical axis OA10. In operation, an image of light rays from the object side is formed at an image plane IMA10. The stop ST10 can help to collect light effectively so as to increase the field of view. The first lens L101 is a meniscus lens, made of plastic material and with negative refractive power, wherein the object side surface S101 is a convex surface, the image side surface S102 is a concave surface and both of the object side surface S101 and image side surface S102 are aspheric surfaces. The second lens L102 is a meniscus lens, made of plastic material and with positive refractive power, wherein the object side surface S103 is a convex surface, the image side surface S104 is a concave surface and both of the object side surface S103 and image side surface S104 are aspheric surfaces. The third lens L103 is a meniscus lens, made of plastic material and with positive refractive power, wherein the object side surface S106 is a concave surface, the image side surface S107 is a convex surface and both of the object side surface S106 and image side surface S107 are aspheric surfaces. The fourth lens L104 is a meniscus lens, made of plastic material and with positive refractive power, wherein the object side surface S108 is a concave surface, the image side surface S109 is a convex surface and both of the object side surface S108 and image side surface S109 are aspheric surfaces. The fifth lens L105 is a biconvex lens, made of plastic material and with positive refractive power, wherein both of the object side surface S1010 and image side surface S1011 are aspheric surfaces. The sixth lens L106 is a biconcave lens, made of plastic material and with negative refractive power, wherein both of the object side surface S1012 and image side surface S1013 are aspheric surfaces. Both of the object side surface S1014 and image side surface S1015 of the optical filter OF10 are plane surfaces.

In order to maintain excellent optical performance of the lens assembly in accordance with the tenth embodiment of the invention, the lens assembly 10 must satisfies the following seven conditions:

$$0.2 \leq BFL10/TTL10 \leq 0.4 \quad (64)$$

$$0.01 \leq f10/TTL10 \leq 0.61 \quad (65)$$

$$(Nd10_1+Nd10_2+Nd10_3+Nd10_4+Nd10_5+Nd10_6)/6 < (Nd10_2+Nd10_3)/2 \quad (66)$$

$$0.5 \leq (R10_{11}-R10_{12})/(R10_{11}+R10_{12}) \leq 0.9 \quad (67)$$

$$2 \leq f10_2/f10_3 \leq 7 \quad (68)$$

$$-1.6 \leq (R10_{61}-R10_{62})/(R10_{61}+R10_{62}) \leq 10 \quad (69)$$

$$Nd10_2 > Nd10_3 \quad (70)$$

wherein BFL10 is a distance from the image side surface S1013 of the sixth lens L106 to the image plane IMA10 along the optical axis OA10, TTL10 is a distance from the object side surface S101 of the first lens L101 to the image plane IMA10 along the optical axis OA10, f10 is an effective focal length of the lens assembly 10, $R10_{11}$ is a radius of curvature of the object side surface S101 of the first lens L101, $R10_{12}$ is a radius of curvature of the image side surface S102 of the first lens L101, $f10_2$ is an effective focal length of the second lens L102, $f10_3$ is an effective focal length of the third lens L103, $R10_{61}$ is a radius of curvature of the object side surface S1012 of the sixth lens L106, $R10_{62}$ is a radius of curvature of the image side surface S1013 of the sixth lens L106, $Nd10_1$ is an index of refraction of the first lens L101, $Nd10_2$ is an index of refraction of the second lens L102, $Nd10_3$ is an index of refraction of the third lens L103, $Nd10_4$ is an index of refraction of the fourth lens L104, $Nd10_5$ is an index of refraction of the fifth lens L105, and $Nd10_6$ is an index of refraction of the sixth lens L106. The BFL10 is longer as the lens assembly 10 satisfies condition (64). The longer the back focal length, the longer the focusing range. Thus, the sixth lens L106 stands little chance to collide with the optical filter OF10.

By the above design of the lenses and stop ST10, the lens assembly 10 is provided with a shortened total lens length, an increased field of view, an effective corrected aberration and an increased resolution.

In order to achieve the above purposes and effectively enhance the optical performance, the lens assembly 10 in accordance with the tenth embodiment of the invention is provided with the optical specifications shown in Table 19, which include the effective focal length, F-number, field of view, total lens length, radius of curvature of each lens surface, thickness between adjacent surface, refractive index of each lens and Abbe number of each lens. Table 19 shows that the effective focal length is equal to 1.2245 mm, F-number is equal to 2.0, field of view is equal to 120° and total lens length is equal to 4.500 mm for the lens assembly 10 of the tenth embodiment of the invention.

TABLE 19

Effective Focal Length = 1.2245 mm F-number = 2.0
Field of View = 120° Total Lens Length = 4.500 mm

| Surface Number | Radius of Curvature (mm) | Thickness (mm) | Nd | Vd | Remark |
|---|---|---|---|---|---|
| S101 | 2.582 | 0.262 | 1.544 | 56.1 | The First Lens L101 |
| S102 | 0.610 | 0.469 | | | |
| S103 | 1.714 | 0.279 | 1.632 | 23.4 | The Second Lens L102 |
| S104 | 2.202 | 0.165 | | | |
| S105 | ∞ | 0.020 | | | Stop ST10 |
| S106 | −3.528 | 0.419 | 1.544 | 56.1 | The Third Lens L103 |
| S107 | −1.185 | 0.030 | | | |
| S108 | −3.699 | 0.355 | 1.544 | 56.1 | The Fourth Lens L104 |
| S109 | −1.559 | 0.030 | | | |
| S1010 | 2.937 | 0.700 | 1.544 | 56.1 | The Fifth Lens L105 |
| S1011 | −0.861 | 0.034 | | | |
| S1012 | −2.558 | 0.277 | 1.632 | 23.4 | The Sixth Lens L106 |
| S1013 | 2.027 | 0.399 | | | |
| S1014 | ∞ | 0.210 | 1.517 | 64.2 | Optical Filter OF10 |
| S1015 | ∞ | 0.850 | | | |

The aspheric surface sag z of each lens in table 19 can be calculated by the following formula:

$$z=ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the tenth embodiment, the conic constant k and the aspheric coefficients A, B, C, D, E, F, G of each surface are shown in Table 20.

TABLE 20

| | Surface Number | | | | | |
|---|---|---|---|---|---|---|
| | S101 | S102 | S103 | S104 | S106 | S107 |
| k | −3.5476E+00 | −7.0161E−01 | 2.1623E+00 | 9.3902E+00 | 0.0000E+00 | −4.8350E+00 |
| A | −1.6314E−02 | 4.6154E−02 | −5.5880E−02 | 5.9045E−01 | 1.2914E−01 | −4.6572E−01 |
| B | 2.1189E−02 | −6.5443E−02 | 1.6021E−01 | 1.3165E+01 | 1.1443E−01 | −3.5138E−01 |
| C | 0.0000E+00 | −2.1588E−01 | 4.6785E−01 | 5.2594E+00 | −3.8922E+00 | −2.8497E−01 |
| D | 0.0000E+00 | 1.1273E+00 | −3.4956E+0 | 1.8489E+01 | 1.4431E+01 | −5.2306E+00 |
| E | 0.0000E+00 | 0.0000E+00 | 0.0000E+00 | 0.0000E+00 | 0.0000E+00 | 0.0000E+00 |

TABLE 20-continued

| | | | | | |
|---|---|---|---|---|---|
| F | 0.0000E+00 | 0.0000E+00 | 0.0000E+00 | 0.0000E+00 | 0.0000E+00 | 0.0000E+00 |
| G | 0.0000E+00 | 0.0000E+00 | 0.0000E+00 | 0.0000E+00 | 0.0000E+00 | 0.0000E+00 |

| | Surface Number | | | | | |
|---|---|---|---|---|---|---|
| | S108 | S109 | S1010 | S1011 | S1012 | S1013 |
| k | −1.7746E+00 | 1.5388E+00 | 4.0891E+00 | −4.4491E+00 | 1.1374E+00 | −1.8129E−02 |
| A | 1.7169E−02 | −1.8003E−02 | 2.8652E−02 | −2.0129E−02 | −8.6822E−02 | −4.1244E−01 |
| B | 4.5363E−02 | 1.2523E−01 | −1.1144E−01 | −2.9217E−02 | −7.4493E−01 | 4.8981E−01 |
| C | −2.0886E−01 | 4.6658E−01 | 1.3248E−02 | 5.5343E−01 | 1.3420E+01 | −4.2245E−01 |
| D | −1.7742E−01 | 3.9469E−01 | −4.0040E−02 | −2.2644E−01 | −5.9141E−01 | 3.2391E−01 |
| E | 0.0000E+00 | 0.0000E+00 | 0.0000E+00 | 0.0000E+00 | 1.8660E−14 | −4.0157E−02 |
| F | 0.0000E+00 | 0.0000E+00 | 0.0000E+00 | 0.0000E+00 | 2.4415E−15 | −8.7901E−03 |
| G | 0.0000E+00 | 0.0000E+00 | 0.0000E+00 | 0.0000E+00 | 4.8294E−16 | −7.8568E−04 |

For the lens assembly 10 of the tenth embodiment, the distance BFL10 from the image side surface S1013 of the sixth lens L106 to the image plane IMA10 along the optical axis OA10 is equal to 1.460 mm, the distance TTL10 from the object side surface S101 of the first lens L101 to the image plane IMA10 along the optical axis OA10 is equal to 4.500 mm, the effective focal length f10 of the lens assembly 10 is equal to 1.2245 mm, the radius of curvature $R10_{11}$ of the object side surface S101 of the first lens L101 is equal to 2.58170 mm, the radius of curvature $R10_{12}$ of the image side surface S102 of the first lens L101 is equal to 0.60995 mm, the effective focal length $f10_1$ of the first lens L101 is equal to −1.53490 mm, the effective focal length $f10_2$ of the second lens L102 is equal to 9.93423 mm, the effective focal length $f10_3$ of the third lens L103 is equal to 3.07573 mm, the effective focal length $f10_4$ of the fourth lens L104 is equal to 4.6620 mm, the effective focal length $f10_5$ of the fifth lens L105 is equal to 1.30462 mm, the effective focal length $f10_6$ of the sixth lens L106 is equal to −1.73374 mm, the radius of curvature $R10_{61}$ of the object side surface S1012 of the sixth lens L106 is equal to −2.55835 mm, the radius of curvature $R10_{62}$ of the image side surface S1013 of the sixth lens L106 is equal to 2.02738 mm, the index of refraction Nd10 of the first lens L101 is equal to 1.544, the index of refraction $Nd10_2$ of the second lens L102 is equal to 1.632, the index of refraction $Nd10_3$ of the third lens L103 is equal to 1.544, the index of refraction $Nd10_4$ of the fourth lens L104 is equal to 1.544, the index of refraction $Nd10_5$ of the fifth lens L105 is equal to 1.544, and the index of refraction $Nd10_6$ of the sixth lens L106 is equal to 1.632. According to the above data, the following values can be obtained:

$$BFL10/TTL10=0.3244,$$

$$f10/TTL10=0.2721,$$

$$(R10_{11}-R10_{12})/(R10_{11}+R10_{12})=0.6178,$$

$$f10_2/f10_3=3.2299,$$

$$(R10_{61}-R10_{62})/(R10_{61}+R10_{62})=8.6366,$$

$$(Nd10_1+Nd10_2++Nd10_3+Nd10_4+Nd10_5+Nd10_6)/6=1.573,$$

$$(Nd10_2+Nd10_3)/2=1.588$$

which respectively satisfy the above conditions (64)-(70).

Figure 20A:
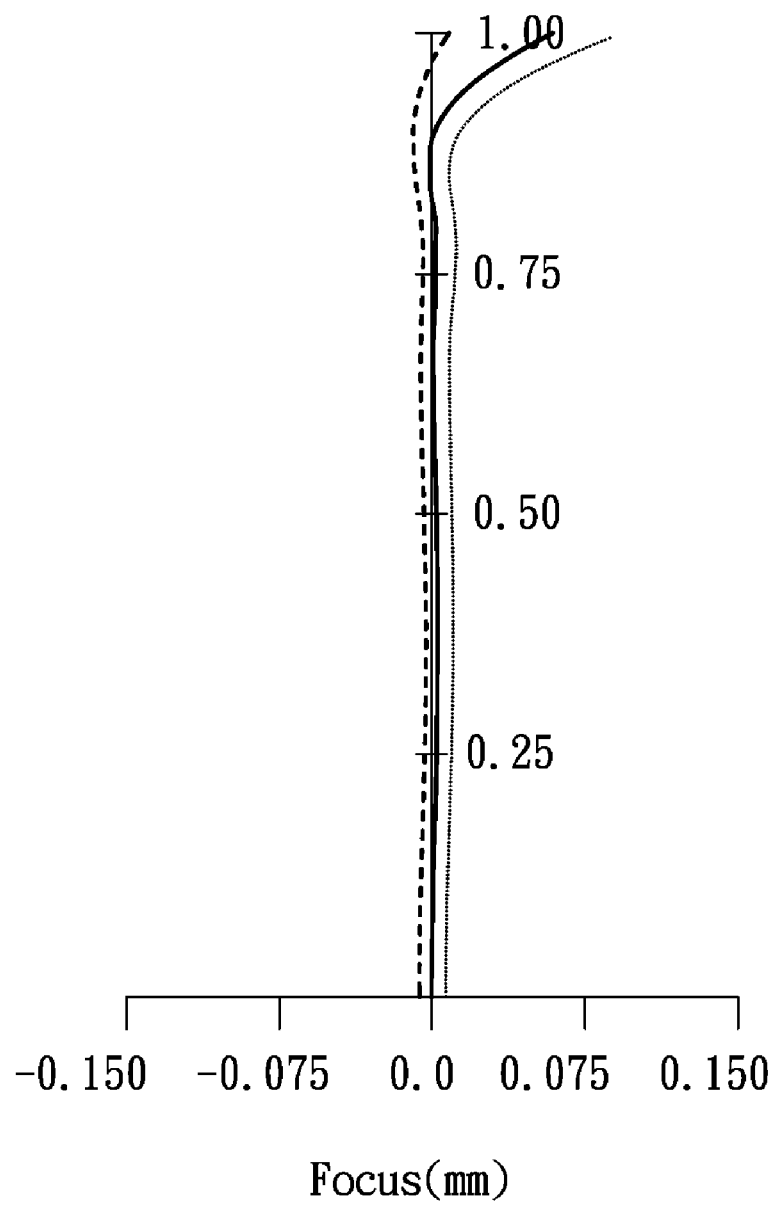
FIG. 20A depicts a longitudinal spherical aberration of the lens assembly in accordance with the tenth embodiment of the invention.
Figure 20B:
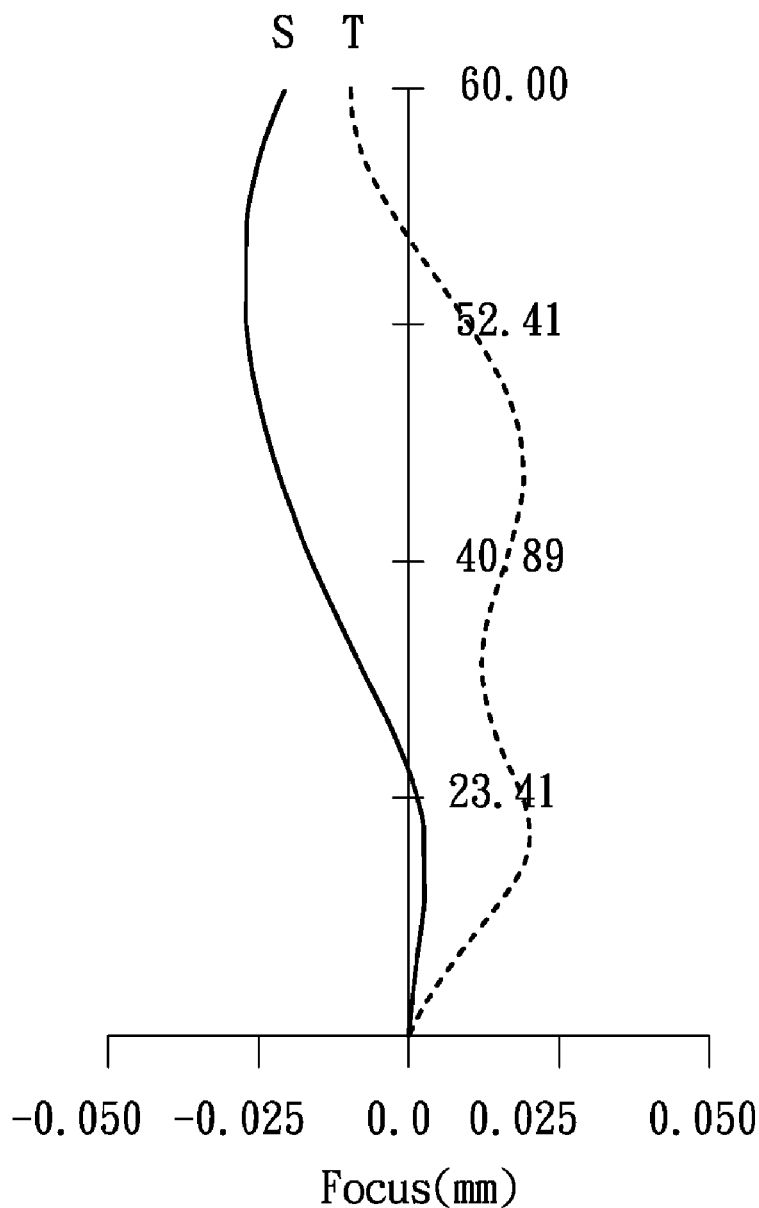
FIG. 20B is an astigmatic field curves diagram of the lens assembly in accordance with the tenth embodiment of the invention.
Figure 20C:
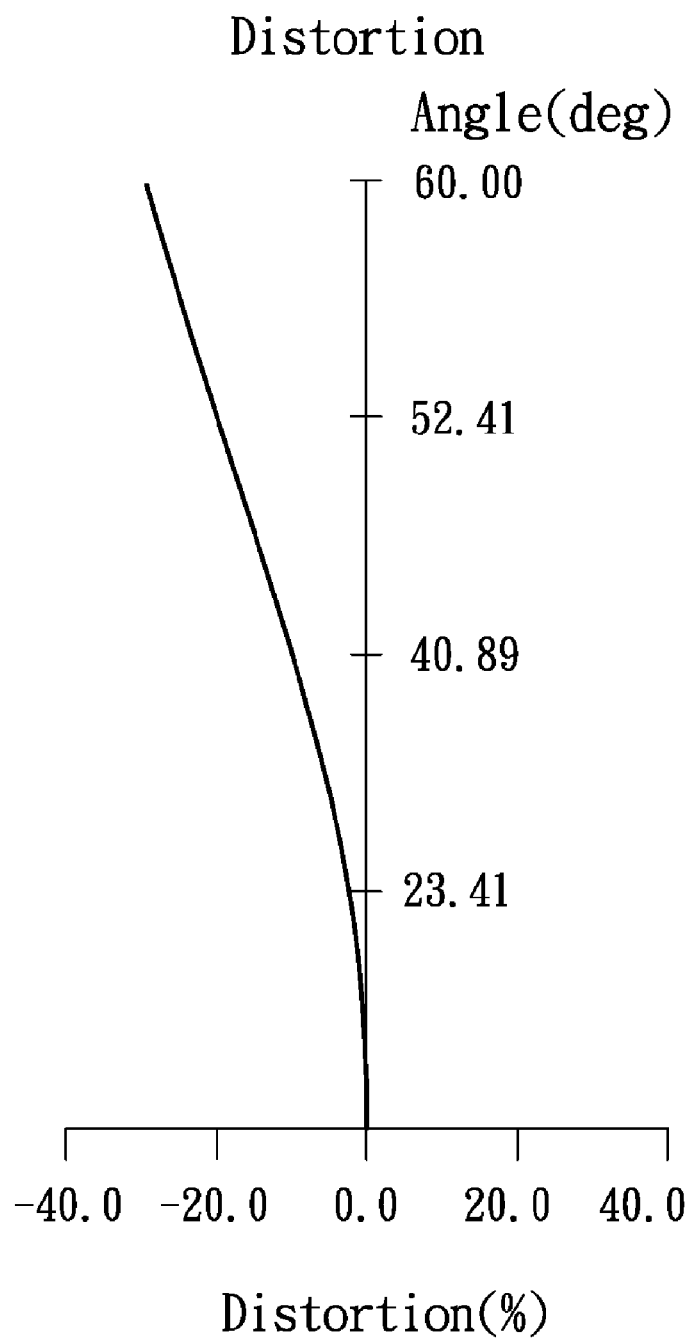
FIG. 20C is a distortion diagram of the lens assembly in accordance with the tenth embodiment of the invention.

By the above arrangements of the lenses and stop ST10, the lens assembly 10 of the tenth embodiment can meet the requirements of optical performance as seen in FIGS. 20A-20C, wherein FIG. 20A shows a longitudinal spherical aberration diagram of the lens assembly 10 in accordance with the tenth embodiment of the invention, FIG. 20B shows an astigmatic field curves of the lens assembly 10 in accordance with the tenth embodiment of the invention and FIG. 20C shows a distortion diagram of the lens assembly 10 in accordance with the tenth embodiment of the invention.

It can be seen from FIG. 20A that the longitudinal spherical aberration in the lens assembly 10 of the tenth embodiment ranges between −0.010 mm and 0.089 mm for the wavelength of 470.0000 nm, 555.0000 nm and 650.0000 nm. It can be seen from FIG. 20B that the astigmatic field curves of tangential direction and sagittal direction in the lens assembly 10 of the tenth embodiment ranges between −0.027 mm and 0.025 mm for the wavelength of 555.0000 nm. It can be seen from FIG. 20C that the distortion in the lens assembly 10 of the tenth embodiment ranges between −29.1.0% and 0.0% for the wavelength of 555.0000 nm. It is obvious that the longitudinal spherical aberration, the astigmatic field curves and the distortion of the lens assembly 10 of the tenth embodiment can be corrected effectively. Therefore, the lens assembly 10 of the tenth embodiment is capable of good optical performance.

Figure 21:
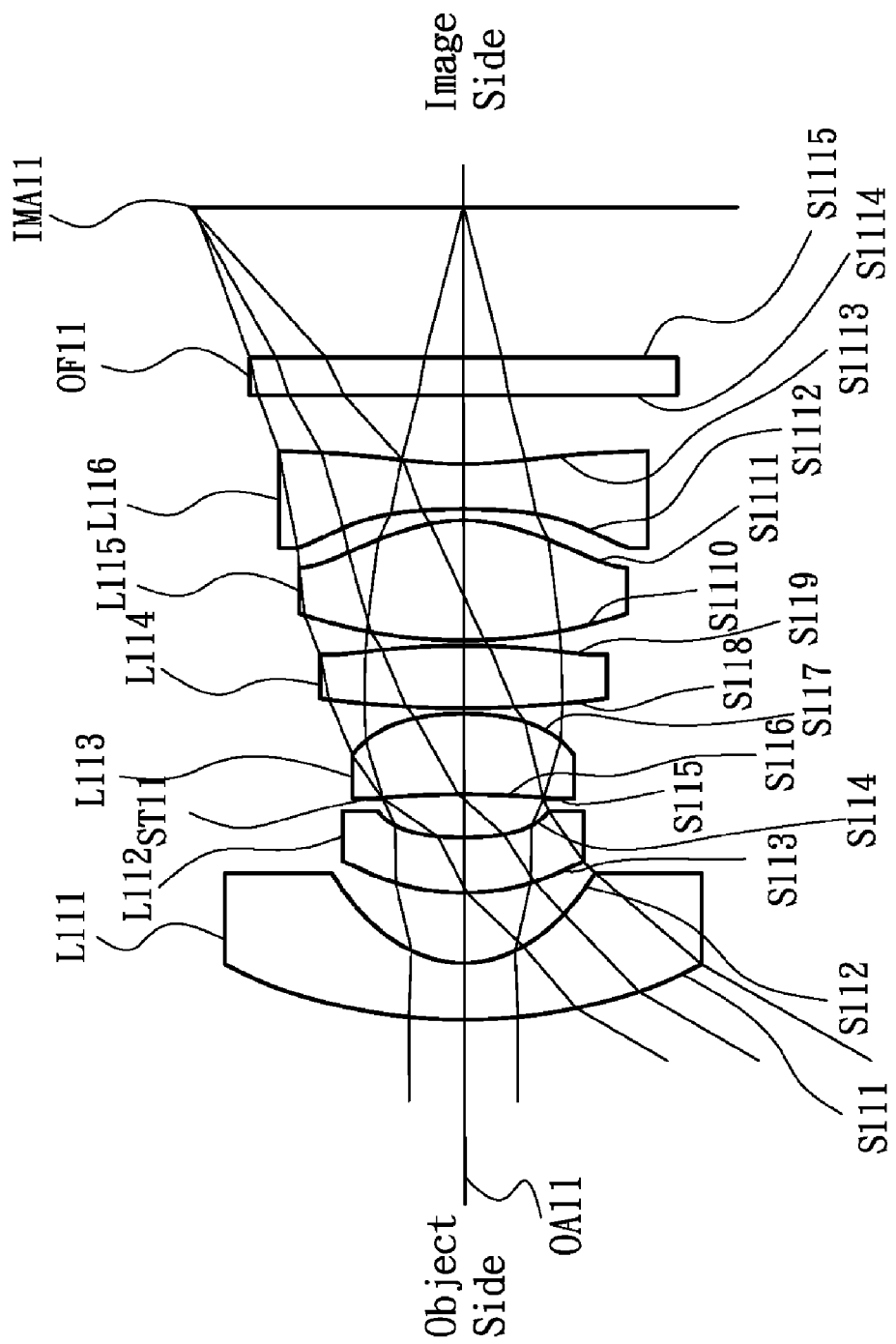
FIG. 21 is a lens layout and optical path diagram of a lens assembly in accordance with a eleventh embodiment of the invention.

Referring to FIG. 21, FIG. 21 is a lens layout and optical path diagram of a lens assembly in accordance with an eleventh embodiment of the invention. The lens assembly 11 includes a first lens L111, a second lens L112, a stop ST11, a third lens L113, a fourth lens L114, a fifth lens L115, a sixth lens L116 and an Optical filter OF11, all of which are arranged in sequence from an object side to an image side along an optical axis OA11. In operation, an image of light rays from the object side is formed at an image plane IMA11. The stop ST11 can help to collect light effectively so as to increase the field of view. The first lens L111 is a meniscus lens, made of plastic material and with negative refractive power, wherein the object side surface S111 is a convex surface, the image side surface S112 is a concave surface and both of the object side surface S111 and image side surface S112 are aspheric surfaces. The second lens L112 is a meniscus lens, made of plastic material and with positive refractive power, wherein the object side surface S113 is a convex surface, the image side surface S114 is a concave surface and both of the object side surface S113 and image side surface S114 are aspheric surfaces. The third lens L113 is a meniscus lens, made of plastic material and with positive refractive power, wherein the object side surface S116 is a concave surface, the image side surface S117 is a convex surface and both of the object side surface S116 and image side surface S117 are aspheric surfaces. The fourth lens L114 is a biconvex lens, made of plastic material and with positive refractive power, wherein both of the object side surface S118 and image side surface S119 are aspheric surfaces. The fifth lens L115 is a biconvex lens, made of plastic material and with positive refractive power, wherein both of the object side surface S1110 and image side surface S1111 are aspheric surfaces. The sixth lens L116 is a biconcave lens, made of plastic material and with negative refractive power, wherein both of the object side surface S1112 and image side surface S1113 are aspheric surfaces. Both of the object side surface S1114 and image side surface S1115 of the optical filter OF11 are plane surfaces.

In order to maintain excellent optical performance of the lens assembly in accordance with the eleventh embodiment of the invention, the lens assembly 11 must satisfies the following seven conditions:

$$0.2 \leq BFL11/TTL11 \leq 0.4 \quad (71)$$

$$0.01 \leq f11/TTL11 \leq 0.61 \quad (72)$$

$$(Nd11_1+Nd11_2+Nd11_3+Nd11_4+Nd11_5+Nd11_6)/6 < (Nd11_2+Nd11_3)/2 \quad (73)$$

$$0.5 \leq (R11_{11}-R11_{12})/(R11_{11}+R11_{12}) \leq 0.9 \quad (74)$$

$$2 \leq f11_2/f11_3 \leq 7 \quad (75)$$

$$-1.6 \leq (R11_{61}-R11_{62})/(R11_{61}+R11_{62}) \leq 10 \quad (76)$$

$$Nd11_2 > Nd11_3 \quad (77)$$

wherein BFL11 is a distance from the image side surface S1113 of the sixth lens L116 to the image plane IMA11 along the optical axis OA11, TTL11 is a distance from the object side surface S111 of the first lens L111 to the image plane IMA11 along the optical axis OA11, f11 is an effective focal length of the lens assembly 11, $R11_{11}$ is a radius of curvature of the object side surface S111 of the first lens L111, $R11_{12}$ is a radius of curvature of the image side surface S112 of the first lens L111, $f11_2$ is an effective focal length of the second lens L112, $f11_3$ is an effective focal length of the third lens L113, $R11_{61}$ is a radius of curvature of the object side surface S1112 of the sixth lens L116, $R11_{62}$ is a radius of curvature of the image side surface S1113 of the sixth lens L116, $Nd11_1$ is an index of refraction of the first lens L111, $Nd11_2$ is an index of refraction of the second lens L112, $Nd11_3$ is an index of refraction of the third lens L113, $Nd11_4$ is an index of refraction of the fourth lens L114, $Nd11_5$ is an index of refraction of the fifth lens L115, and $Nd11_6$ is an index of refraction of the sixth lens L116. The BFL11 is longer as the lens assembly 11 satisfies condition (71). The longer the back focal length, the longer the focusing range. Thus, the sixth lens L116 stands little chance to collide with the optical filter OF11.

By the above design of the lenses and stop ST11, the lens assembly 11 is provided with a shortened total lens length, an increased field of view, an effective corrected aberration and an increased resolution.

In order to achieve the above purposes and effectively enhance the optical performance, the lens assembly 11 in accordance with the eleventh embodiment of the invention is provided with the optical specifications shown in Table 21, which include the effective focal length, F-number, field of view, total lens length, radius of curvature of each lens surface, thickness between adjacent surface, refractive index of each lens and Abbe number of each lens. Table 21 shows that the effective focal length is equal to 1.2025 mm, F-number is equal to 2.0, field of view is equal to 120° and total lens length is equal to 4.500 mm for the lens assembly 11 of the eleventh embodiment of the invention.

TABLE 21

Effective Focal Length = 1.2025 mm F-number = 2.0
Field of View = 120° Total Lens Length = 4.500 mm

| Surface Number | Radius of Curvature (mm) | Thickness (mm) | Nd | Vd | Remark |
|---|---|---|---|---|---|
| S111 | 2.902 | 0.314 | 1.544 | 56.1 | The First Lens L111 |
| S112 | 0.611 | 0.389 | | | |
| S113 | 1.353 | 0.305 | 1.632 | 23.4 | The Second Lens L112 |
| S114 | 1.541 | 0.215 | | | |
| S115 | ∞ | 0.025 | | | Stop ST11 |
| S116 | −4.409 | 0.447 | 1.544 | 56.1 | The Third Lens L113 |
| S117 | −1.444 | 0.030 | | | |
| S118 | 5.146 | 0.347 | 1.544 | 56.1 | The Fourth Lens L114 |
| S119 | −4.281 | 0.030 | | | |
| S1110 | 2.838 | 0.663 | 1.544 | 56.1 | The Fifth Lens L115 |
| S1111 | −0.849 | 0.061 | | | |
| S1112 | −3.788 | 0.250 | 1.632 | 23.4 | The Sixth Lens L116 |
| S1113 | 1.989 | 0.381 | | | |
| S1114 | ∞ | 0.210 | 1.517 | 64.2 | Optical Filter OF11 |
| S1115 | ∞ | 0.832 | | | |

The aspheric surface sag z of each lens in table 21 can be calculated by the following formula:

$$z = ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the eleventh embodiment, the conic constant k and the aspheric coefficients A, B, C, D, E, F, G of each surface are shown in Table 22.

TABLE 22

| | Surface Number | | | | | |
|---|---|---|---|---|---|---|
| | S111 | S112 | S113 | S114 | S116 | S117 |
| k | −3.1141E+00 | −7.2403E−01 | 2.0089E+00 | 7.7662E+00 | 0.0000E+00 | −3.0614E+00 |
| A | −1.1469E−02 | 4.1926E−02 | −2.5452E−03 | 4.9536E−01 | 2.3334E−02 | −5.1463E−01 |
| B | 1.5043E−02 | −5.8226E−02 | −9.6315E−03 | 6.4735E−01 | 5.0058E−01 | −3.0707E−01 |
| C | 0.0000E+00 | −1.0576E−01 | 8.7663E−02 | 1.8683E+00 | −3.8347E+00 | 2.4359E−02 |
| D | 0.0000E+00 | 4.4910E−01 | −2.2587E+0 | 1.3195E+00 | 4.1380E+01 | −3.2696E+00 |
| E | 0.0000E+00 | 0.0000E+00 | 0.0000E+00 | 0.0000E+00 | 0.0000E+00 | 0.0000E+00 |
| F | 0.0000E+00 | 0.0000E+00 | 0.0000E+00 | 0.0000E+00 | 0.0000E+00 | 0.0000E+00 |
| G | 0.0000E+00 | 0.0000E+00 | 0.0000E+00 | 0.0000E+00 | 0.0000E+00 | 0.0000E+00 |
| | Surface Number | | | | | |
| | S118 | S119 | S1110 | S1111 | S1112 | S1113 |
| k | −1.4970E+02 | 6.0188E+01 | −5.3808E−01 | −4.4038E+00 | 3.0703E+00 | −3.0227E−02 |
| A | 4.6492E−02 | 7.8745E−03 | −2.1262E−03 | 1.1795E−02 | −9.3647E−02 | −4.6604E−01 |

TABLE 22-continued

| | | | | | | |
|---|---|---|---|---|---|---|
| B | 4.3907E−02 | 8.2069E−02 | −6.2870E−02 | −2.5992E−01 | −7.8498E−01 | 5.1909E−01 |
| C | −1.8756E−01 | 4.9639E−02 | 1.2870E−01 | 3.6799E−01 | 4.3395E+00 | −4.1949E−01 |
| D | 1.4756E−01 | 2.1672E−01 | −2.5189E−02 | −2.2858E−01 | −5.5397E−01 | 2.2000E−01 |
| E | 0.0000E+00 | 0.0000E+00 | 0.0000E+00 | 0.0000E+00 | 7.1626E−14 | −4.0157E−02 |
| F | 0.0000E+00 | 0.0000E+00 | 0.0000E+00 | 0.0000E+00 | 2.9439E−15 | −8.7901E−03 |
| G | 0.0000E+00 | 0.0000E+00 | 0.0000E+00 | 0.0000E+00 | 4.8268E−16 | −7.8568E−04 |

For the lens assembly 11 of the eleventh embodiment, the distance BFL11 from the image side surface S1113 of the sixth lens L116 to the image plane IMA11 along the optical axis OA11 is equal to 1.423 mm, the distance TTL11 from the object side surface S111 of the first lens L111 to the image plane IMA11 along the optical axis OA11 is equal to 4.500 mm, the effective focal length f11 of the lens assembly 11 is equal to 1.2025 mm, the radius of curvature $R11_{11}$ of the object side surface S111 of the first lens L111 is equal to 2.90157 mm, the radius of curvature $R11_{12}$ of the image side surface S112 of the first lens L111 is equal to 0.61127 mm, the effective focal length $f11_1$ of the first lens L111 is equal to −1.49075 mm, the effective focal length $f11_2$ of the second lens L112 is equal to 10.66214 mm, the effective focal length $f11_3$ of the third lens L113 is equal to 3.73395 mm, the effective focal length $f11_4$ of the fourth lens L114 is equal to 4.3368 mm, the effective focal length $f11_5$ of the fifth lens L115 is equal to 1.27868 mm, the effective focal length $f11_6$ of the sixth lens L116 is equal to −2.01250 mm, the radius of curvature $R11_{61}$ of the object side surface S1112 of the sixth lens L116 is equal to −3.78830 mm, the radius of curvature $R11_{62}$ of the image side surface S1113 of the sixth lens L116 is equal to 1.98929 mm, the index of refraction Nd11 of the first lens L111 is equal to 1.544, the index of refraction $Nd11_2$ of the second lens L112 is equal to 1.632, the index of refraction $Nd11_3$ of the third lens L113 is equal to 1.544, the index of refraction $Nd11_4$ of the fourth lens L114 is equal to 1.544, the index of refraction $Nd11_5$ of the fifth lens L115 is equal to 1.544, and the index of refraction $Nd11_6$ of the sixth lens L116 is equal to 1.632. According to the above data, the following values can be obtained:

$$BFL11/TTL11=0.3163,$$

$$f11/TTL11=0.2672,$$

$$(R11_{11}-R11_{12})/(R11_{11}+R11_{12})=0.6520,$$

$$f11_2/f11_3=2.8555,$$

$$(R11_{61}-R11_{62})/(R11_{61}+R11_{62})=3.2115,$$

$$(Nd11_1+Nd11_2++Nd11_3+Nd11_4+Nd11_5+Nd11_6)/6=1.573,$$

$$(Nd11_2+Nd11_3)/2=1.588$$

which respectively satisfy the above conditions (71)-(77).

Figure 22A:
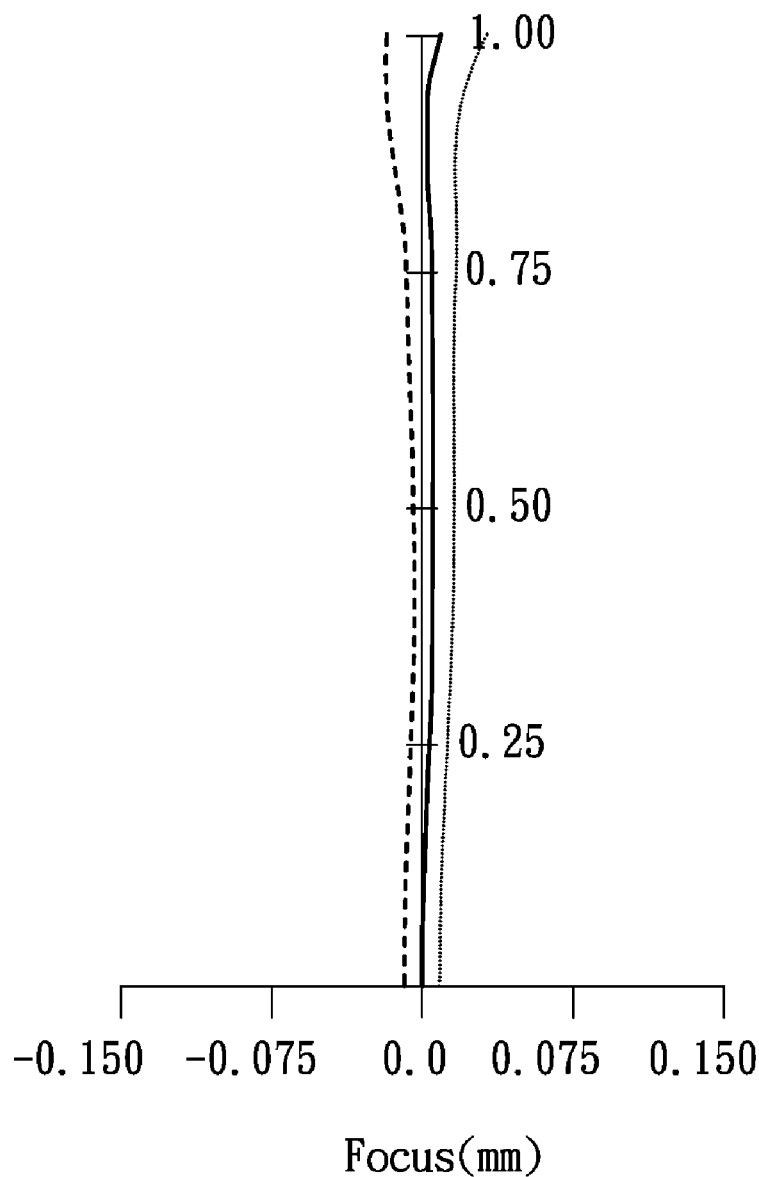
FIG. 22A depicts a longitudinal spherical aberration of the lens assembly in accordance with the eleventh embodiment of the invention.
Figure 22B:
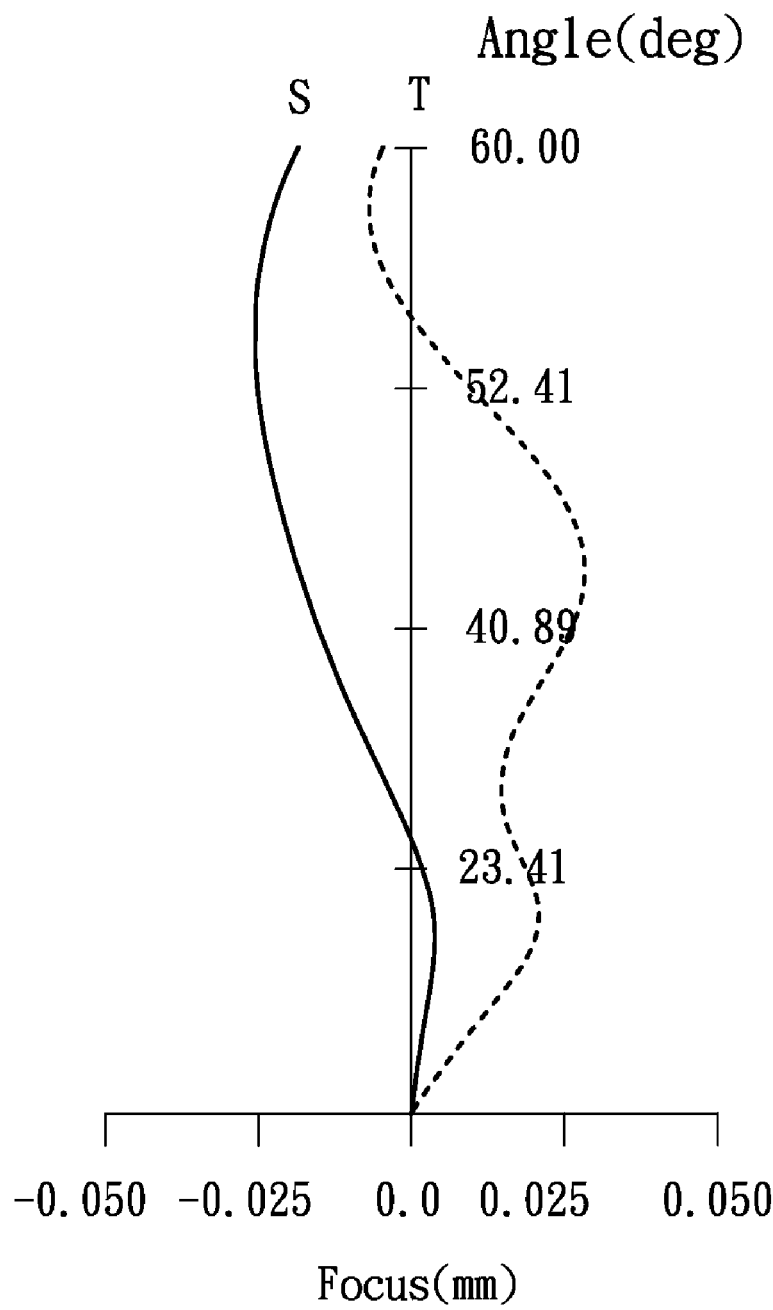
FIG. 22B is an astigmatic field curves diagram of the lens assembly in accordance with the eleventh embodiment of the invention.
Figure 22C:
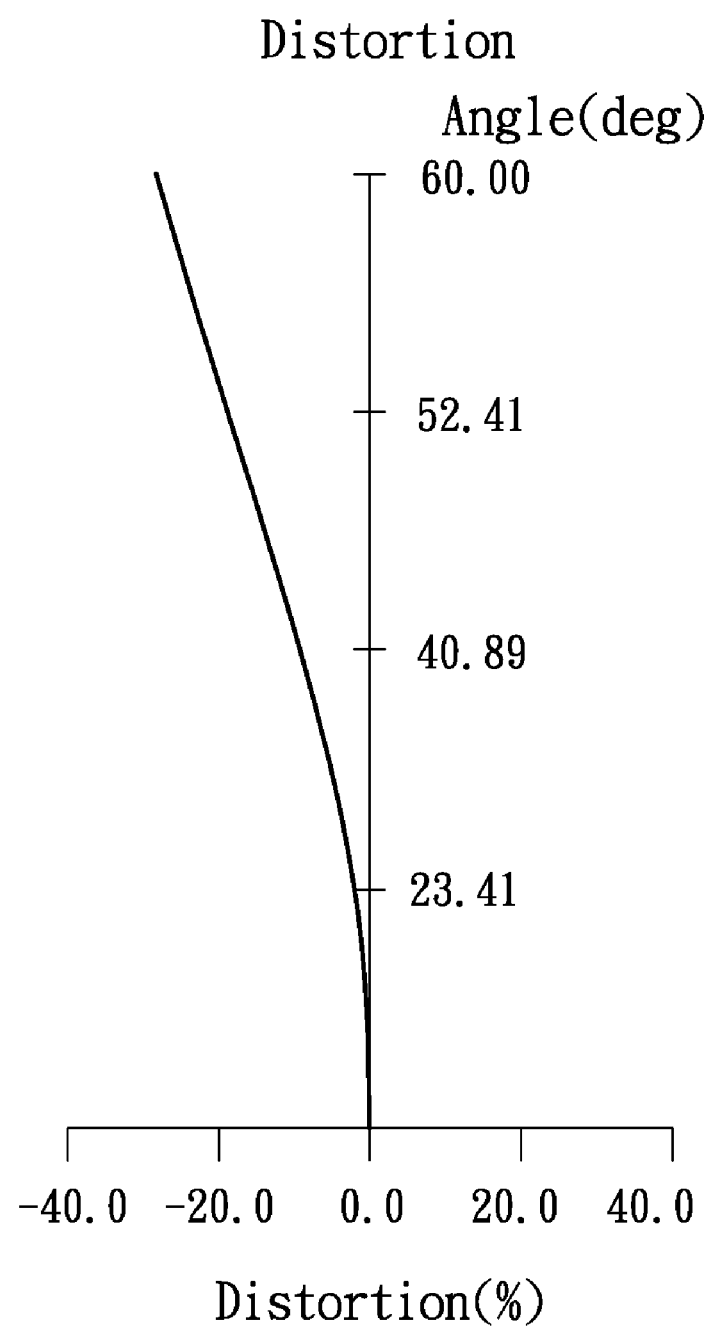
FIG. 22C is a distortion diagram of the lens assembly in accordance with the eleventh embodiment of the invention.

By the above arrangements of the lenses and stop ST11, the lens assembly 11 of the eleventh embodiment can meet the requirements of optical performance as seen in FIGS. 22A-22C, wherein FIG. 22A shows a longitudinal spherical aberration diagram of the lens assembly 11 in accordance with the eleventh embodiment of the invention, FIG. 22B shows an astigmatic field curves of the lens assembly 11 in accordance with the eleventh embodiment of the invention and FIG. 22C shows a distortion diagram of the lens assembly 11 in accordance with the eleventh embodiment of the invention.

It can be seen from FIG. 22A that the longitudinal spherical aberration in the lens assembly 11 of the eleventh embodiment ranges between −0.021 mm and 0.034 mm for the wavelength of 470.0000 nm, 555.0000 nm and 650.0000 nm. It can be seen from FIG. 22B that the astigmatic field curves of tangential direction and sagittal direction in the lens assembly 11 of the eleventh embodiment ranges between −0.025 mm and 0.027 mm for the wavelength of 555.0000 nm. It can be seen from FIG. 22C that the distortion in the lens assembly 11 of the eleventh embodiment ranges between −27.3% and 0.0% for the wavelength of 555.0000 nm. It is obvious that the longitudinal spherical aberration, the astigmatic field curves and the distortion of the lens assembly 11 of the eleventh embodiment can be corrected effectively. Therefore, the lens assembly 11 of the eleventh embodiment is capable of good optical performance.

In the above first, second, third and fourth embodiments, both of the object side surface and image side surface of the second, third, fourth, fifth and sixth lens are aspheric surfaces. However, it has the same effect and falls into the scope of the invention that any of the object side surfaces or image side surfaces of the second, third, fourth, fifth and sixth lens of the first, second, third and fourth embodiments are changed into spherical surfaces.

What is claimed is:

1. A lens assembly comprising a first lens, a second lens, a third lens, a fourth lens, a fifth lens and a sixth lens, all of which are arranged in sequence from an object side to an image side along an optical axis, wherein:
the first lens is with negative refractive power and comprises a convex surface facing the object side and a concave surface facing the image side;
the second lens is a biconcave lens and with negative refractive power;
the third lens is with positive refractive power and comprises a convex surface facing the object side;
the fourth lens is a meniscus lens with negative refractive power and comprises a convex surface facing the object side and a concave surface facing the image side;
the fifth lens is with positive refractive power and comprises a convex surface facing the object side and a convex surface facing the image side;
the sixth lens is with refractive power; and
the lens assembly satisfies:

$$0.078 \leq BFL/TTL \leq 0.4,$$

$$0.01 \leq f/TTL \leq 0.61,$$

$$(Nd_1+Nd_2+Nd_3+Nd_4+Nd_5+Nd_6)/6 < (Nd_2+Nd_3)/2$$

wherein BFL is a distance from an image side surface of the sixth lens to an image plane along the optical axis, TTL is a distance from the convex surface of the first lens to the image plane along the optical axis, f is an effective focal length of the lens assembly, $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens and $Nd_6$ is an index of refraction of the sixth lens.

2. The lens assembly as claimed in claim 1, wherein the sixth lens is with positive refractive power or the sixth lens is with negative refractive power.

3. The lens assembly as claimed in claim 1, wherein the lens assembly further satisfies:

$$0.01 \leq f/TTL \leq 0.2$$

wherein f is an effective focal length of the lens assembly and TTL is a distance from the convex surface of the first lens to an image plane along the optical axis.

4. The lens assembly as claimed in claim 1, wherein the first lens and the second lens satisfy:

$$3 \leq f_1/f_2 \leq 6$$

wherein $f_1$ is an effective focal length of the first lens and $f_2$ is an effective focal length of the second lens.

5. The lens assembly as claimed in claim 1, wherein the fourth lens satisfies:

$$0.54 < |f_4/f| < 20$$

wherein $f_4$ is an effective focal length of the fourth lens and f is an effective focal length of the lens assembly.

6. The lens assembly as claimed in claim 1, wherein the sixth lens satisfies:

$$-20 \leq f_6/f \leq 50$$

wherein $f_6$ is an effective focal length of the sixth lens and f is an effective focal length of the lens assembly.

7. The lens assembly as claimed in claim 1, wherein the third lens satisfies:

$$-10 \leq (R_{31}-R_{32})/(R_{31}+R_{32}) \leq 5$$

wherein $R_{31}$ is a radius of curvature of the convex surface of the third lens and $R_{32}$ is a radius of curvature of an image side surface of the third lens.

8. The lens assembly as claimed in claim 1, wherein the fifth lens satisfies:

$$-70 \leq (R_{51}-R_{52})/(R_{51}+R_{52}) \leq 20$$

wherein $R_{51}$ is a radius of curvature of the convex surface of the object side of the fifth lens and $R_{52}$ is a radius of curvature of the convex surface of the image side of the fifth lens.

9. The lens assembly as claimed in claim 1, wherein the convex surface of the first lens and the concave surface of the first lens are spherical surfaces.

10. The lens assembly as claimed in claim 1, wherein the first lens is made of glass material.

11. The lens assembly as claimed in claim 1, further comprising a stop disposed between the third lens and the fourth lens.

12. A lens assembly comprising a first lens, a second lens, a third lens, a fourth lens, a fifth lens and a sixth lens, all of which are arranged in sequence from an object side to an image side along an optical axis, wherein:

the first lens is with negative refractive power and comprises a convex surface facing the object side and a concave surface facing the image side;

the second lens is a biconvex lens and with positive refractive power;

the third lens is with negative refractive power and comprises a concave surface facing the object side;

the fourth lens is a biconvex lens and with positive refractive power;

the fifth lens is with positive refractive power and comprises a concave surface facing the object side and a convex surface facing the image side;

the sixth lens is with negative refractive power and comprises a convex surface facing the object side; and the lens assembly satisfies:

$$0.078 \leq BFL/TTL \leq 0.4,$$

$$0.01 \leq f/TTL \leq 0.61,$$

$$(Nd_1+Nd_2+Nd_3+Nd_4+Nd_5+Nd_6)/6 < (Nd_2+Nd_3)/2$$

wherein BFL is a distance from an image side surface of the sixth lens to an image plane along the optical axis, TTL is a distance from the convex surface of the first lens to the image plane along the optical axis, f is an effective focal length of the lens assembly, $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens and $Nd_6$ is an index of refraction of the sixth lens.

13. The lens assembly as claimed in claim 12, wherein:

the third lens further comprises a concave surface facing the image side; and the sixth lens further comprises a concave surface facing the image side.

14. The lens assembly as claimed in claim 13, wherein the lens assembly further satisfies:

$$0.4 \leq f/TTL \leq 0.5$$

wherein f is an effective focal length of the lens assembly and TTL is a distance from the convex surface of the first lens to an image plane along the optical axis.

15. The lens assembly as claimed in claim 13, wherein the first lens and the sixth lens satisfy:

$$2 \leq f_1/f_6 \leq 5$$

wherein $f_1$ is an effective focal length of the first lens and $f_6$ is an effective focal length of the sixth lens.

16. The lens assembly as claimed in claim 13, wherein the second lens satisfies:

$$-3 \leq (R_{21}-R_{22})/(R_{21}+R_{22}) \leq -1$$

wherein $R_{21}$ is a radius of curvature of an object side surface of the second lens and $R_{22}$ is a radius of curvature of an image side surface of the second lens.

17. The lens assembly as claimed in claim 13, wherein the fourth lens satisfies:

$$-1 \leq (R_{41}-R_{42})/(R_{41}+R_{42}) \leq 20$$

wherein $R_{41}$ is a radius of curvature of an object side surface of the fourth lens and $R_{42}$ is a radius of curvature of an image side surface of the fourth lens.

18. The lens assembly as claimed in claim 12, wherein the first lens satisfies:

$$2.19 < |f_1/f| < 2.74$$

wherein $f_1$ is an effective focal length of the first lens and f is an effective focal length of the lens assembly.

19. The lens assembly as claimed in claim 12, wherein the second lens satisfies:

$$0.53 < |f_2/f| < 1.03$$

wherein $f_2$ is an effective focal length of the second lens and f is an effective focal length of the lens assembly.

20. The lens assembly as claimed in claim 12, wherein the third lens satisfies:

$$0.72 < |f_3/f| < 1.37$$

wherein $f_3$ is an effective focal length of the third lens and f is an effective focal length of the lens assembly.

21. The lens assembly as claimed in claim 12, wherein the lens assembly further satisfies:

$$0.17 < |BFL/TTL| < 0.20$$

wherein TTL is a distance from an object side surface of the first lens to an image plane along the optical axis and BFL is a distance from an image side surface of the sixth lens to the image plane along the optical axis.

22. The lens assembly as claimed in claim 12, further comprising a stop disposed between the first lens and the third lens.

23. A lens assembly comprising a first lens, a second lens, a third lens, a fourth lens, a fifth lens and a sixth lens, all of which are arranged in sequence from an object side to an image side along an optical axis, wherein:

the first lens is with negative refractive power and comprises a convex surface facing the object side and a concave surface facing the image side;

the second lens is a meniscus lens with positive refractive power and comprises a convex surface facing the object side and a concave surface facing the image side;

the third lens is a meniscus lens with positive refractive power and comprises a concave surface facing the object side and a convex surface facing the image side;

the fourth lens is with positive refractive power;

the fifth lens is with positive refractive power and comprises a convex surface facing the object side and a convex surface facing the image side;

the sixth lens is a biconcave lens with negative refractive power; and the lens assembly satisfies:

$$0.078 \leq BFL/TTL \leq 0.4,$$

$$0.01 \leq f/TTL \leq 0.61,$$

$$(Nd_1+Nd_2+Nd_3+Nd_4+Nd_5+Nd_6)/6 < (Nd_2+Nd_3)/2$$

wherein BFL is a distance from an image side surface of the sixth lens to an image plane along the optical axis, TTL is a distance from the convex surface of the first lens to the image plane along the optical axis, f is an effective focal length of the lens assembly, $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens and $Nd_6$ is an index of refraction of the sixth lens.

24. The lens assembly as claimed in claim 23, wherein the lens assembly further satisfies:

$$0.2 \leq BFL/TTL \leq 0.4$$

wherein BFL is a distance from an image side surface of the sixth lens to an image plane along the optical axis and TTL is a distance from the convex surface of the first lens to the image plane along the optical axis.

25. The lens assembly as claimed in claim 23, wherein the first lens satisfies:

$$0.5 \leq (R_{11}-R_{12})/(R_{11}+R_{12}) \leq 0.9$$

wherein $R_{11}$ is a radius of curvature of the convex surface of the first lens and $R_{12}$ is a radius of curvature of the concave surface of the first lens.

26. The lens assembly as claimed in claim 23, wherein the second lens and the third lens satisfy:

$$2 \leq f_2/f_3 \leq 7$$

wherein $f_2$ is an effective focal length of the second lens and $f_3$ is an effective focal length of the third lens.

27. The lens assembly as claimed in claim 23, wherein the sixth lens satisfies:

$$-1.6 \leq (R_{61}-R_{62})/(R_{61}+R_{62}) \leq 10$$

wherein $R_{61}$ is a radius of curvature of an object side surface of the sixth lens and $R_{62}$ is a radius of curvature of an image side surface of the sixth lens.

28. The lens assembly as claimed in claim 23, wherein the lens assembly satisfies:

$$Nd_2 > Nd_3$$

wherein $Nd_2$ is an index of refraction of the second lens and $Nd_3$ is an index of refraction of the third lens.

29. The lens assembly as claimed in claim 23, further comprising a stop disposed between the second lens and the third lens.

* * * * *